(12) United States Patent
Hirakata

(10) Patent No.: US 9,964,799 B2
(45) Date of Patent: May 8, 2018

(54) DISPLAY DEVICE, DISPLAY MODULE, AND ELECTRONIC DEVICE

(71) Applicant: Semiconductor Energy Laboratory Co., Ltd., Atsugi-shi, Kanagawa-ken (JP)

(72) Inventor: Yoshiharu Hirakata, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days. days.

(21) Appl. No.: 15/066,040

(22) Filed: Mar. 10, 2016

(65) Prior Publication Data
US 2016/0274421 A1 Sep. 22, 2016

(30) Foreign Application Priority Data

Mar. 17, 2015 (JP) .................................. 2015-052858

(51) Int. Cl.
*G02F 1/1343* (2006.01)
*G02F 1/1335* (2006.01)
*G02F 1/1333* (2006.01)

(52) U.S. Cl.
CPC .... *G02F 1/133553* (2013.01); *G02F 1/13338* (2013.01); *G02F 2001/13356* (2013.01); *G02F 2001/133562* (2013.01)

(58) Field of Classification Search
CPC .............. G02F 1/133553; G02F 2001/133562
See application file for complete search history.

(56) References Cited

U.S. PATENT DOCUMENTS 5,341,231 A 8/1994 Yamamoto et al.
5,731,856 A 3/1998 Kim et al.
(Continued)

FOREIGN PATENT DOCUMENTS

EP 1737044 A 12/2006
EP 2226847 A 9/2010
(Continued)

OTHER PUBLICATIONS

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.
(Continued)

*Primary Examiner* — Sang V Nguyen
(74) *Attorney, Agent, or Firm* — Fish & Richardson P.C.

(57) ABSTRACT

A reflective liquid crystal display device capable of favorable display is provided. A reflective liquid crystal display device having a high aperture ratio is provided. A reflective film is provided on the counter substrate side. An oxide conductor film is used as an electrode of a capacitor or a liquid crystal element. Specifically, a display device includes a transistor, an insulating film, a capacitor, a liquid crystal element, and a reflective film. The transistor is electrically connected to the capacitor and the liquid crystal element. The transistor includes an oxide semiconductor film. The capacitor transmits visible light. The capacitor or the liquid crystal element includes an oxide conductor film as at least one of a pair of electrodes. The oxide semiconductor film is opposite to the oxide conductor film with the insulating film therebetween. The reflective film is opposite to the transistor with the liquid crystal element therebetween.

18 Claims, 53 Drawing Sheets

(56) References Cited

U.S. PATENT DOCUMENTS

| | | |
|---|---|---|
| 5,744,864 A | 4/1998 | Cillessen et al. |
| 6,122,027 A | 9/2000 | Ogawa et al. |
| 6,144,430 A | 11/2000 | Kuo |
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 8,937,307 B2 | 1/2015 | Yamazaki |
| 9,041,453 B2 | 5/2015 | Miyake et al. |
| 9,202,827 B2 | 12/2015 | Koyama et al. |
| 9,246,047 B2 | 1/2016 | Yamazaki |
| 9,269,728 B2 | 2/2016 | Yamazaki |
| 9,337,214 B2 | 5/2016 | Kubota et al. |
| 9,443,888 B2 | 9/2016 | Koyama et al. |
| 9,449,996 B2 | 9/2016 | Yamazaki et al. |
| 9,478,187 B2 | 10/2016 | Miyake et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0126969 A1* | 6/2007 | Kimura ............ G02F 1/134363 349/141 |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006833 A1* | 1/2008 | Hirakata ................ F21V 9/14 257/79 |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0031497 A1* | 2/2011 | Yamazaki ............ H01L 27/1225 257/59 |
| 2012/0062811 A1* | 3/2012 | Miyake ............ G02F 1/136213 349/39 |
| 2012/0280230 A1* | 11/2012 | Akimoto ............ H01L 27/1225 257/43 |
| 2014/0034954 A1 | 2/2014 | Yamazaki et al. |
| 2014/0054582 A1* | 2/2014 | Yamazaki ............ H01L 33/0041 257/43 |
| 2014/0061654 A1* | 3/2014 | Yamazaki ............ H01L 27/1225 257/59 |
| 2014/0357019 A1* | 12/2014 | Koyama ................ H01L 27/12 438/104 |
| 2014/0362324 A1* | 12/2014 | Yamazaki ......... G02F 1/136213 349/47 |
| 2015/0053973 A1 | 2/2015 | Yamazaki et al. |
| 2015/0062477 A1 | 3/2015 | Hatsumi et al. |
| 2015/0187800 A1* | 7/2015 | Park .................... H01L 27/124 349/43 |
| 2016/0247827 A1 | 8/2016 | Kubota et al. |
| 2016/0260751 A1 | 9/2016 | Okazaki et al. |
| 2016/0336355 A1 | 11/2016 | Yamazaki et al. |
| 2016/0351720 A1 | 12/2016 | Yamazaki et al. |
| 2016/0358950 A1 | 12/2016 | Koyama et al. |
| 2017/0025448 A1 | 1/2017 | Koyama et al. |
| 2017/0039976 A1 | 2/2017 | Miyake et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2001-147427 A | 5/2001 |
| JP | 2002-076356 A | 3/2002 |

(56) References Cited

FOREIGN PATENT DOCUMENTS

| JP | 2002-289859 A | 10/2002 |
|---|---|---|
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2014-063141 A | 4/2014 |
| JP | 2014-199402 A | 10/2014 |
| JP | 2014-199899 A | 10/2014 |
| WO | WO-2004/114391 | 12/2004 |

OTHER PUBLICATIONS

Asaoka.Y et al., "29.1: Polarizer-Free Reflective LCD Combined With Ultra Low-Power Driving Technology", SID Digest '09: SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back-Plane", SID Digest '09: SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn-Oxide TFT", SID Digest '09: SID International Symposium Digest of Technical Papers, May 31, 2009, pp. 1110-1112.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08: SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDS", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07: SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08: SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04: SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters), 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08: SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and Its Bending Properties", SID Digest '09: SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09: SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07: SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures over 1000° C.", Journal of Solid State Chemistry, 1985, vol. 60, pp. 382-384.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits , 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED", IDW '06: Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08: SID International Symposium Digest of Technical Papers, May 20, 2008, vol. 39, pp. 625-628.

Lee.M et al., "15.4:Excellent Performance of Indium-Oxide-Based Thin-Film Transistors by DC Sputtering", SID Digest '09: SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

(56) References Cited

OTHER PUBLICATIONS

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "SUFTLA Flexible Microelectronics on Their Way to Business", SID Digest '07: SID International Symposium Digest of Technical Papers, 2007, vol. 38, pp. 1673-1676.

Mo.Y et al., "Amorphous Oxide TFT Backplanes for Large Size AMOLED Displays", IDW '08: Proceedings of the 6th International Display Workshops, Dec. 3, 2008, pp. 581-584.

Nakamura.M et al., "The phase relations in the $In_2O_3$—$Ga_2ZnO_4$—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", Nirim Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Nomura.K et al., "Carrier transport in transparent oxide semiconductor with intrinsic structural randomness probed using single-crystalline $InGaO_3(ZnO)_5$ films", Appl. Phys. Lett. (Applied Physics Letters), Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDs", SID Digest '09: SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn-Oxide TFTs With a Novel Passivation Layer", SID Digest '09: SID International Symposium Digest of Technical Papers, May 31, 2009, pp. 284-287.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide $InGaO_3(ZnO)_m$ (m<4):a Zn4s conductor", Philosophical Magazine, 2001, vol. 81, No. 5, pp. 501-515.

Orita.M et al., "Mechanism of Electrical Conductivity of Transparent $InGaZnO_4$", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09: SID International Symposium Digest of Technical Papers, May 31, 2009, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by PEALD Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08: SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-In. AMOLED Display With Driver Circuit Using Amorphous In—Ga—Zn-Oxide TFTs", IDW '09: Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO ($Ga_2O_3$—$In_2O_3$—ZnO) TFT", SID Digest '08: SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08: Proceedings of the 15th International Display Workshops, Dec. 3, 2008, pp. 1637-1640.

Tsuda.K et al., "Ultra Low Power Consumption Technologies for Mobile TFT-LCDs", IDW '02: Proceedings of the 9th International Display Workshops, Dec. 4, 2002, pp. 295-298.

Ueno.K et al., "Field-Effect Transistor on $SrTiO_3$ With Sputtered $Al_2O_3$ Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

\* cited by examiner

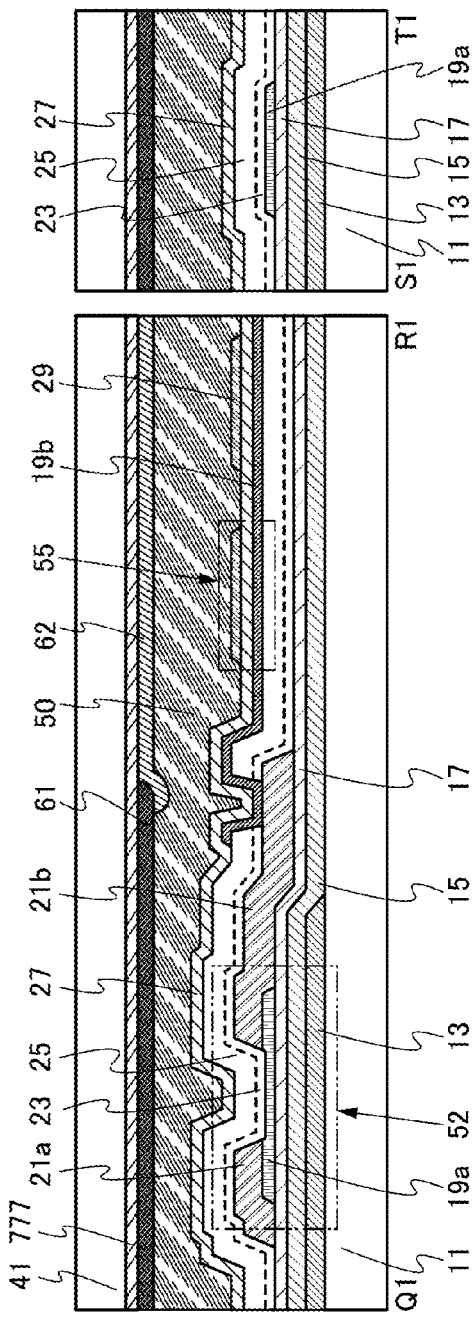
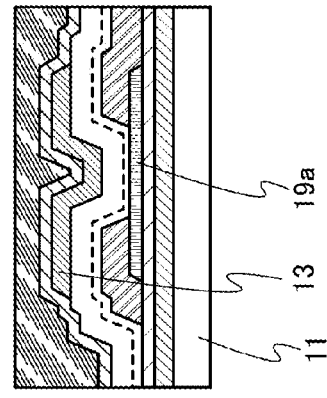
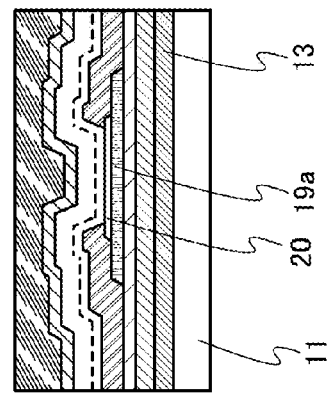
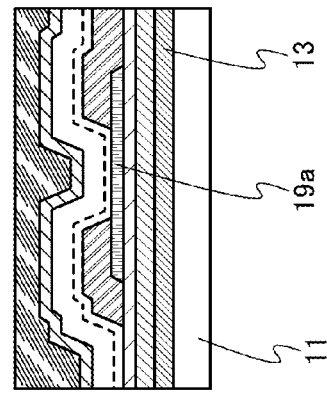
FIG. 5A
FIG. 5B
FIG. 5C
FIG. 5D

FIG. 41A
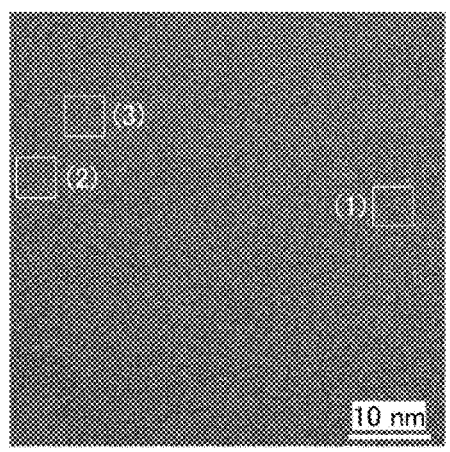
FIG. 41B    FIG. 41C    FIG. 41D
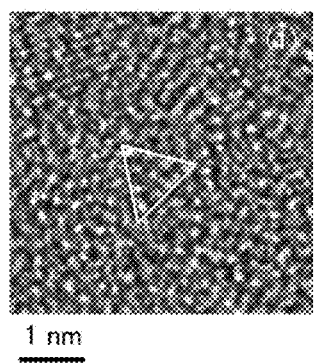 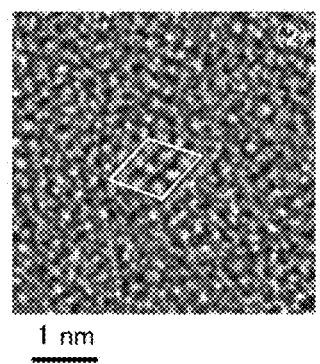 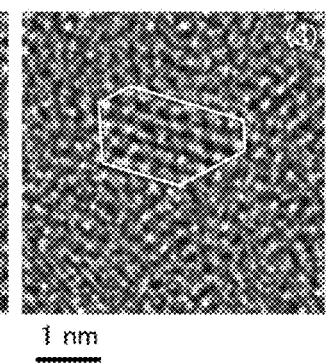

in-plane method φ scan
CAAC-OS in-plane method φ scan
Single crystal OS

FIG. 43A
FIG. 43B
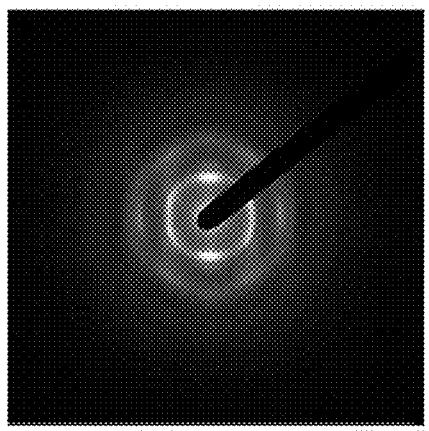
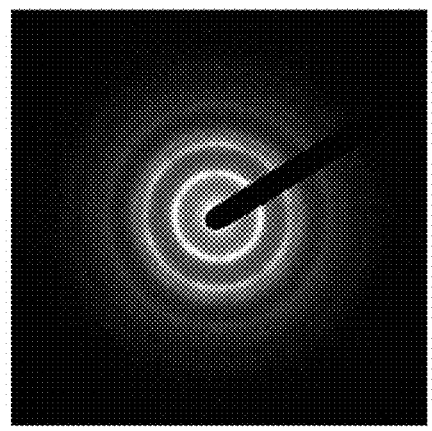

DISPLAY DEVICE, DISPLAY MODULE, AND ELECTRONIC DEVICE

BACKGROUND OF THE INVENTION

1. Field of the Invention

One embodiment of the present invention relates to a display device, a display module, and an electronic device.

Note that one embodiment of the present invention is not limited to the above technical field. Examples of the technical field of one embodiment of the present invention include a semiconductor device, a display device, a light-emitting device, a power storage device, a memory device, an imaging device, a method for driving any of them, and a method for manufacturing any of them.

2. Description of the Related Art

In recent years, flat panel displays such as liquid crystal displays (LCDs) have been widespread. In a display device such as a flat panel display, pixels are arranged in the row direction and the column direction, and each pixel includes a transistor serving as a switching element, a liquid crystal element electrically connected to the transistor, and a capacitor connected to the liquid crystal element in parallel.

As a semiconductor material for forming a semiconductor film of the transistor, a silicon semiconductor such as amorphous silicon or polysilicon (polycrystalline silicon) is generally used.

Metal oxides having semiconductor characteristics (hereinafter referred to as oxide semiconductors) can also be used for semiconductor films of transistors. For example, techniques for forming transistors including zinc oxide or an In—Ga—Zn-based oxide semiconductor are disclosed (see Patent Documents 1 to 3).

REFERENCES

[Patent Document 1] Japanese Published Patent Application No. 2014-63141

[Patent Document 2] Japanese Published Patent Application No. 2014-199402

[Patent Document 3] Japanese Published Patent Application No. 2014-199899

SUMMARY OF THE INVENTION

Reducing power consumption of display devices for mobile applications, such as portable information terminals, is important. In transmissive liquid crystal display devices, backlights account for a large share of the power consumption. Therefore in a transmissive liquid crystal display device, long-time or repeated display rapidly consumes the battery and shortens the operating time of the portable information terminal. Reflective liquid crystal display devices not using backlights have low power consumption and are suitable for mobile applications. However, many reflective liquid crystal display devices have lower contrast and lower color reproducibility than transmissive liquid crystal display devices.

An object of one embodiment of the present invention is to provide a reflective liquid crystal display device capable of favorable display. Another object of one embodiment of the present invention is to provide a reflective liquid crystal display device having a high aperture ratio. Another object of one embodiment of the present invention is to provide a display device with low power consumption. Another object of one embodiment of the present invention is to provide a novel display device or the like.

Note that the descriptions of these objects do not disturb the existence of other objects. In one embodiment of the present invention, there is no need to achieve all the objects. Other objects can be derived from the description of the specification, the drawings, the claims, and the like.

One embodiment of the present invention is a display device including a transistor, an insulating film, a liquid crystal element, and a first film. The transistor is electrically connected to the liquid crystal element. The transistor includes an oxide semiconductor film. The liquid crystal element includes a first oxide conductor film as at least one of a pair of electrodes. The oxide semiconductor film is opposite to the first oxide conductor film with the insulating film therebetween. The first film is opposite to the transistor with the liquid crystal element therebetween. The first film has a function of reflecting visible light.

In this specification and the like, a film having a function of reflecting visible light may be referred to as a reflective film.

The expression "A is opposite to C with B therebetween" means that there is not necessarily a portion where the three components A, B, and C overlap. For example, there may be a portion where A and B overlap with each other and a portion where B and C overlap with each other. Alternatively, there may be no portion where A and B, or B and C, overlap with each other.

In the above-described embodiment, it is preferable that the display device include a capacitor, the capacitor have a function of transmitting visible light (also referred to as a light-transmitting property), and the transistor be electrically connected to the capacitor.

Another embodiment of the present invention is a display device including a transistor, an insulating film, a capacitor, a liquid crystal element, and a first film. The transistor is electrically connected to the capacitor. The transistor is electrically connected to the liquid crystal element. The transistor includes an oxide semiconductor film. The capacitor has a function of transmitting visible light. The capacitor includes a first oxide conductor film as at least one of a pair of electrodes. The oxide semiconductor film is opposite to the first oxide conductor film with the insulating film therebetween. The first film is opposite to the transistor with the liquid crystal element therebetween. The first film has a function of reflecting visible light.

In each of the above-described embodiments, it is preferable that the transistor include two gate electrodes, the two gate electrodes overlap with the oxide semiconductor film, the two gate electrodes be opposite to each other with the oxide semiconductor film therebetween, and one of the two gate electrodes include a second oxide conductor film. In that case, it is preferable that the first oxide conductor film and the second oxide conductor film contain the same metal element. It is particularly preferable that the first oxide conductor film and the second oxide conductor film each be an In-$M_1$-Zn oxide ($M_1$ is Al, Ti, Ga, Y, Zr, La, Ce, Nd, Sn, or Hf).

In each of the above-described embodiments, it is preferable that the first oxide conductor film and the oxide semiconductor film contain the same metal element. It is particularly preferable that the first oxide conductor film and the oxide semiconductor film each be an In-$M_2$-Zn oxide ($M_2$ is Al, Ti, Ga, Y, Zr, La, Ce, Nd, Sn, or Hf).

In each of the above-described embodiments, the display device preferably includes a touch sensor.

Another embodiment of the present invention is a display module including the display device of any of the above-described embodiments and a flexible printed circuit (FPC).

Another embodiment of the present invention is an electronic device including the display module and any of an antenna, a battery, a housing, a speaker, a microphone, an operation switch, and an operation button.

One embodiment of the present invention is a module in which the display device of any of the above-described embodiments is provided with a connector such as an FPC or a tape carrier package (TCP) or is mounted with an IC by a chip on glass (COG) method or the like.

One embodiment of the present invention can provide a reflective liquid crystal display device capable of favorable display. Another embodiment of the present invention can provide a reflective liquid crystal display device having a high aperture ratio. Another embodiment of the present invention can provide a display device with low power consumption. Another embodiment of the present invention can provide a novel display device or the like.

Note that the descriptions of these effects do not disturb the existence of other effects. One embodiment of the present invention does not necessarily achieve all the effects. Other effects can be derived from the description of the specification, the drawings, the claims, and the like.

BRIEF DESCRIPTION OF THE DRAWINGS

FIGS. 5A to 5D each illustrate a cross-sectional view of an example of a display device.

FIGS. 41A to 41D are Cs-corrected high-resolution TEM images of a plane of a CAAC-OS.

FIGS. 43A and 43B show electron diffraction patterns of a CAAC-OS.

DETAILED DESCRIPTION OF THE INVENTION

Figure 1:
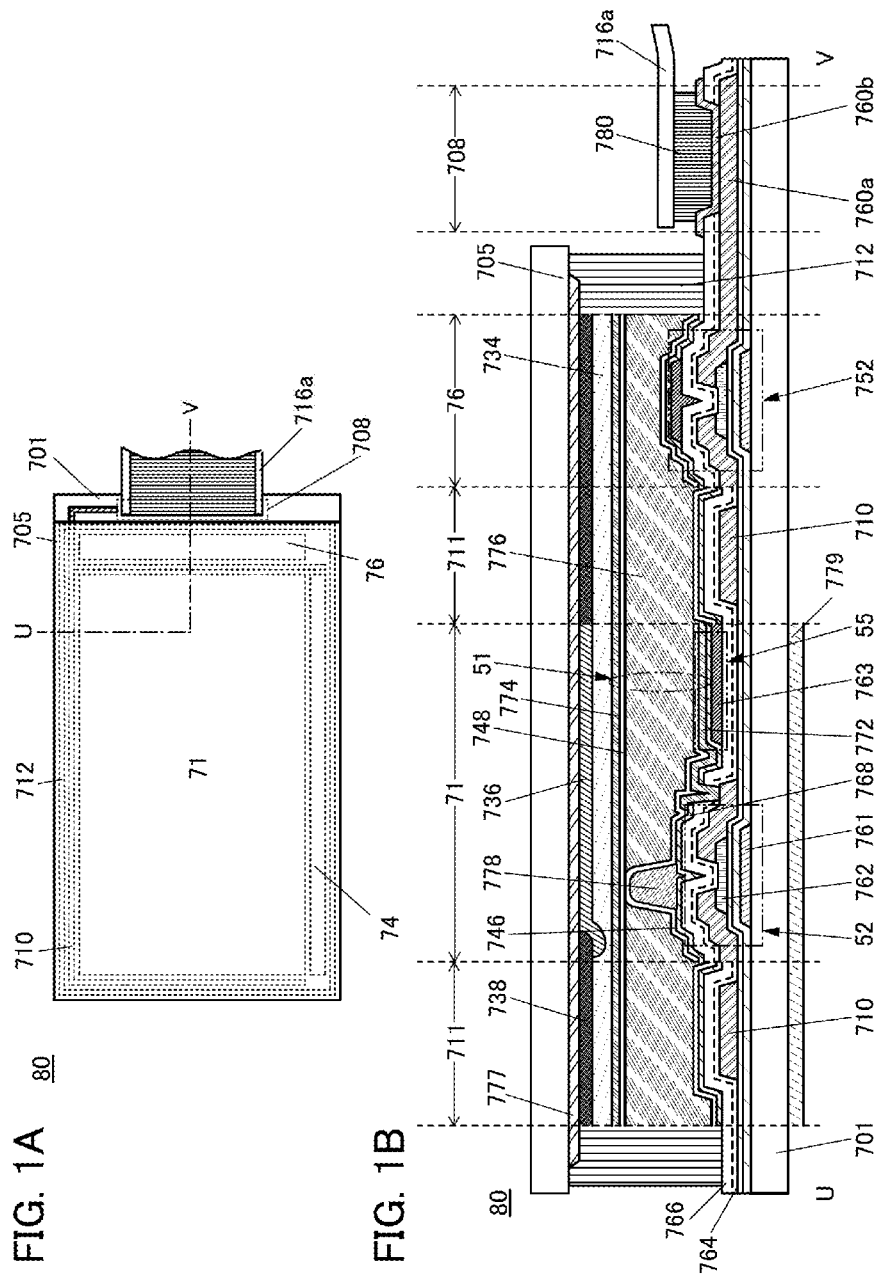
FIGS. 1A and 1B illustrate a top view and a cross-sectional view of an example of a display device.

Embodiments will be described in detail with reference to the drawings. Note that the present invention is not limited to the following description, and it will be easily understood by those skilled in the art that various changes and modifications can be made without departing from the spirit and scope of the present invention. Therefore, the present invention should not be construed as being limited to the description in the following embodiments.

Note that in the structures of the invention described below, the same portions or portions having similar functions are denoted by the same reference numerals in different drawings, and description of such portions is not repeated. Furthermore, the same hatch pattern is applied to similar functions, and these are not especially denoted by reference numerals in some cases.

In addition, the position, size, range, or the like of each structure illustrated in drawings is not accurately represented in some cases for easy understanding. Therefore, the disclosed invention is not necessarily limited to the position, size, range, or the like disclosed in the drawings.

Note that the terms "film" and "layer" can be interchanged with each other depending on the case or circumstances. For example, the term "conductive film" can be changed into the term "conductive layer." Also, the term "insulating film" can be changed into the term "insulating layer."

Embodiment 1

In this embodiment, a display device of one embodiment of the present invention will be described with reference to FIGS. 1A and 1B, FIG. 2, FIGS. 3A and 3B, FIG. 4, FIGS. 5A to 5D, FIGS. 6 to 18, FIGS. 19A and 19B, and FIGS. 20 to 23.

In a reflective liquid crystal display device, light from the outside enters a liquid crystal layer through a polarizing plate (also referred to as a polarizing film), is reflected by a reflective film and returned to the liquid crystal layer, and again enters the polarizing plate. At this time, the degree of optical modulation in the liquid crystal layer determines transmission or non-transmission through the polarizing plate to control brightness and darkness.

A display device of one embodiment of the present invention includes a reflective film on a side of a substrate (hereinafter also referred to as a counter substrate) which is different from a substrate (hereinafter also referred to as an element substrate) provided with a transistor or the like.

In other words, in the reflective liquid crystal display device of one embodiment of the present invention, light from the outside enters the liquid crystal layer through the element substrate, is reflected by the reflective film and returned to the liquid crystal layer, and again enters the element substrate.

Since the reflective film is formed over the counter substrate, the reflective film is less affected by unevenness due to an element such as a transistor.

Thus, for example, a reflective film with high flatness and strong specular reflection can be formed. Alternatively, a reflective film with a desired uneven structure and strong diffuse reflection can be formed.

Since a transistor or the like does not need to be formed on the counter substrate side, the step of subjecting the reflective film to a high temperature can be eliminated. Thus, the reflective film does not need to have high heat resistance.

The reflective film is not necessarily formed into a pattern. Thus, the reflective film does not need processing such as etching, and a film which is difficult to process can be used as the reflective film.

These mean that the application of one embodiment of the present invention expands the choice of materials for the reflective film.

For example, aluminum, silver, an alloy containing any of these metal materials, or the like is preferably used for the reflective film.

Note that in the case where a conductive material is used for the reflective film, a constant potential is preferably applied to the reflective film. For example, it is preferable that the reflective film be electrically connected to a conductive film on the element substrate side by using a conductive spacer or the like. For example, it is preferable that the reflective film be electrically connected to a common electrode (an electrode to which a common potential is applied) of a liquid crystal element.

The reflective film may include a plurality of dielectric films. For example, a reflective film with high reflectance can be obtained by alternately stacking two types of dielectric films with different refractive indexes.

A film formed over the reflective film is mainly a film which is not affected by the conductance of the reflective film, such as a coloring film (e.g., a color filter) or a light-blocking film (e.g., a light-absorbing layer or a black matrix). Thus, even when the reflective film is a conductive film, a coloring film or a light-blocking film can be formed on the reflective film without the need to additionally provide an insulating film therebetween. Accordingly, manufacturing steps and manufacturing cost can be reduced.

A film having a function of directive color reflection to which holography is applied may be used as the reflective film and a color filter. It is particularly preferable that an off-axis reflection mechanism be provided to reflect incident light in the direction of the normal to the reflective film.

Elements such as a transistor and a capacitor are provided over the element substrate. In the case where these elements do not have a light-transmitting property, the display device has a low aperture ratio.

In view of this, a capacitor capable of transmitting visible light is used in the display device of one embodiment of the present invention. This prevents a decrease in aperture ratio due to the area of the capacitor and enables both a desired capacitance and a high aperture ratio. One embodiment of the present invention is particularly favorable in the case where a capacitor with a large capacitance is required.

For example, it is preferable that an electrode of the capacitor also serve as an electrode of a liquid crystal element. In that case, the number of manufacturing steps can be decreased, and manufacturing cost can be reduced.

For example, it is preferable that an oxide semiconductor film be used in the transistor and an oxide conductor film be used as at least one of the electrodes of the capacitor or the electrodes of the liquid crystal element. In that case, it is preferable that the oxide semiconductor film and the oxide conductor film be formed using an oxide semiconductor. The resistivity of an oxide semiconductor can be easily controlled in a manufacturing process of the display device; thus, an oxide semiconductor can be favorably used as a material of a semiconductor film and a conductive film. When two or more layers included in the display device are formed using oxide semiconductors containing the same metal element or using the same oxide semiconductor, the same manufacturing apparatus (e.g., deposition apparatus or processing apparatus) can be used in two or more steps and manufacturing cost can thus be reduced. An oxide semiconductor is a material which transmits visible light and can therefore be favorably used for an element which transmits visible light.

Structural Example 1

FIGS. 1A and 1B illustrate a display device of one embodiment of the present invention. FIG. 1A illustrates a top view of a display device 80, and FIG. 1B illustrates a cross-sectional view taken along dashed-dotted line U-V in FIG. 1A.

The display device 80 in FIG. 1A includes a pixel portion 71, a signal line driver circuit 76, and a scan line driver circuit 74.

A sealing layer 712 is provided so as to surround the pixel portion 71, the signal line driver circuit 76, and the scan line driver circuit 74. Note that a substrate 701 and a substrate 705 are sealed with the sealing layer 712. That is, the pixel portion 71, the signal line driver circuit 76, and the scan line driver circuit 74 are sealed between the substrate 701 and the substrate 705 with the sealing layer 712.

In the display device 80, an FPC terminal portion 708 electrically connected to the pixel portion 71, the signal line driver circuit 76, and the scan line driver circuit 74 is provided in a region different from the region which is surrounded by the sealing layer 712. An FPC 716a is connected to the FPC terminal portion 708, and a variety of signals and the like are supplied to the pixel portion 71, the signal line driver circuit 76, and the scan line driver circuit 74 through the FPC 716a. Furthermore, wirings 710 are connected to the pixel portion 71, the signal line driver circuit 76, the scan line driver circuit 74, and the FPC terminal portion 708. A variety of signals and the like are supplied to the pixel portion 71, the signal line driver circuit 76, the scan line driver circuit 74, and the FPC terminal portion 708 via the wirings 710 from the FPC 716a.

A plurality of scan line driver circuits 74 may be provided in the display device 80. An example of the display device 80 in which the signal line driver circuit 76 and the scan line driver circuit 74 are formed over the substrate 701 where the pixel portion 71 is also formed is described; however, one embodiment of the present invention is not limited to this structure. For example, only the scan line driver circuit 74 or only the signal line driver circuit 76 may be formed over the substrate 701. In this case, a substrate where a source driver circuit, a gate driver circuit, or the like is formed (e.g., a driver-circuit substrate formed using a single crystal semiconductor film or a polycrystalline semiconductor film) may be mounted on the substrate 701. Note that there is no particular limitation on the method of connecting a separately prepared driver-circuit substrate, and a COG method, a wire bonding method, or the like can be used.

As illustrated FIG. 1B, the display device 80 includes a lead wiring portion 711, the pixel portion 71, the signal line driver circuit 76, and the FPC terminal portion 708.

The pixel portion 71 of the display device 80 includes a plurality of transistors and a plurality of capacitors. For example, the pixel portion 71 illustrated in FIG. 1B includes a transistor 52 and a capacitor 55.

The signal line driver circuit 76 and the scan line driver circuit 74 each include a plurality of transistors and a plurality of wiring contact portions. For example, the signal line driver circuit 76 illustrated in FIG. 1B includes a transistor 752.

Note that structural examples of transistors, capacitors, and wiring contact portions which can be used in the pixel portion 71, the signal line driver circuit 76, and the scan line driver circuit 74 will be described in detail in Embodiment 2.

For example, a transistor 150 described in Embodiment 2 can be used as the transistor 52. For example, a transistor 151 described in Embodiment 2 can be used as the transistor 752.

The transistors used in this embodiment each include an oxide semiconductor film which is highly purified and in which formation of oxygen vacancies is suppressed. In the transistor, the current in an off state (off-state current) can be made small. Accordingly, an electrical signal such as an image signal can be held for a longer period, and a writing interval can be set longer in an on state. Thus, the frequency of refresh operation can be reduced, which leads to an effect of suppressing power consumption.

In addition, the transistor used in this embodiment can have relatively high field-effect mobility and thus is capable of high speed operation. For example, with such a transistor that can operate at high speed used for a liquid crystal display device, a switching transistor in a pixel portion and a driver transistor in a driver circuit portion can be formed over one substrate. That is, a semiconductor device formed using a silicon wafer or the like is not additionally needed as a driver circuit, by which the number of components of the semiconductor device can be reduced. In addition, the transistor that can operate at high speed can be used also in the pixel portion, whereby a high-quality image can be provided.

In the cross-sectional view illustrated in FIG. 1B, the width of a gate electrode 761 is larger than the width of an oxide semiconductor film 762. Therefore, the gate electrode 761 can block the incidence of external light on the oxide semiconductor film 762 through the substrate 701. Thus, a change in characteristics of the transistor 52 can be suppressed. Note that the width of the gate electrode 761 may be smaller than or equal to the width of the oxide semiconductor film 762 in the case where there is no influence on the characteristics of the transistor, for example.

For example, a capacitor 160 described in Embodiment 2 can be used as the capacitor 55. Owing to the light-transmitting property of the capacitor 55, the capacitor 55 can be formed large (covers a large area) in a pixel included in the pixel portion 71. Thus, the display device can have an increased capacitance and an increased aperture ratio (typically, the aperture ratio can be 50% or more, preferably 60% or more). In a high-resolution display device (e.g., a liquid crystal display device), the area of a pixel is small. In the case where the capacitor blocks visible light, the area of the capacitor needs to be decreased to increase the aperture ratio of the pixel. For this reason, the capacitance of the capacitor is small in the high-resolution display device. However, since the capacitor included in the display device of one embodiment of the present invention has a light-transmitting property, sufficient capacitance can be obtained in each pixel and the aperture ratio can be improved. Typically, the capacitor 55 can be favorably used for a high-resolution display device with a pixel density of 200 pixels per inch (ppi) or more, 300 ppi or more, or furthermore, 500 ppi or more. Furthermore, according to the structure described in this embodiment, the aperture ratio can be high even in a high-resolution display device, which makes it possible to use external light efficiently, so that a reflective display device capable of favorable display can be obtained.

In a liquid crystal display device, an increase in the capacitance of a capacitor increases the period during which the alignment of liquid crystal molecules of a liquid crystal element can be kept constant in the state where an electric field is applied. Since the period can be made longer when a still image is displayed, the number of times of rewriting image data can be reduced, leading to a reduction in power consumption.

Conductive films which transmit visible light can be used as a pair of electrodes (a conductive film 763 and a conductive film 772) of the capacitor 55. For example, a material containing one of indium (In), zinc (Zn), and tin (Sn) is preferably used for the conductive films which transmit visible light. It is particularly preferable that an oxide conductor film be used as at least one of the conductive films 763 and 772. The oxide conductor film preferably contains the same metal material as the oxide semiconductor film 762, and is further preferably an In-M-Zn oxide (M is Al, Ti, Ga, Y, Zr, La, Ce, Nd, Sn, or Hf) film.

In the example described in this embodiment, an oxide conductor film containing the same metal material as the oxide semiconductor film 762 is used as the conductive film 763. In addition, in the example described in this embodiment, the above-described In-M-Zn oxide film is used as the oxide semiconductor film 762 and the conductive film 763.

In FIG. 1B, an insulating film 764, an insulating film 766, and an insulating film 768 are provided in this order over the transistor 52.

An insulating film containing at least oxygen is preferably used as each of the insulating films 764 and 766.

An insulating film containing at least hydrogen is preferably used as the insulating film 768.

The insulating film 768 may be a film having a planarizing function. A film having a planarizing function may be formed over the insulating film 768.

As described later in Embodiment 2, in the display device of one embodiment of the present invention, an insulating film containing oxygen, preferably an insulating film capable of releasing oxygen, is used as an insulating film in contact with the oxide semiconductor film 762. Oxygen is supplied from the insulating film to the oxide semiconductor film 762, whereby oxygen vacancies in the film or at the interface can be filled and the resistivity of the oxide semiconductor film 762 can be increased.

In the display device of one embodiment of the present invention, an insulating film containing hydrogen, preferably an insulating film capable of releasing hydrogen, is formed over the oxide conductor film that is used as the electrode of the capacitor (this insulating film corresponds to the insulating film 768 in FIG. 1B). The oxide conductor film may be formed in such a manner that a film similar to an oxide semiconductor film used for the oxide semiconductor film 762 is formed first, and then the insulating film is formed and hydrogen is supplied from the insulating film to the oxide semiconductor film, whereby the carrier density of the oxide semiconductor film is increased and the resistivity thereof is decreased. Accordingly, the oxide semiconductor film is changed into the oxide conductor film, which can be favorably used as the electrode of the capacitor.

The lead wiring portion 711 includes the wiring 710.

The wiring 710 is formed through the same process as a conductive film functioning as a source electrode or a drain electrode of the transistor. Note that the wiring 710 may be formed through the same process as a conductive film (e.g., the gate electrode 761) which is formed through a different process from the source electrode and the drain electrode of the transistor. In the case where the wiring 710 is formed using a material containing a copper element, signal delay or the like due to wiring resistance is reduced, which enables display on a large screen.

The FPC terminal portion 708 includes a conductive film 760a and a conductive film 760b. The conductive film 760a can be formed through the same process as the conductive film functioning as the source electrode or the drain electrode of the transistor, for example. The conductive film 760b can be formed through the same process as the oxide conductor film functioning as the electrode of the capacitor or the liquid crystal element. The conductive film 760b may have a function of suppressing oxidation of a surface of the conductive film 760a. The conductive film 760a is electrically connected to a terminal included in the FPC 716a through an anisotropic conductive film 780 and the conductive film 760b.

A reflective film 777, a light-blocking film 738 functioning as a black matrix, a coloring film 736 functioning as a color filter, and an insulating film 734 in contact with the light-blocking film 738 and the coloring film 736 are provided on the substrate 705 side.

The reflective film 777 can be formed using the above-described material. The reflective film 777 preferably has as high a reflectance for visible light as possible.

A structure 778 is preferably provided between the substrate 701 and the substrate 705. The structure 778 is a columnar spacer obtained by selective etching of an insulating film and is provided to control the distance (cell gap) between the substrate 701 and the substrate 705. Note that a spherical spacer may be used as the structure 778.

The insulating film 734 preferably has a planarizing function, in which case the cell gap can be easily made uniform.

Although the example in which the structure 778 is provided on the substrate 701 side is described in this embodiment, one embodiment of the present invention is not limited thereto. For example, the structure 778 may be provided on the substrate 705 side, or both the substrate 701 and the substrate 705 may be provided with the structure 778.

The display device 80 includes a liquid crystal element 51. The liquid crystal element 51 includes the conductive film 772, a conductive film 774, and a liquid crystal layer 776. The conductive film 774 is provided on the substrate 705 side and functions as a common electrode. The display device 80 is capable of displaying an image in such a manner that light transmission or non-transmission is controlled by change in the alignment state of the liquid crystal layer 776 depending on a voltage applied between the conductive film 772 and the conductive film 774.

The display device 80 preferably includes an alignment film 746 between the conductive film 772 and the liquid crystal layer 776. Similarly, the display device 80 preferably includes an alignment film 748 between the conductive film 774 and the liquid crystal layer 776.

The conductive film 772 is connected to the conductive film functioning as the source electrode or the drain electrode included in the transistor 52. The conductive film 772 is formed over the insulating film 768 and functions as a pixel electrode. The display device 80 is what is called a reflective color liquid crystal display device in which external light incident on the substrate 701 is utilized to display an image through the liquid crystal element 51 and the coloring film 736.

Conductive films which transmit visible light can be used as the conductive films 772 and 774. For example, a material containing one of indium (In), zinc (Zn), and tin (Sn) is preferably used for the conductive films which transmit visible light. It is particularly preferable that an oxide conductor film be used as at least one of the conductive films 772 and 774. The oxide conductor film preferably contains the same metal material as the oxide semiconductor film 762, and is further preferably an In-M-Zn oxide (M is Al, Ti, Ga, Y, Zr, La, Ce, Nd, Sn, or Hf) film.

Note that an optical member (an optical substrate) and the like such as a polarizing member, a retardation member, or an anti-reflection member can be provided as appropriate. For example, circular polarization may be employed by using a polarizing substrate and a retardation substrate. FIG. 1B illustrates an example in which a circularly polarizing plate 779 is provided in the pixel portion 71. Note that the optical member may be provided over part of a surface of the substrate 701 (e.g., only in the pixel portion 71) or may be provided over the entire surface.

Note that the liquid crystal element 51 is an element that controls transmission or non-transmission of light by utilizing an optical modulation action of liquid crystal. The optical modulation action of the liquid crystal is controlled by an electric field applied to the liquid crystal (including a horizontal electric field, a vertical electric field, and an oblique electric field). As the liquid crystal used for the liquid crystal element 51, a thermotropic liquid crystal, a low-molecular liquid crystal, a high-molecular liquid crystal, a polymer dispersed liquid crystal, a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Alternatively, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition containing a liquid crystal showing a blue phase and a chiral material has a short response time and optical isotropy. In addition, the liquid crystal composition containing a liquid crystal showing a blue phase and a chiral material does not need an alignment process and has a small viewing angle dependence. An alignment film does not need to be provided and rubbing treatment is thus not necessary; accordingly, electrostatic discharge damage caused by the rubbing treatment can be prevented and defects and damage of the liquid crystal display device in the manufacturing process can be reduced.

As a method for driving the display device 80 including the liquid crystal element 51, a twisted nematic (TN) mode, an in-plane-switching (IPS) mode, a fringe field switching (FFS) mode, an axially symmetric aligned micro-cell (ASM) mode, an optical compensated birefringence (OCB) mode, a ferroelectric liquid crystal (FLC) mode, an antiferroelectric liquid crystal (AFLC) mode, or the like can be used.

Furthermore, the display device 80 may be a normally black liquid crystal display device such as a liquid crystal display device utilizing a vertical alignment (VA) mode. Examples of the vertical alignment mode include a multi-domain vertical alignment (MVA) mode, a patterned vertical alignment (PVA) mode, an ASV mode, and the like.

The display device of one embodiment of the present invention may include a touch sensor. As the touch sensor, a capacitive touch sensor can be used. Examples of the capacitive touch sensor include a surface capacitive touch sensor and a projected capacitive touch sensor. Examples of the projected capacitive touch sensor include a self-capacitive touch sensor and a mutual capacitive touch sensor. The use of a mutual capacitive type is preferable because multiple points can be sensed simultaneously. Note that a variety of sensors that can sense proximity or touch of a sensing target such as a finger or a stylus can be used in the display device.

Figure 2:
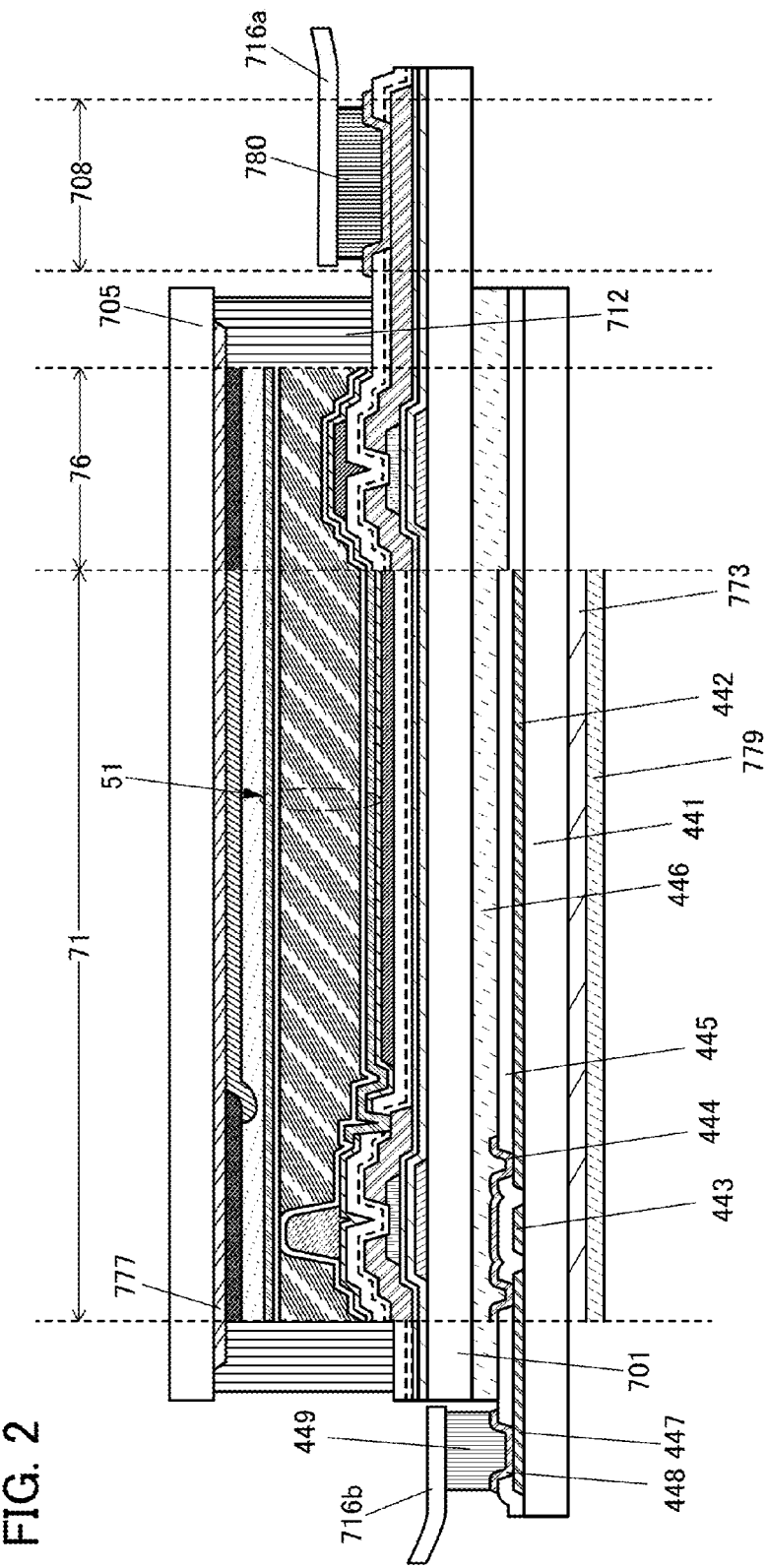
FIG. 2 illustrates a cross-sectional view of an example of a display device.

FIG. 2 illustrates a structural example in which a touch sensor is added to the structure of FIG. 1B. Specifically, the display device in FIG. 2 includes a substrate 441, a conductive film 442, a conductive film 443, a conductive film 444, an insulating film 445, an adhesive layer 446, a conductive film 447, and a conductive film 448 in addition to the components in FIG. 1B.

The conductive film 442 and the conductive film 443 are preferably formed using a conductive material which transmits visible light. As a conductive material having a light-transmitting property, a conductive oxide such as indium oxide, indium tin oxide, indium zinc oxide, zinc oxide, or zinc oxide to which gallium is added can be used. Note that a film including graphene may be used as well. The film including graphene can be formed, for example, by reducing a film containing graphene oxide.

Alternatively, a metal film or an alloy film which is thin enough to have a light-transmitting property can be used for the conductive films 442 and 443. For example, a metal such as gold, silver, platinum, magnesium, nickel, tungsten, chromium, molybdenum, iron, cobalt, copper, palladium, or titanium, or an alloy containing any of these metals can be used. Alternatively, a nitride of the metal or the alloy (e.g., titanium nitride), or the like may be used. Alternatively, a stacked film in which two or more of conductive films containing the above materials are stacked may be used.

For the conductive films 442 and 443, a conductive film that is processed to be thin enough to be invisible to the users may be used. Such a conductive film is processed into a lattice shape (a mesh shape), for example, which makes it possible to achieve both high conductivity and high visibility of the display device. It is preferable that the conductive film have a portion in which the width is greater than or equal to 30 nm and less than or equal to 100 μm, preferably greater than or equal to 50 nm and less than or equal to 50 μm, and further preferably greater than or equal to 50 nm and less than or equal to 20 μm. In particular, the conductive film having the pattern width of 10 μm or less is hardly visible to the users, which is preferable.

For the conductive films 442 and 443, a metal nanowire such as an Ag nanowire, a Cu nanowire, or an Al nanowire or a conductive nanowire such as a carbon nanotube can be used.

The conductive film 447 can be formed through the same process as the conductive films 442 and 443. The conductive film 448 can be formed through the same process as the conductive film 444. The conductive film 448 may have a function of suppressing oxidation of a surface of the conductive film 447. The conductive film 447 is electrically connected to a terminal included in an FPC 716b through an anisotropic conductive film 449 and the conductive film 448.

The circularly polarizing plate 779 and a diffusion film 773 are provided on a side of the substrate 441 opposite to the side on which the touch sensor is provided. Note that the stacking order of the circularly polarizing plate 779 and the diffusion film 773 is not limited to that in FIG. 2. The diffusion film can diffuse light and improve viewing angle characteristics.

Figure 3A:
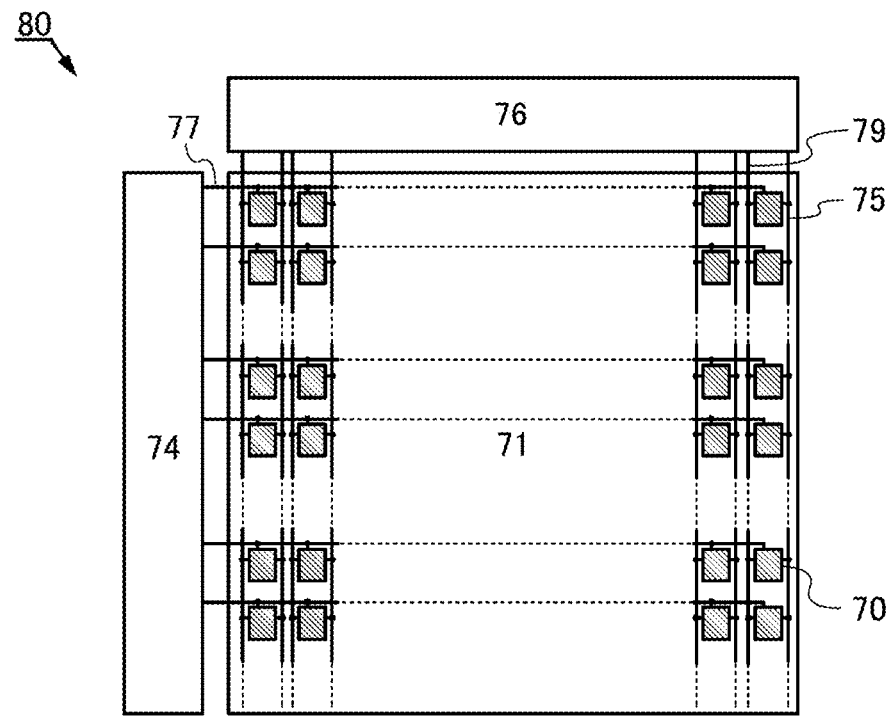
FIGS. 3A and 3B illustrate a block diagram of an example of a display device and a circuit diagram of an example of a pixel.

FIG. 3A illustrates a configuration of the display device 80. As illustrated in FIG. 3A, the display device 80 includes the pixel portion 71; the scan line driver circuit 74; the signal line driver circuit 76; m scan lines 77 which are arranged parallel or substantially parallel to each other and whose potentials are controlled by the scan line driver circuit 74; and n signal lines 79 which are arranged parallel or substantially parallel to each other and whose potentials are controlled by the signal line driver circuit 76. Furthermore, the pixel portion 71 includes a plurality of pixels 70 arranged in a matrix. Common lines 75 arranged parallel or substantially parallel to each other may further be provided along the signal lines 79. The scan line driver circuit 74 and the signal line driver circuit 76 are collectively referred to as a driver circuit portion in some cases.

Each of the scan lines 77 is electrically connected to the n pixels 70 in the corresponding row among the pixels 70 arranged in m rows and n columns in the pixel portion 71. Each of the signal lines 79 is electrically connected to the m pixels 70 in the corresponding column among the pixels 70 arranged in m rows and n columns. Note that m and n are each an integer of 1 or more. Each of the common lines 75 is electrically connected to the m pixels 70 in the corresponding column among the pixels 70 arranged in m rows and n columns.

Figure 3B:
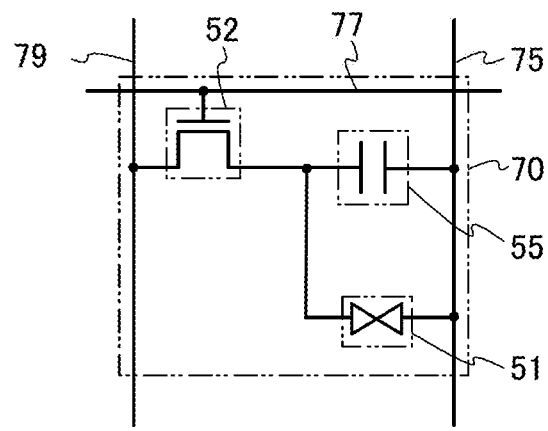

FIG. 3B illustrates an example of a circuit configuration that can be used for the pixels 70 in the display device 80 illustrated in FIG. 3A.

The pixel 70 in FIG. 3B includes the liquid crystal element 51, the transistor 52, and the capacitor 55.

One of a pair of electrodes of the liquid crystal element 51 is connected to the transistor 52, and the potential thereof is set as appropriate according to the specifications of the pixel 70. The other of the pair of electrodes of the liquid crystal element 51 is connected to the common line 75, and a common potential is applied thereto. The alignment of liquid crystal included in the liquid crystal element 51 is controlled in accordance with data written to the transistor 52.

In the pixel 70 illustrated in FIG. 3B, one of a source electrode and a drain electrode of the transistor 52 is electrically connected to the signal line 79, and the other of the source electrode and the drain electrode of the transistor 52 is electrically connected to the one of the pair of electrodes of the liquid crystal element 51. A gate electrode of the transistor 52 is electrically connected to the scan line 77. The transistor 52 has a function of controlling whether to write a data signal.

In the configuration of the pixel 70 illustrated in FIG. 3B, one of a pair of electrodes of the capacitor 55 is connected to the other of the source electrode and the drain electrode of the transistor 52. The other of the pair of electrodes of the capacitor 55 is electrically connected to the common line 75. The potential of the common line 75 is set as appropriate according to the specifications of the pixel 70. The capacitor 55 functions as a storage capacitor for storing written data.

In the display device 80 driven in the FFS mode, the one of the pair of electrodes of the capacitor 55 corresponds to part or the whole of the one of the pair of electrodes of the liquid crystal element 51, and the other of the pair of electrodes of the capacitor 55 corresponds to part or the whole of the other of the pair of electrodes of the liquid crystal element 51.

Next, a display device of one embodiment of the present invention which has a structure different from those in FIGS. 1A and 1B and FIG. 2 will be described. Note that the above description can be referred to for components which are similar to those in the above structures; thus, details thereof may be omitted in some cases.

Structural Example 2

In Structural example 2, the display device 80 driven in the FFS mode will be described.

Figure 4:
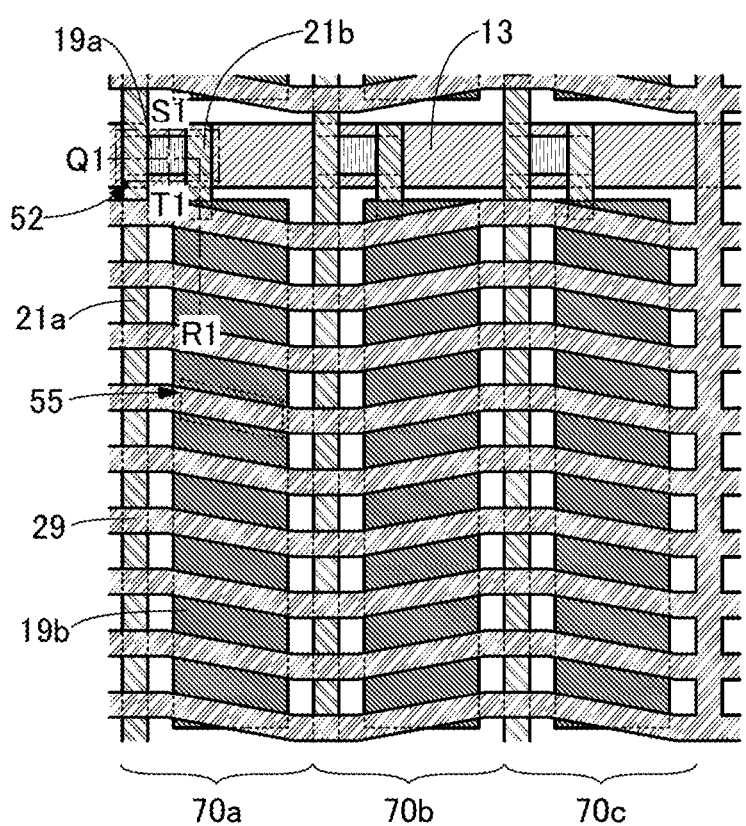
FIG. 4 illustrates a top view of an example of a pixel.

FIG. 4 illustrates a top view of pixels 70a, 70b, and 70c included in the display device 80.

In FIG. 4, a conductive film 13 functioning as a scan line extends substantially perpendicularly to a signal line (in the horizontal direction in the drawing). A conductive film 21a functioning as a signal line extends substantially perpendicularly to a scan line (in the vertical direction in the drawing). Note that the conductive film 13 functioning as a scan line is electrically connected to the scan line driver circuit 74, and the conductive film 21a functioning as a signal line is electrically connected to the signal line driver circuit 76 (FIG. 3A).

The transistor 52 is provided near the intersection of the scan line and the signal line. The transistor 52 includes the conductive film 13 functioning as a gate electrode; a gate insulating film (not illustrated in FIG. 4); an oxide semiconductor film 19a over the gate insulating film, where a channel region is formed; and the conductive film 21a and a conductive film 21b functioning as a source electrode and a drain electrode. The conductive film 13 also functions as a scan line, and a region of the conductive film 13 that overlaps with the oxide semiconductor film 19a functions as the gate electrode of the transistor 52. In addition, the conductive film 21a also functions as a signal line, and a region of the conductive film 21a that overlaps with the oxide semiconductor film 19a functions as the source electrode or the drain electrode of the transistor 52. Furthermore, in the top view of FIG. 4, an end portion of the scan line is positioned on an outer side of an end portion of the oxide semiconductor film 19a. Thus, the scan line functions as a light-blocking film for blocking external light. For this reason, the oxide semiconductor film 19a included in the transistor is not irradiated with light, so that a change in the electrical characteristics of the transistor can be suppressed.

The conductive film 21b is electrically connected to an oxide conductor film 19b functioning as a pixel electrode. A common electrode 29 is provided over the oxide conductor film 19b with an insulating film (not illustrated in FIG. 4) provided therebetween.

The common electrode 29 includes stripe regions extending in a direction intersecting with the signal line. The stripe regions are connected to a region extending in a direction parallel or substantially parallel to the signal line. Accordingly, the stripe regions of the common electrode 29 are at the same potential in the plurality of pixels included in the display device 80.

The capacitor 55 is formed in a region where the oxide conductor film 19b and the common electrode 29 overlap with each other. The oxide conductor film 19b and the common electrode 29 each have a light-transmitting property. That is, the capacitor 55 has a light-transmitting property.

Note that an oxide conductor film can be used as the common electrode 29 in one embodiment of the present invention. For example, an oxide conductor film containing the same metal as the oxide semiconductor layer included in the transistor 52 may be used as each of the oxide conductor film 19b and the common electrode 29. Alternatively, an oxide conductor film containing the same metal as the oxide semiconductor layer included in the transistor 52 may be used only as the common electrode 29, and the oxide conductor film 19b may be a conductive film made of another conductive material which transmits visible light.

FIG. 5A illustrates cross-sectional views taken along dashed-dotted line Q1-R1 and dashed-dotted line S1-T1 in FIG. 4. The transistor 52 illustrated in FIG. 5A is a channel-etched transistor. Note that the transistor 52 in the channel length direction and the capacitor 55 are illustrated in the cross-sectional view taken along dashed-dotted line Q1-R1, and the transistor 52 in the channel width direction is illustrated in the cross-sectional view taken along dashed-dotted line S1-T1. The channel length direction of a transistor in this specification refers to a direction in which a carrier moves between a source (a source region or a source electrode) and a drain (a drain region or a drain electrode), and the channel width direction refers to a direction perpendicular to the channel length direction in a plane parallel to a substrate.

The transistor 52 in FIG. 5A has a single-gate structure and includes the conductive film 13 functioning as a gate electrode over a substrate 11. In addition, the transistor 52 includes an insulating film 15 formed over the substrate 11 and the conductive film 13, an insulating film 17 formed over the insulating film 15, the oxide semiconductor film 19a overlapping with the conductive film 13 with the insulating film 15 and the insulating film 17 provided therebetween, and the conductive films 21a and 21b functioning as a source electrode and a drain electrode which are in contact with the oxide semiconductor film 19a. Moreover, an insulating film 23 is formed over the insulating film 17, the oxide semiconductor film 19a, and the conductive films 21a and 21b, and an insulating film 25 is formed over the insulating film 23. The oxide conductor film 19b is formed over the insulating film 25. The oxide conductor film 19b is electrically connected to one of the conductive films 21a and 21b (here, the conductive film 21b) through an opening provided in the insulating film 23 and the insulating film 25. An insulating film 27 is formed over the insulating film 25 and the oxide conductor film 19b. The common electrode 29 is formed over the insulating film 27.

FIG. 5A illustrates the case where a liquid crystal layer 50 is positioned between the substrate 11 and a substrate 41. The reflective film 777, a light-blocking film 61 functioning as a black matrix, a coloring film 62 functioning as a color filter, and the like are provided on a side of the substrate 41 facing the substrate 11.

A conductive film may be provided over the insulating film 25 so as to overlap with the oxide semiconductor film 19a, in which case the transistor 52 has a double-gate structure in which the conductive film is used as a second gate electrode. The conductive film can be formed with the same material at the same time as the oxide conductor film 19b.

A region where the oxide conductor film 19b, the insulating film 27, and the common electrode 29 overlap with one another functions as the capacitor 55.

Note that one embodiment of the present invention is not limited to the structure in FIG. 5A. For example, the oxide conductor film 19b may have a slit. Alternatively, the oxide conductor film 19b may have a comb-like shape.

FIG. 5A illustrates an example in which the thickness of part of the oxide semiconductor film 19a is decreased. For example, when another film is processed by etching, part of the oxide semiconductor film 19a might be etched to be thinned because of overetching. However, one embodiment of the present invention is not limited to this example. A structure in which the thickness of the oxide semiconductor film 19a is hardly decreased as illustrated in FIG. 5B is also one embodiment of the present invention. In addition, as illustrated in FIG. 5C, a channel-protective transistor may be formed by forming an insulating film 20 or the like over the oxide semiconductor film 19a. Furthermore, a top-gate transistor illustrated in FIG. 5D may be employed.

Figure 6:
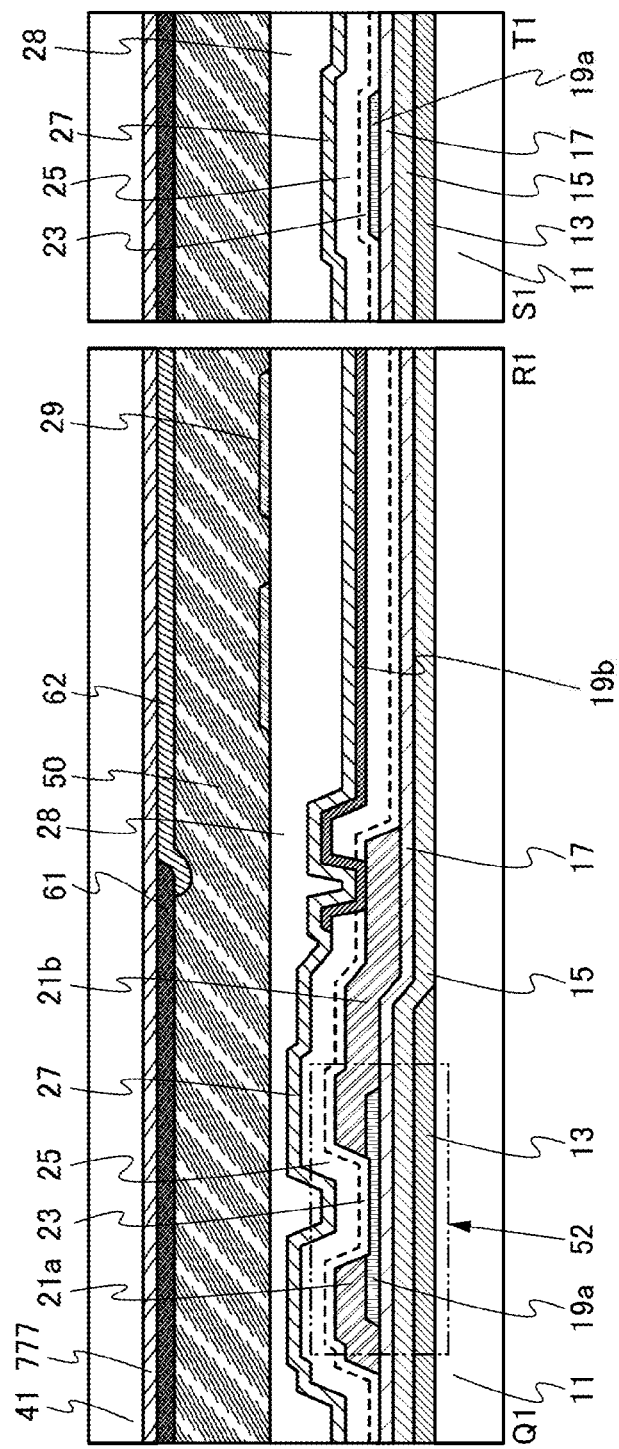
FIG. 6 illustrates cross-sectional views of an example of a display device.

Note that the common electrode 29 may be provided over an insulating film 28 which is provided over the insulating film 27 as illustrated in FIG. 6. The insulating film 28 functions as a planarization film.

Structural Example 3

Figure 7:
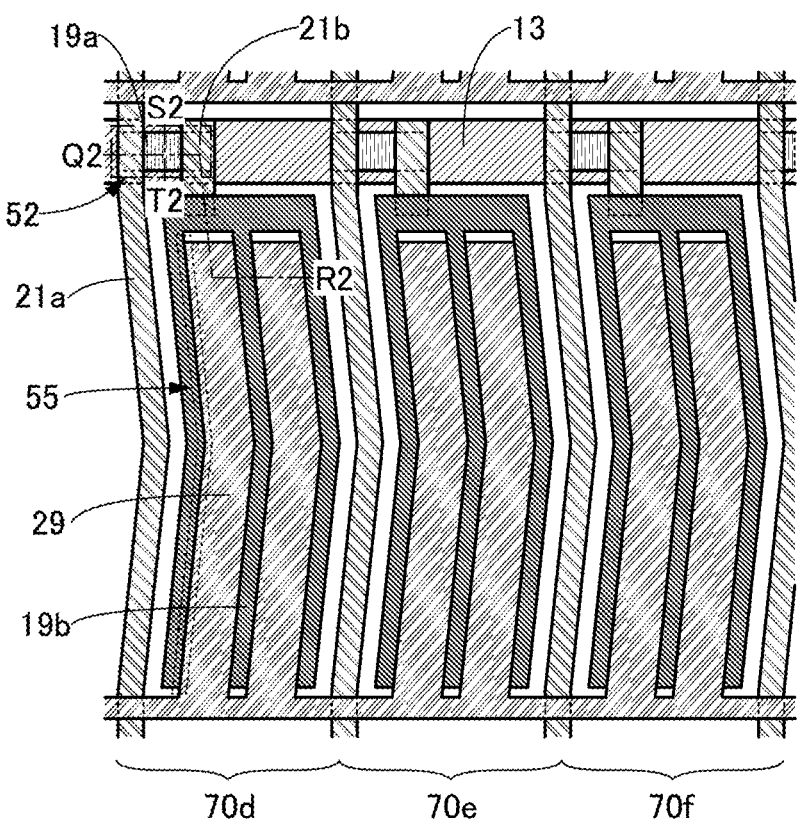
FIG. 7 illustrates a top view of an example of a pixel.

FIG. 7 illustrates a top view of pixels 70d, 70e, and 70f included in the display device 80.

In FIG. 7, the conductive film 13 functioning as a scan line extends in the horizontal direction in the drawing. The conductive film 21a functioning as a signal line extends substantially perpendicularly to a scan line (in the vertical direction in the drawing) and has a dogleg shape (V-like shape). Note that the conductive film 13 functioning as a scan line is electrically connected to the scan line driver circuit 74, and the conductive film 21a functioning as a signal line is electrically connected to the signal line driver circuit 76 (FIG. 3A).

The transistor 52 is provided near the intersection of the scan line and the signal line. The transistor 52 includes the conductive film 13 functioning as a gate electrode; a gate insulating film (not illustrated in FIG. 7); the oxide semiconductor film 19a over the gate insulating film, where a channel region is formed; and the conductive films 21a and 21b functioning as a source electrode and a drain electrode. The conductive film 13 also functions as a scan line, and a region of the conductive film 13 that overlaps with the oxide semiconductor film 19a functions as the gate electrode of the transistor 52. In addition, the conductive film 21a also functions as a signal line, and a region of the conductive film 21a that overlaps with the oxide semiconductor film 19a functions as the source electrode or the drain electrode of the transistor 52. Furthermore, in the top view of FIG. 7, an end portion of the scan line is positioned on an outer side of an end portion of the oxide semiconductor film 19a. Thus, the scan line functions as a light-blocking film for blocking external light. For this reason, the oxide semiconductor film 19a included in the transistor is not irradiated with light, so that a change in the electrical characteristics of the transistor can be suppressed.

The conductive film 21b is electrically connected to the oxide conductor film 19b functioning as a pixel electrode. The oxide conductor film 19b is formed in a comb-like shape. An insulating film (not illustrated in FIG. 7) is provided over the oxide conductor film 19b, and the common electrode 29 is provided over the insulating film. The common electrode 29 is formed in a comb-like shape to partly overlap and engage with the oxide conductor film 19b when seen from the above. Comb-teeth regions of the common electrode 29 are connected to a region extending in the direction parallel or substantially parallel to the scan line. Accordingly, the comb-teeth regions of the common electrode 29 are at the same potential in the plurality of pixels included in the display device 80. Note that the oxide conductor film 19b and the common electrode 29 each have a dogleg shape (V-like shape) bent along the signal line (the conductive film 21a).

The capacitor 55 is formed in a region where the oxide conductor film 19b and the common electrode 29 overlap with each other. The oxide conductor film 19b and the common electrode 29 each have a light-transmitting property. That is, the capacitor 55 has a light-transmitting property.

Figure 8:
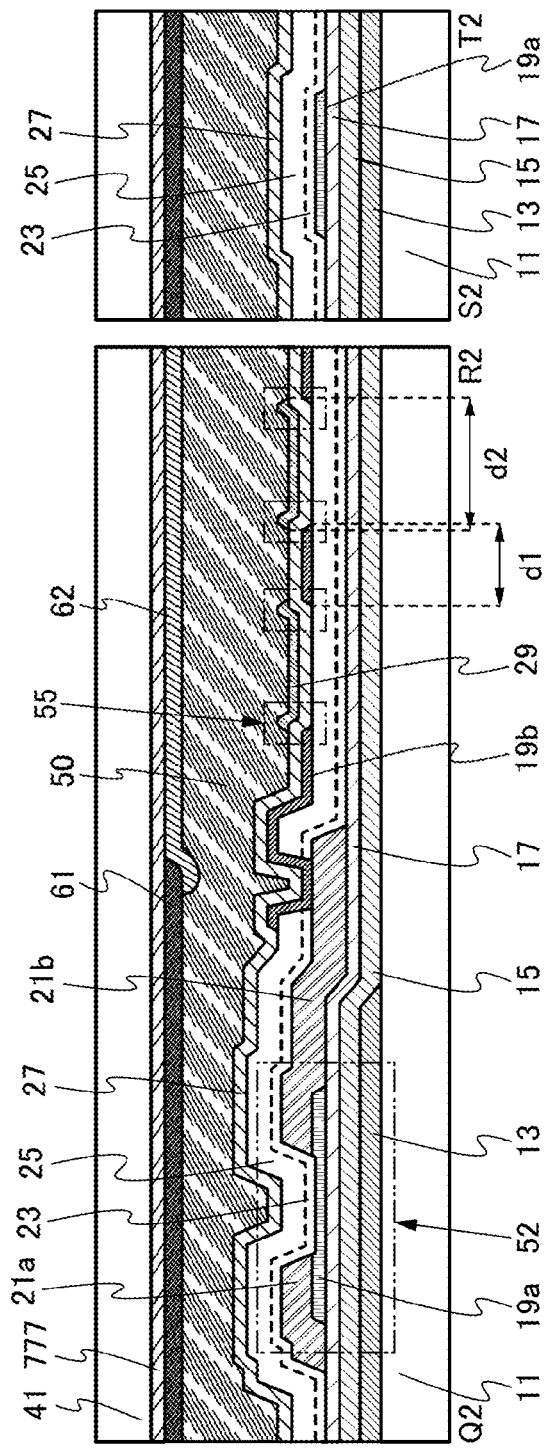
FIG. 8 illustrates cross-sectional views of an example of a display device.

FIG. 8 illustrates cross-sectional views taken along dashed-dotted line Q2-R2 and dashed-dotted line S2-T2 in FIG. 7. The transistor 52 illustrated in FIG. 8 is a channel-etched transistor. Note that the transistor 52 in the channel length direction and the capacitor 55 are illustrated in the cross-sectional view taken along dashed-dotted line Q2-R2, and the transistor 52 in the channel width direction is illustrated in the cross-sectional view taken along dashed-dotted line S2-T2.

In a region of the pixel illustrated in FIG. 8 where the alignment of a liquid crystal provided over the insulating film 27 and the common electrode 29 is controlled, the oxide conductor film 19b functioning as a pixel electrode is provided over the insulating film 25 and the common electrode 29 is provided over the insulating film 27. A method for driving a display device in which the alignment of the liquid crystal is controlled by generating an electric field between such a pair of electrodes located on different planes can be referred to as a differential-plane-switching (DPS) mode.

A conductive film may be provided over the insulating film 25 so as to overlap with the oxide semiconductor film 19a, in which case the transistor 52 has a double-gate structure in which the conductive film is used as a second gate electrode. The conductive film can be formed with the same material at the same time as the oxide conductor film 19b.

A region where the oxide conductor film 19b, the insulating film 27, and the common electrode 29 overlap with one another functions as the capacitor 55.

In the liquid crystal display device in FIG. 7 and FIG. 8, a capacitor in a pixel is formed in regions in which end portions of the oxide conductor film 19b and end portions of the common electrode 29 overlap with each other. With this structure, a capacitor with a suitable size, not a too large size, can be formed in a large liquid crystal display device.

Figure 9:
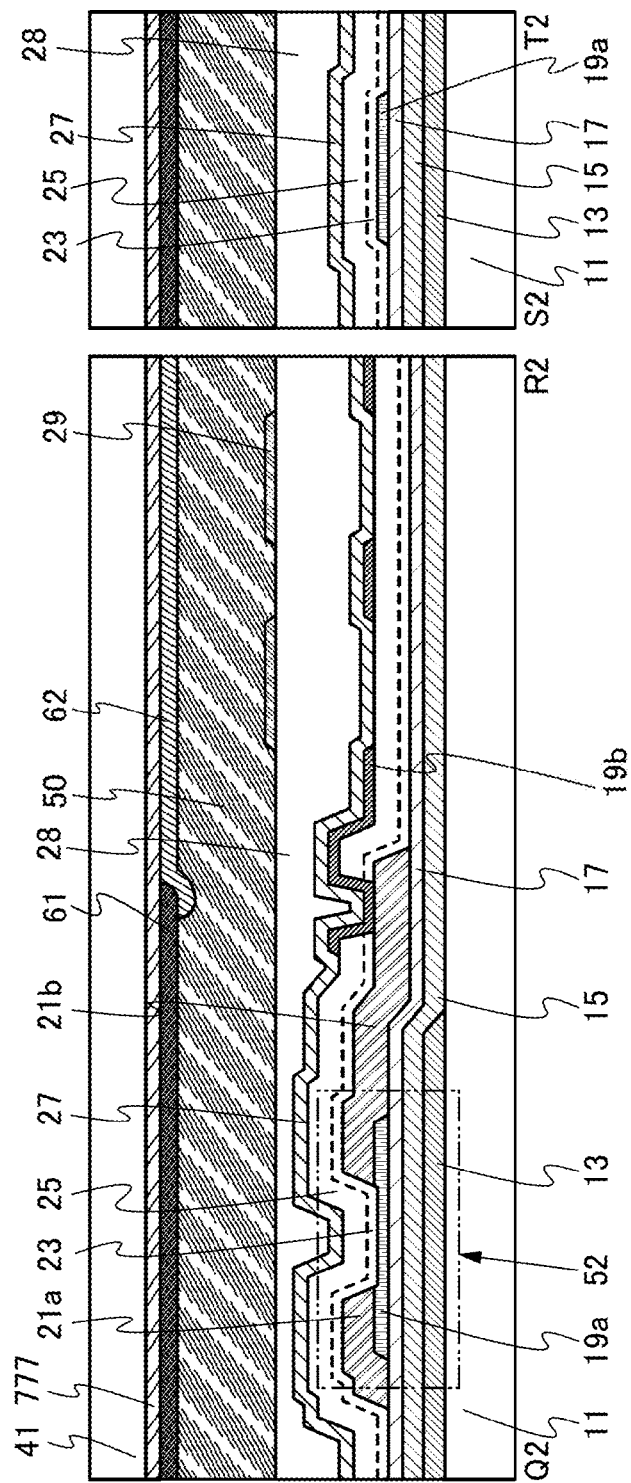
FIG. 9 illustrates cross-sectional views of an example of a display device.

Note that the common electrode 29 may be provided over the insulating film 28 which is provided over the insulating film 27 as illustrated in FIG. 9.

Figure 10:
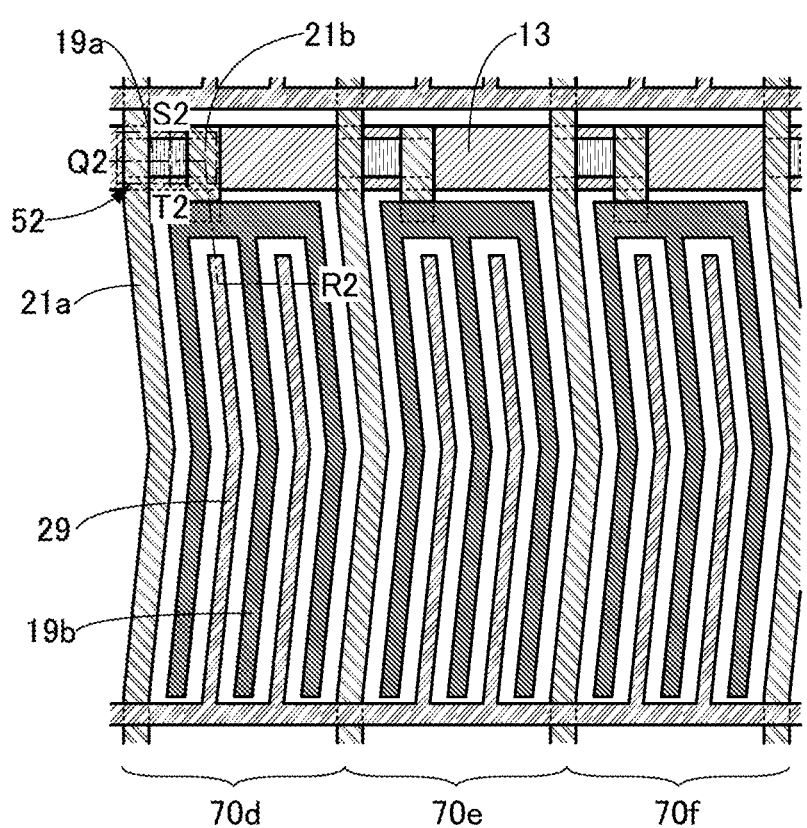
FIG. 10 illustrates a top view of an example of a pixel.
Figure 11:
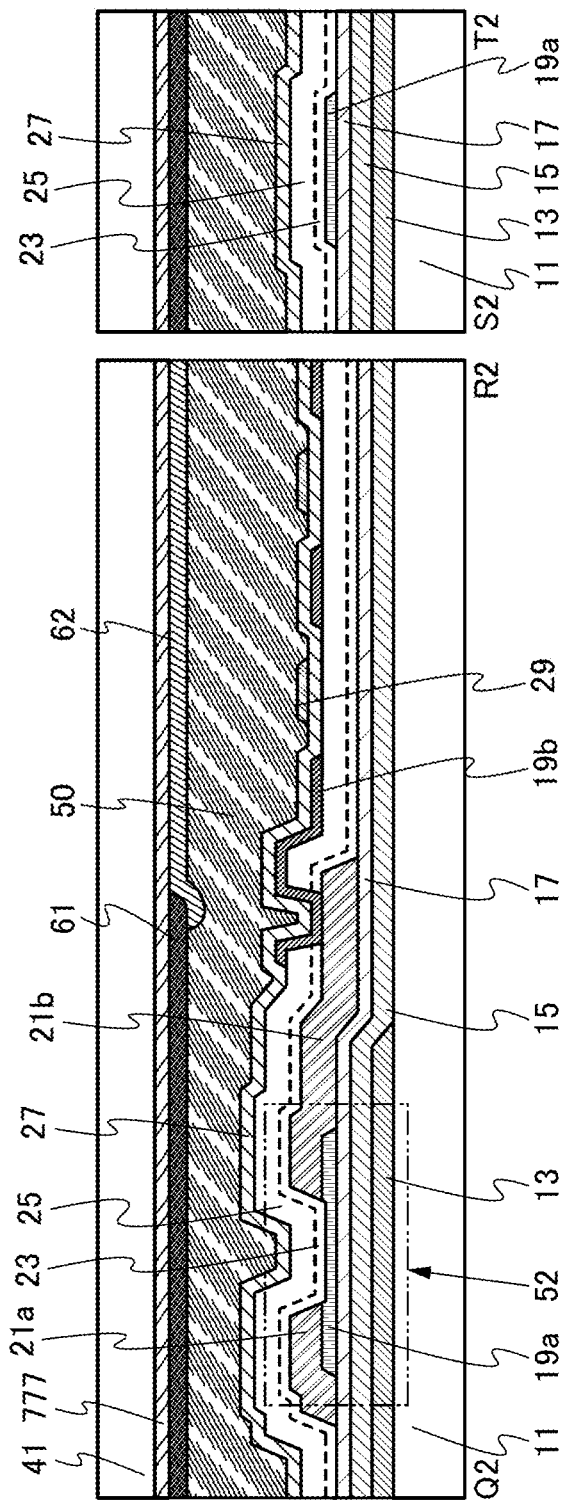
FIG. 11 illustrates cross-sectional views of an example of a display device.
Figure 12:
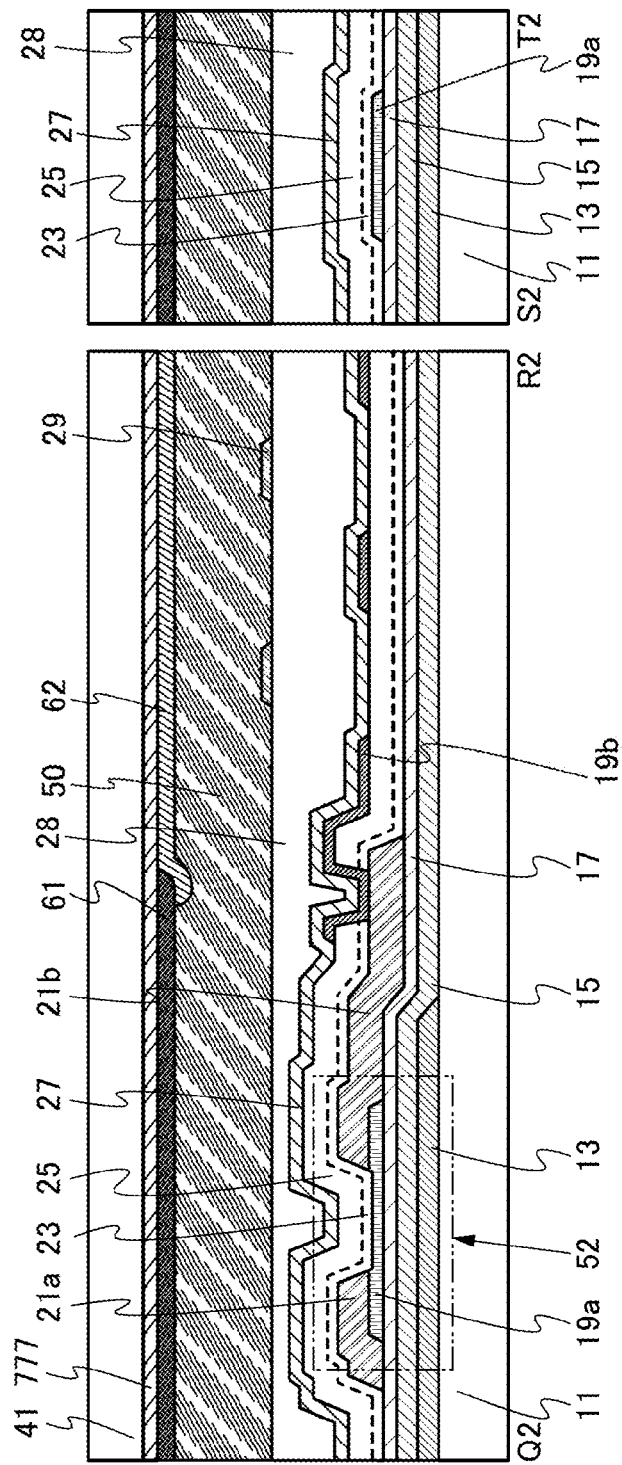
FIG. 12 illustrates cross-sectional views of an example of a display device.

As illustrated in FIG. 10 and FIG. 11, a structure in which the oxide conductor film 19b and the common electrode 29 do not overlap with each other may be employed. The positions of the oxide conductor film 19b and the common electrode 29 can be set as appropriate depending on the size of the capacitor in accordance with the resolution and driving method of the display device. Note that the common electrode 29 included in the display device illustrated in FIG. 11 may be provided over the insulating film 28 functioning as a planarization film (FIG. 12).

Figure 13:
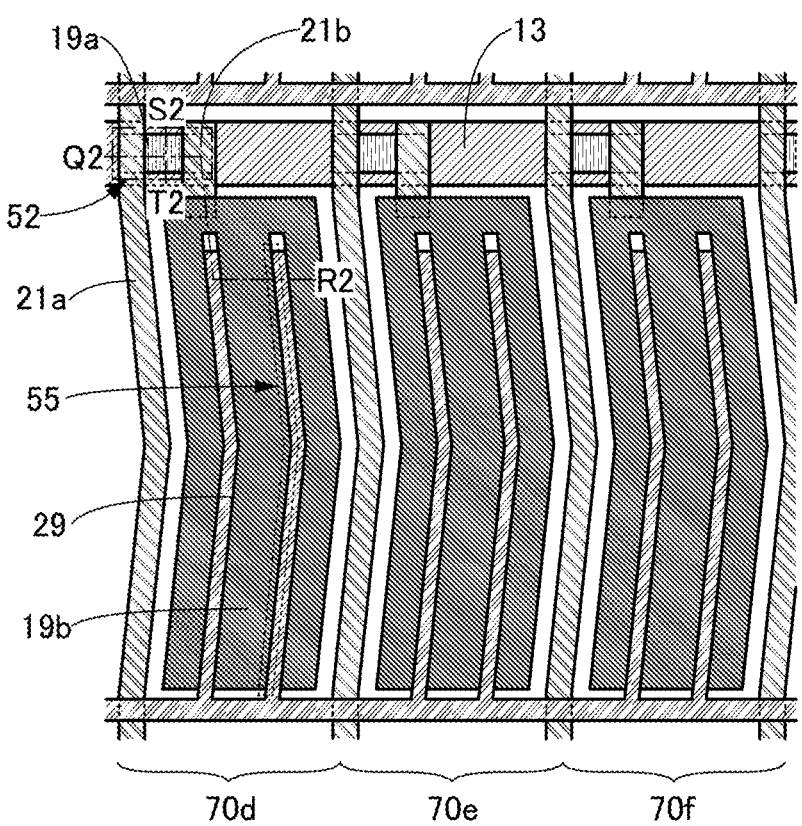
FIG. 13 illustrates a top view of an example of a pixel.
Figure 14:
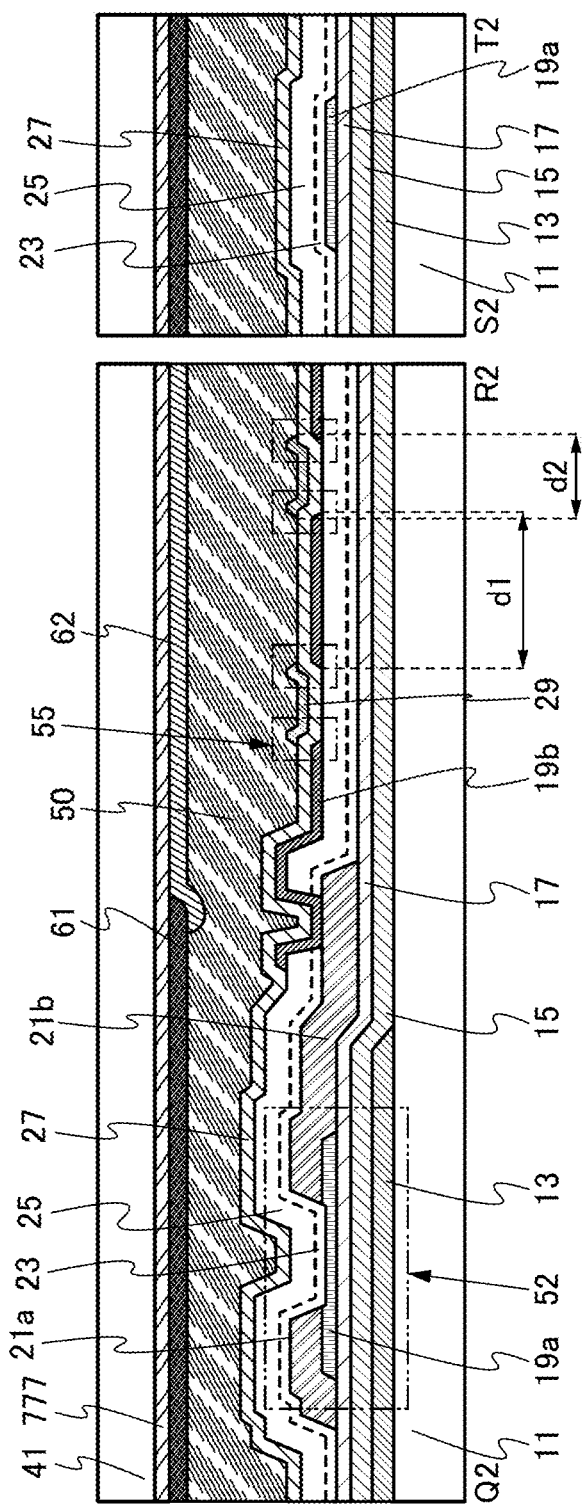
FIG. 14 illustrates cross-sectional views of an example of a display device.

In the liquid crystal display device in FIG. 7 and FIG. 8, a width (d1) of a region of the oxide conductor film 19b extending in the direction parallel or substantially parallel to the signal line (the conductive film 21a) is smaller than a width (d2) of a region of the common electrode 29 extending in the direction parallel or substantially parallel to the signal line, but the widths are not limited to this relation. As illustrated in FIG. 13 and FIG. 14, the width d1 may be larger than the width d2. Alternatively, the width d1 may be equal to the width d2. Further alternatively, in a pixel (e.g., the pixel 70d), the widths of a plurality of regions of the oxide conductor film 19b and/or the common electrode 29 extending in the direction parallel or substantially parallel to the signal line may be different from one another.

Figure 15:
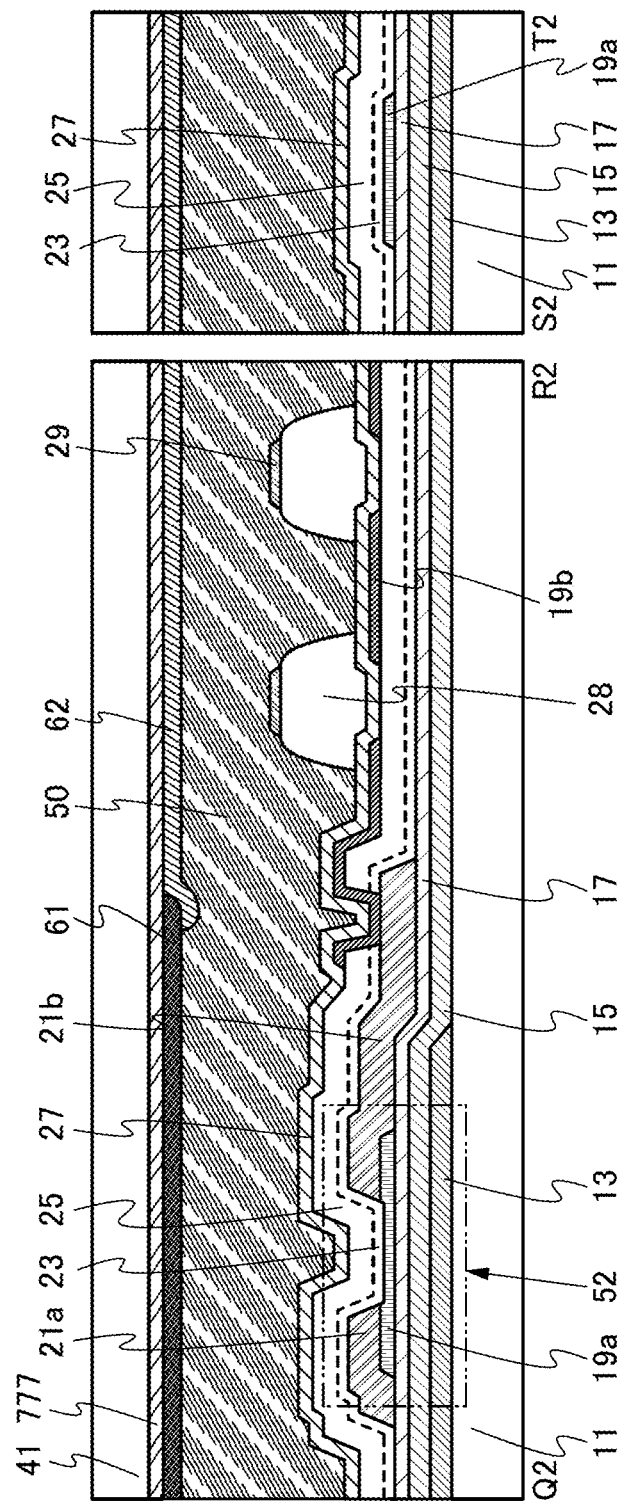
FIG. 15 illustrates cross-sectional views of an example of a display device.
Figure 16:
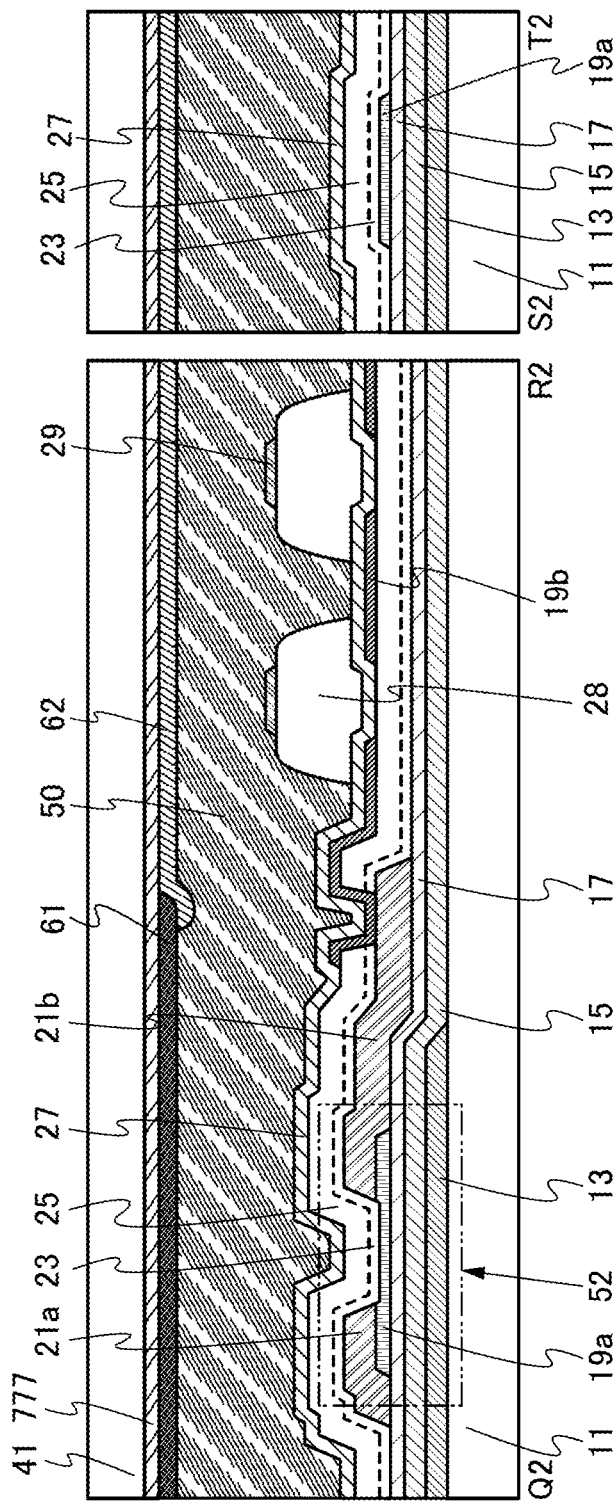
FIG. 16 illustrates cross-sectional views of an example of a display device.

As illustrated in FIG. 15, a structure in which the insulating film 28 over the insulating film 27 is removed such that only a region under the common electrode 29 is left may be employed. In this case, the insulating film 28 can be etched using the common electrode 29 as a mask. Surface unevenness of the common electrode 29 over the insulating film 28 functioning as a planarization film can be suppressed, and the insulating film 28 can have a gently sloping side surface from an end portion of the common electrode 29 to the insulating film 27. As illustrated in FIG. 16, a structure in which part of a surface of the insulating film 28 parallel to the substrate 11 is not covered with the common electrode 29 may be employed.

Figure 17:
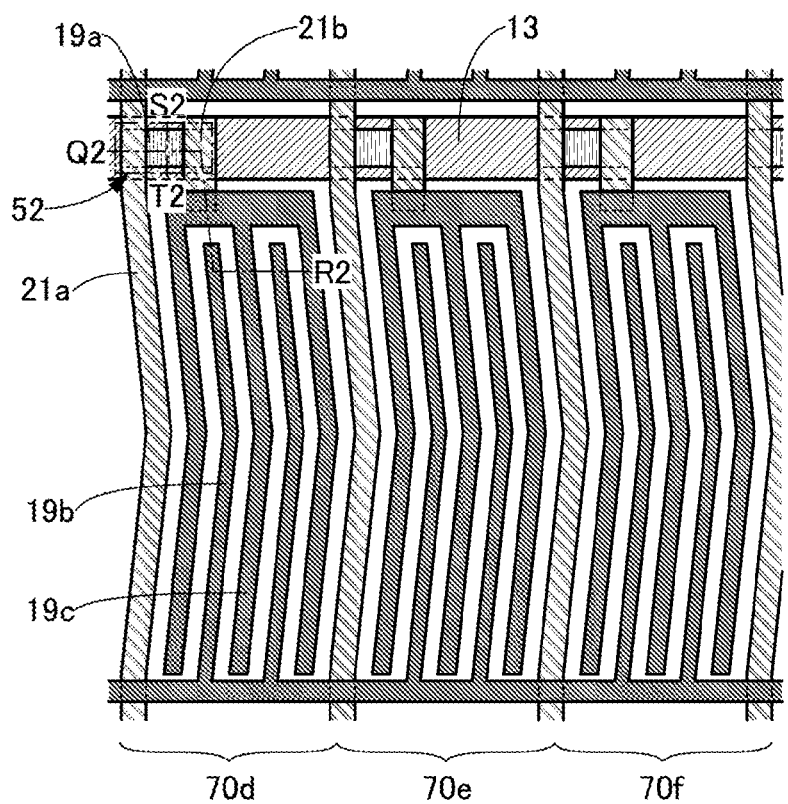
FIG. 17 illustrates a top view of an example of a pixel.
Figure 18:
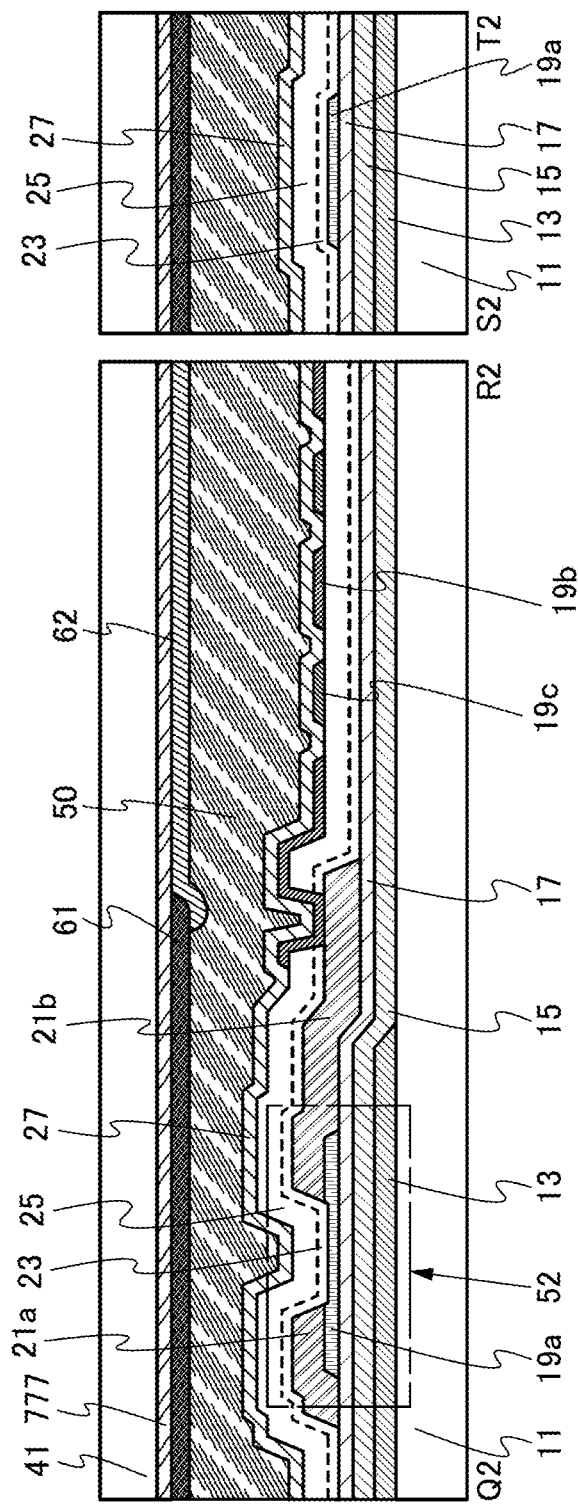
FIG. 18 illustrates cross-sectional views of an example of a display device.

As illustrated in FIG. 17 and FIG. 18, a common electrode and the oxide conductor film 19b may be formed on the same layer, that is, on the insulating film 25. A common electrode 19c in FIG. 17 and FIG. 18 can be formed with the same material at the same time as the oxide conductor film 19b.

Structural Example 4

Figure 19A:
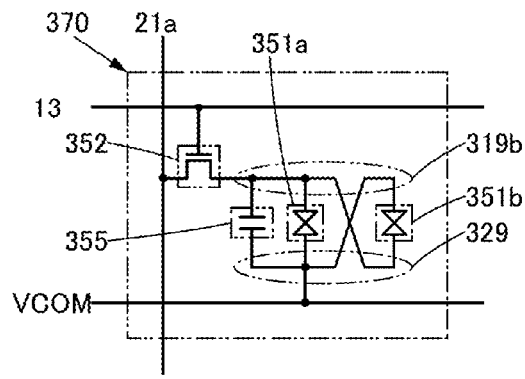
FIGS. 19A and 19B illustrate a circuit diagram and a top view of an example of a pixel.
Figure 19B:
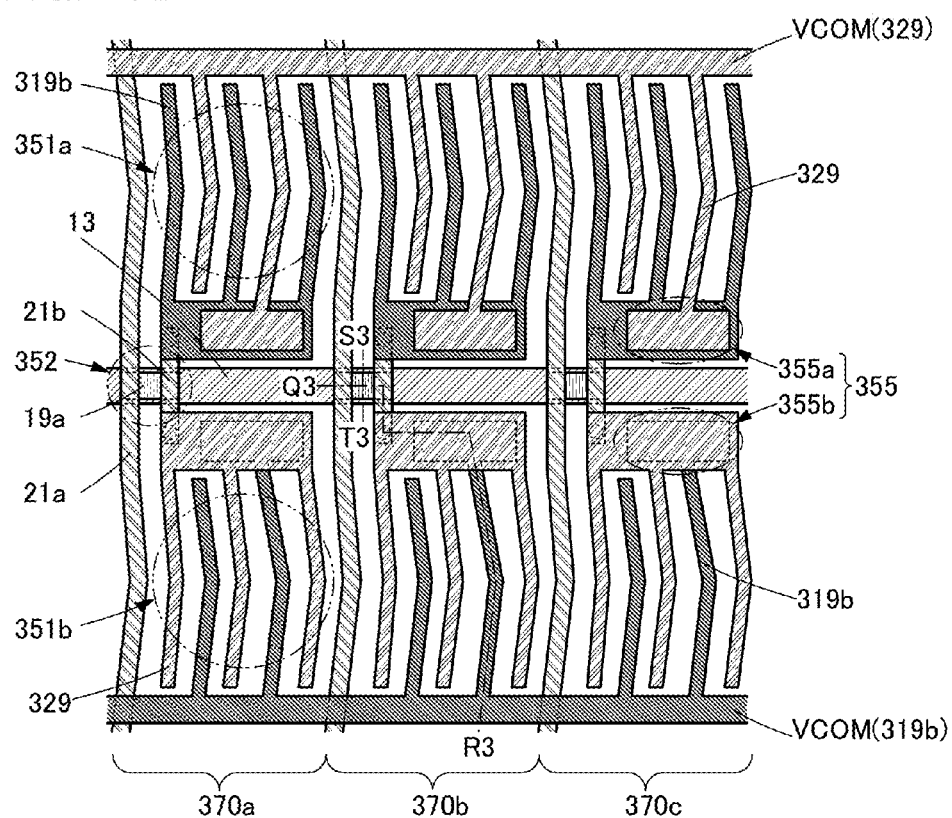
Figure 20:
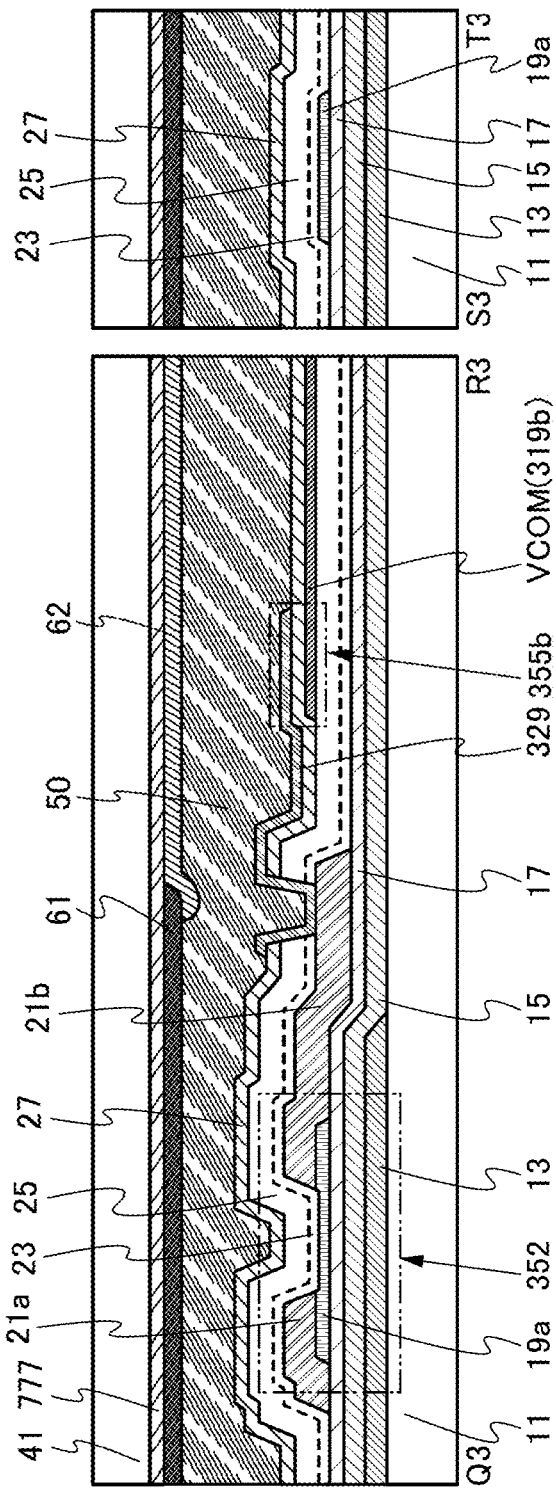
FIG. 20 illustrates cross-sectional views of an example of a display device.

First, a configuration of each of a plurality of pixels 370 included in the display device 80 will be described. FIG. 19A illustrates an example of a circuit configuration of the pixel 370. FIG. 19B illustrates a top view of pixels 370a, 370b, and 370c included in the display device 80. FIG. 20 illustrates cross-sectional views taken along dashed-dotted line Q3-R3 and dashed-dotted line S3-T3 in FIG. 19B.

The pixel 370 differs from the pixel 70 illustrated in FIG. 3B in that it includes a liquid crystal element 351a and a liquid crystal element 351b connected in parallel to each other instead of the liquid crystal element 51. Different components are described in detail below, and the above description is referred to for the other similar components. Note that the liquid crystal element 351b is not illustrated in the cross-sectional views of FIG. 20.

An oxide conductor film 319b included in the liquid crystal element 351a is electrically connected to a drain electrode of a transistor 352 and serves as a pixel electrode. In addition, a conductive film 329 included in the liquid crystal element 351a is electrically connected to a wiring VCOM extending in a direction parallel or substantially parallel to the scan line (the conductive film 13) and serves as a common electrode.

A conductive film 329 included in the liquid crystal element 351b is electrically connected to the drain electrode of the transistor 352 and serves as a pixel electrode. In addition, an oxide conductor film 319b included in the liquid crystal element 351b is electrically connected to a wiring VCOM extending in a direction parallel or substantially parallel to the scan line (the conductive film 13) and serves as a common electrode.

The wiring VCOM electrically connected to the conductive film 329 and the wiring VCOM electrically connected to the oxide conductor film 319b are illustrated as one wiring in FIG. 19A, which is a non-limiting example. The wiring VCOM electrically connected to the conductive film 329 and the wiring VCOM electrically connected to the oxide conductor film 319b may have the same potential or different potentials. For example, the wiring VCOM electrically connected to the conductive film 329 and the wiring VCOM electrically connected to the oxide conductor film 319b can have the same potential when they are electrically connected to each other in the scan line driver circuit 74 (FIG. 3A).

A capacitor 355 included in the pixel 370 includes a capacitor 355a and a capacitor 355b. One of a pair of electrodes of the capacitor 355a includes the oxide conductor film 319b and is electrically connected to the drain electrode of the transistor 352. The other of the pair of electrodes of the capacitor 355a includes the conductive film 329. One of a pair of electrodes of the capacitor 355b includes the conductive film 329 and is electrically connected to the drain electrode of the transistor 352. The other of the pair of electrodes of the capacitor 355b includes the oxide conductor film 319b.

Note that an oxide conductor film can be used as the conductive film 329 in one embodiment of the present invention. For example, an oxide conductor film containing the same metal as an oxide semiconductor layer included in the transistor 352 may be used as each of the oxide conductor film 319b and the conductive film 329. Alternatively, an oxide conductor film containing the same metal as the oxide semiconductor layer included in the transistor 352 may be used only as the conductive film 329, and the oxide conductor film 319b may be a conductive film made of another conductive material which transmits visible light.

The liquid crystal element 351a and the liquid crystal element 351b are connected in parallel to each other as described above. Accordingly, characteristics of the liquid crystal elements can be prevented from being asymmetric due to the positions of the oxide conductor film 319b and the conductive film 329 even in the case where the liquid crystal elements are driven with the applied voltage inverted.

Structural Example 5

In Structural example 5, a structure of a pixel of a display device driven in the VA mode will be described.

Figure 21:
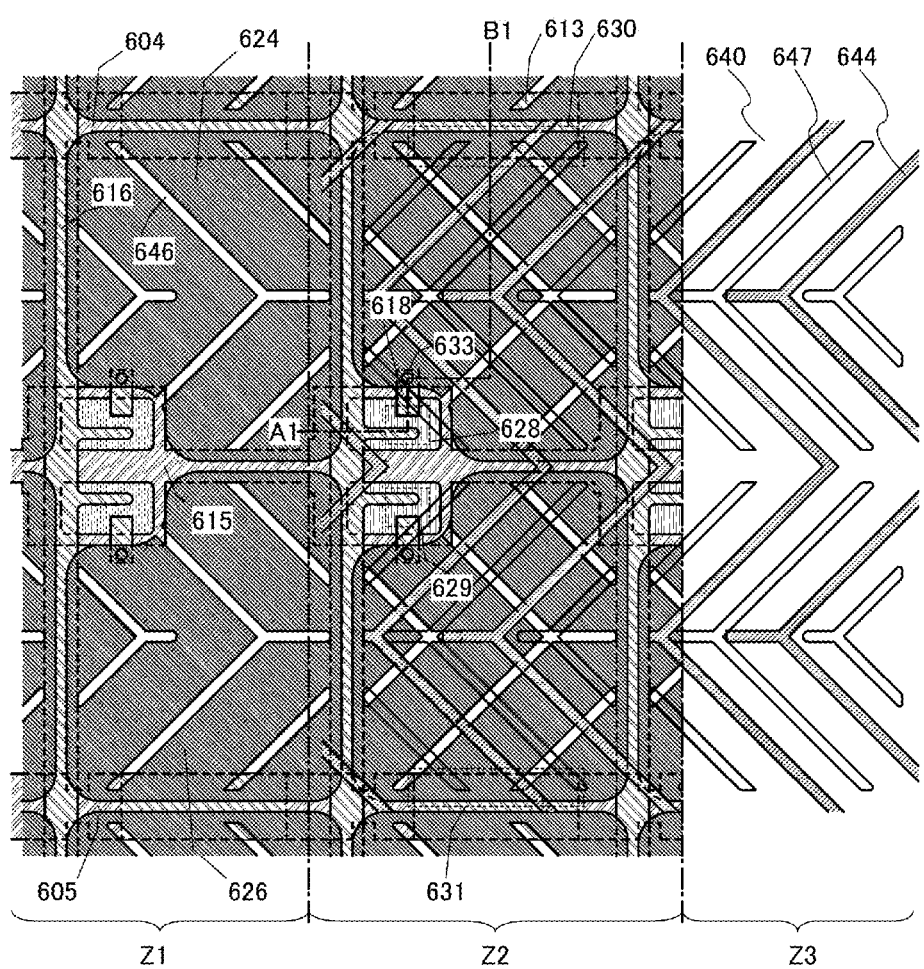
FIG. 21 illustrates a top view of an example of a pixel.
Figure 22:
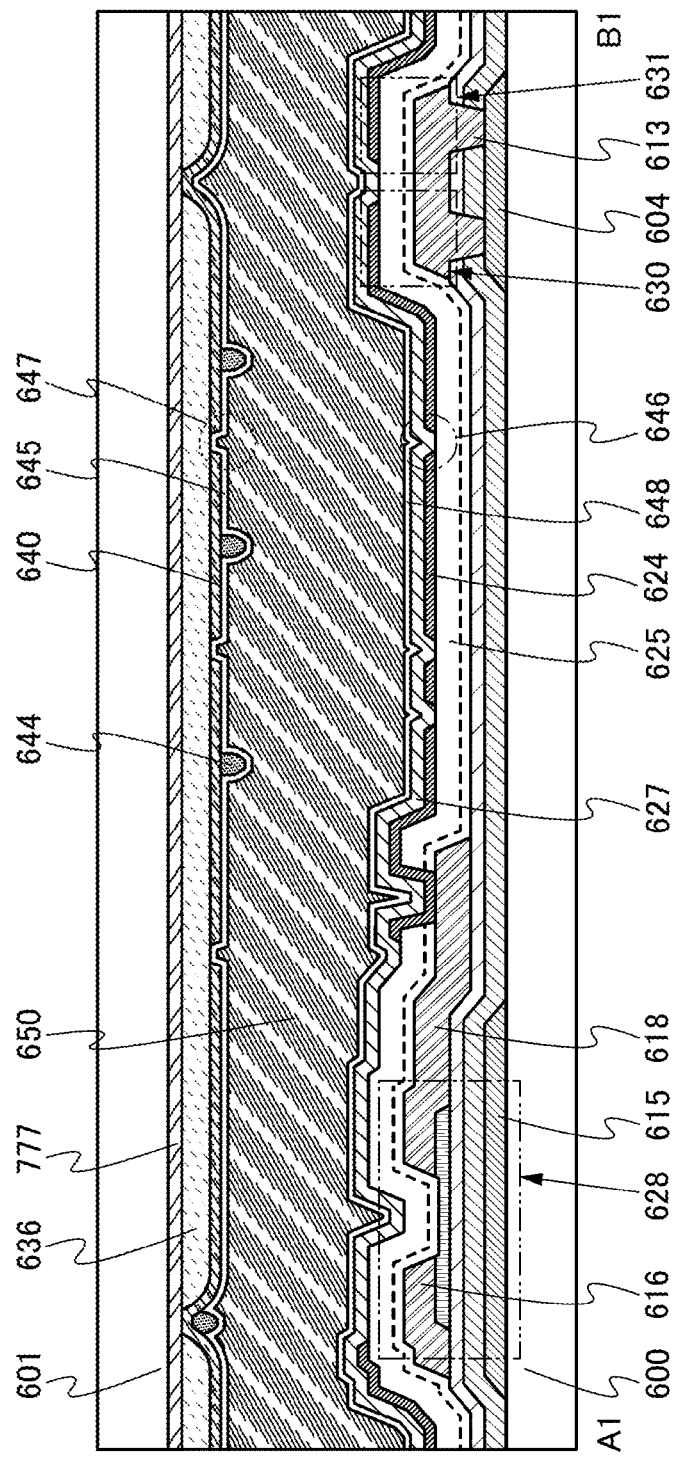
FIG. 22 illustrates a cross-sectional view of an example of a display device.
Figure 23:
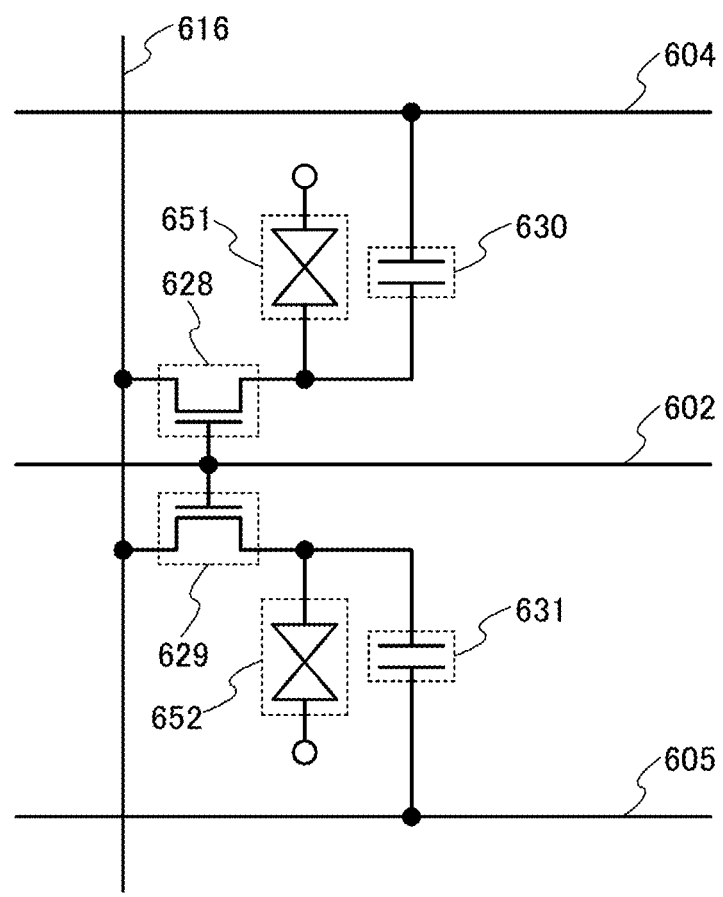
FIG. 23 illustrates a circuit diagram of an example of a pixel.

FIG. 21 illustrates a top view of a pixel included in a liquid crystal display device. FIG. 22 illustrates a cross-sectional view taken along dashed-dotted line A1-B1 in FIG. 21. FIG. 23 illustrates an equivalent circuit diagram of the pixel included in the liquid crystal display device.

The VA mode is a mode for controlling alignment of liquid crystal molecules of a liquid crystal display device. In a VA-mode liquid crystal display device, liquid crystal molecules are aligned in a vertical direction with respect to a display surface when no voltage is applied.

In Structural example 5, in particular, a pixel is divided into some regions (subpixels), and molecules are aligned in different directions in their respective regions. This is referred to as domain multiplication or multi-domain design. A liquid crystal display device of multi-domain design is described below.

In FIG. 21, a region Z1 shows a top view of a substrate 600 provided with an oxide conductor film 624 functioning as a pixel electrode. A region Z3 shows a top view of a substrate 601 provided with a common electrode 640. A region Z2 shows a top view illustrating a state where the substrate 601 provided with the common electrode 640 overlaps with the substrate 600 provided with the oxide conductor film 624.

A transistor 628, the oxide conductor film 624 connected thereto, and a capacitor 630 are formed over the substrate 600. A drain electrode 618 of the transistor 628 is electrically connected to the oxide conductor film 624 through an opening provided in an insulating film 625. An insulating film 627 is provided over the oxide conductor film 624.

The capacitor 630 includes a wiring 613 over a capacitor wiring 604 which is a first capacitor wiring, the insulating film 625, and the oxide conductor film 624. The capacitor wiring 604 can be formed with the same material at the same time as a gate wiring 615 of the transistor 628. The wiring 613 can be formed with the same material at the same time as the drain electrode 618 and a wiring 616.

The oxide conductor film 624 is provided with slits 646. The slits 646 serve to control alignment of the liquid crystal.

A transistor 629, an oxide conductor film 626 functioning as a pixel electrode, and a capacitor 631 can be formed in manners similar to those for the transistor 628, the oxide conductor film 624, and the capacitor 630, respectively. Both the transistors 628 and 629 are connected to the wiring 616. The wiring 616 functions as a source electrode of each of the transistors 628 and 629. The pixel of this liquid crystal display device described in this embodiment includes the oxide conductor films 624 and 626. The oxide conductor films 624 and 626 are subpixels.

The substrate 601 is provided with a reflective film 777, a coloring film 636, and the common electrode 640, and protrusions 644 are formed on the common electrode 640. The common electrode 640 is provided with slits 647. An alignment film 648 is formed over the oxide conductor film 624. Similarly, an alignment film 645 is formed on the common electrode 640 and the protrusions 644. A liquid crystal layer 650 is formed between the substrate 600 and the substrate 601.

The common electrode 640 can be formed using a conductive material which transmits visible light. The common electrode 640 may be formed using a material similar to that of the oxide conductor film 624. The slits 647 formed in the common electrode 640 and the protrusions 644 have a function of controlling the alignment of the liquid crystal.

When a voltage is applied to the oxide conductor film 624 provided with the slits 646, a distorted electric field (an oblique electric field) is generated in the vicinity of the slits 646. The protrusions 644 and the slits 647 on the substrate 601 side and the slits 646 are alternately arranged in an engaging manner; thus, an oblique electric field is effectively generated to control alignment of the liquid crystal, so that the direction of alignment of the liquid crystal varies depending on location. That is, a viewing angle of the liquid crystal display device is widened by domain multiplication. Note that either the protrusions 644 or the slits 647 may be provided on the substrate 601 side.

FIG. 22 illustrates a state where the substrate 600 and the substrate 601 overlap with each other and liquid crystal is injected therebetween. The oxide conductor film 624, the liquid crystal layer 650, and the common electrode 640 overlap with each other to form a liquid crystal element.

FIG. 23 illustrates an equivalent circuit of this pixel structure. Both the transistors 628 and 629 are connected to a gate wiring 602 and the wiring 616. In this case, when potentials of the capacitor wiring 604 and a capacitor wiring 605 are different from each other, operations of a liquid crystal element 651 and a liquid crystal element 652 can be different from each other. That is, alignment of the liquid crystal is precisely controlled and a viewing angle is widened by individual control of potentials of the capacitor wirings 604 and 605.

Note that examples of display elements included in the display device of one embodiment of the present invention include a liquid crystal element, an electroluminescent (EL) element (e.g., an EL element containing organic and inorganic materials, an organic EL element, or an inorganic EL element) including an LED (e.g., a white LED, a red LED, a green LED, or a blue LED), an electrophoretic element, and a display element using micro electro mechanical systems (MEMS).

As a display method in the display device of one embodiment of the present invention, a progressive method, an interlace method, or the like can be employed. Furthermore, color elements controlled in a pixel at the time of color display are not limited to three colors of R, G, and B (R, G, and B correspond to red, green, and blue, respectively). For example, four pixels of an R pixel, a G pixel, a B pixel, and a W (white) pixel may be included. Alternatively, a color element may be composed of two colors among R, G, and B as in PenTile layout. The two colors may differ among color elements. Alternatively, one or more colors of yellow, cyan, magenta, and the like may be added to RGB. The size of a display region may be different between respective dots of the color components. Embodiments of the disclosed invention are not limited to a display device for color display; the disclosed invention can also be applied to a display device for monochrome display.

A coloring film (also referred to as a color filter) may be used in order to obtain a full-color display device. As the coloring film, red (R), green (G), blue (B), yellow (Y), or the like may be combined as appropriate, for example. With the use of the coloring film, higher color reproducibility can be obtained than in the case without the coloring film. In this case, by providing a region with the coloring film and a region without the coloring film, light in the region without the coloring film may be directly utilized for display. By partly providing the region without the coloring film, a decrease in luminance due to the coloring film can be suppressed, and approximately 20% to 30% of power consumption can be reduced in some cases when an image is displayed brightly.

In addition, a backlight (e.g., an organic EL element, an inorganic EL element, an LED, or a fluorescent lamp) may be included. For example, when external light is weak, the backlight may be used to display an image.

The reflective liquid crystal display device of one embodiment of the present invention includes a reflective film on a counter substrate side. In addition, the reflective liquid crystal display device of one embodiment of the present invention includes a capacitor which transmits visible light. Therefore, a decrease in aperture ratio can be suppressed even when the area of the capacitor is increased. Accordingly, the reflective liquid crystal display device consumes less power and can perform favorable display.

This embodiment can be combined with any of the other embodiments as appropriate.

Embodiment 2

In this embodiment, transistors and the like that can be used in a display device of one embodiment of the present invention will be described with reference to FIGS. 24A and 24B, FIGS. 25A and 25B, FIGS. 26A to 26D, FIGS. 27A to 27C, FIGS. 28A to 28C, FIGS. 29A and 29B, FIGS. 30A and 30B, FIGS. 31A to 31D, FIGS. 32A to 32C, FIGS. 33A and 33B, FIGS. 34A to 34D, FIGS. 35A to 35C, FIGS. 36A to 36C, FIGS. 37A to 37D, FIGS. 38A and 38B, and FIGS. 39A to 39D. Note that a structure including a transistor which is described in this embodiment may also be referred to as a semiconductor device in some cases.

Structural Example A

Figure 24A:
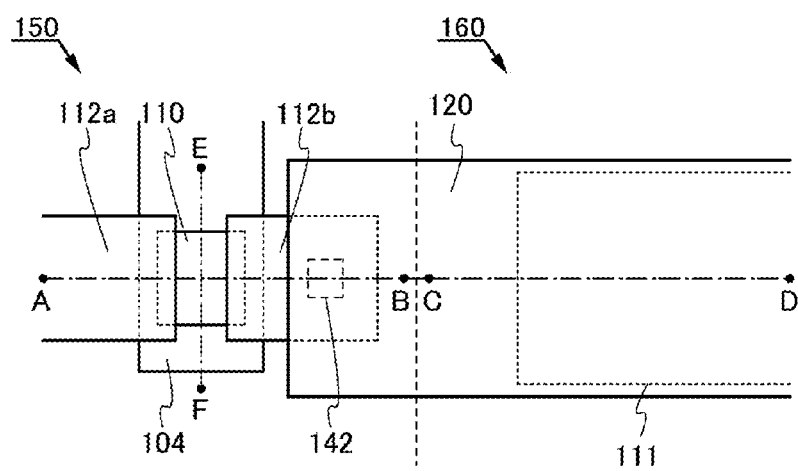
FIGS. 24A and 24B illustrate a top view and a cross-sectional view of an example of a semiconductor device.
Figure 24B:
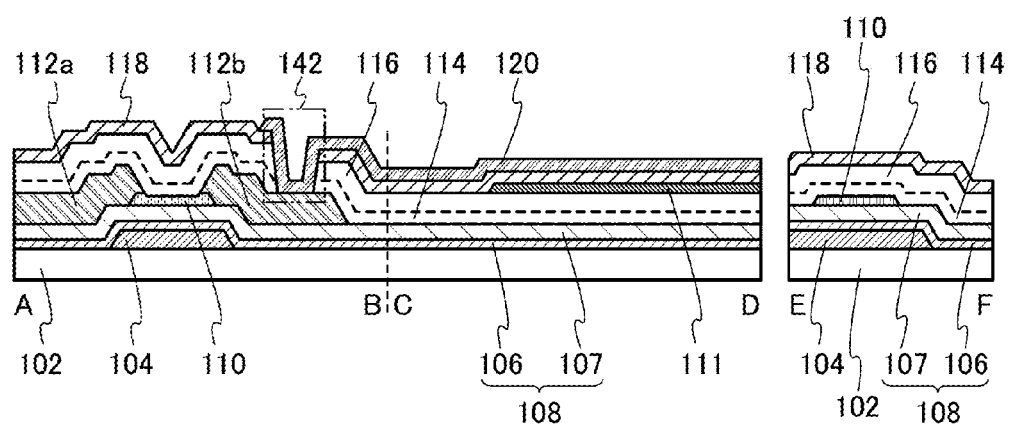

FIG. 24A illustrates a top view of the transistor 150 and the capacitor 160. FIG. 24B corresponds to cross-sectional views taken along dashed-dotted lines A-B, C-D, and E-F in FIG. 24A. Note that some components of the transistor 150 and the capacitor 160 (e.g., a gate insulating film) are not illustrated in FIG. 24A and sometimes in subsequent top views of transistors and the like as well in order to avoid complexity.

A semiconductor device illustrated in FIGS. 24A and 24B includes the transistor 150 including an oxide semiconductor film 110 and the capacitor 160 including an insulating film between a pair of electrodes. Note that in the capacitor 160, one of the pair of electrodes is an oxide conductor film 111, and the other of the pair of electrodes is a conductive film 120.

The direction of the dashed-dotted line A-B in FIG. 24A is referred to as a channel length direction of the transistor 150. The direction of the dashed-dotted line E-F is referred to as a channel width direction of the transistor 150.

The transistor 150 includes a gate electrode 104 over a substrate 102, an insulating film 108 over the gate electrode 104, the oxide semiconductor film 110 overlapping with the gate electrode 104 with the insulating film 108 therebetween, and a source electrode 112a and a drain electrode 112b over the oxide semiconductor film 110. The insulating film 108 functions as a gate insulating film. In other words, the transistor 150 includes the oxide semiconductor film 110, the insulating film 108 in contact with the oxide semiconductor film 110, the gate electrode 104 provided in contact with the insulating film 108 so as to overlap with the oxide semiconductor film 110, and the source electrode 112a and the drain electrode 112b electrically connected to the oxide semiconductor film 110. Note that the transistor 150 illustrated in FIGS. 24A and 24B has what is called a bottom-gate structure.

In addition, over the transistor 150, specifically over the oxide semiconductor film 110, the source electrode 112a, and the drain electrode 112b, an insulating film 114, an insulating film 116, and an insulating film 118 are formed in this order. The insulating films 114, 116, and 118 function as protective insulating films for the transistor 150. In addition, an opening 142 reaching the drain electrode 112b is formed in the insulating films 114, 116, and 118, and the conductive film 120 is formed over the insulating film 118 so as to cover the opening 142. The conductive film 120 functions as, for example, a pixel electrode of a display element.

The capacitor 160 includes the oxide conductor film 111 over the insulating film 116, the insulating film 118 over the oxide conductor film 111, and the conductive film 120 overlapping with the oxide conductor film 111 with the insulating film 118 therebetween. The oxide conductor film 111 functions as one of a pair of electrodes. The insulating film 118 functions as a dielectric film. The conductive film 120 functions as the other of the pair of electrodes. That is, the conductive film 120 functions as both the pixel electrode of the display element and the electrode of the capacitor.

The oxide semiconductor film 110 functions as a channel region of the transistor 150. The oxide conductor film 111 functions as one of the pair of electrodes of the capacitor 160. Thus, the resistivity of the oxide conductor film 111 is lower than the resistivity of the oxide semiconductor film 110. The oxide semiconductor film 110 and the oxide conductor film 111 preferably contain the same metal element. When the oxide semiconductor film 110 and the oxide conductor film 111 contain the same metal element, the same manufacturing apparatus (e.g., deposition apparatus or processing apparatus) can be used and manufacturing cost can thus be reduced.

In addition, the oxide conductor film 111 may be connected to a wiring or the like formed of a metal film or the like. For example, when the semiconductor device illustrated in FIGS. 24A and 24B is used for a transistor and a capacitor in a pixel portion of a display device, a lead wiring, a gate wiring, or the like may be formed using a metal film and connected to the oxide conductor film 111. Since the lead wiring, the gate wiring, or the like is formed using the metal film, the wiring resistance is reduced and accordingly signal delay or the like can be suppressed.

The capacitor 160 has a light-transmitting property. That is, the oxide conductor film 111, the conductive film 120, and the insulating film 118 of the capacitor 160 are each formed of a material having a light-transmitting property. Since the capacitor 160 has a light-transmitting property, the capacitor 160 can be formed large (in a large area) in a region of the pixel where the transistor is not formed. Thus, the display device can have a high capacitance as well as a high aperture ratio. As a result, the display device can have high display quality.

Note that as the insulating film 118 over the transistor 150 and included in the capacitor 160, an insulating film containing at least hydrogen is used. In addition, as an insulating film 107 included in the transistor 150 and the insulating films 114 and 116 over the transistor 150, insulating films containing at least oxygen are used. As described above, these insulating films are used as the insulating films included in the transistor 150 and the capacitor 160 and provided over the transistor 150 and the capacitor 160, so that the resistivity of the oxide semiconductor film 110 included in the transistor 150 and the resistivity of the oxide conductor film 111 included in the capacitor 160 can be controlled.

In addition, when the insulating films included in the capacitor 160 and provided over the transistor 150 and the capacitor 160 are provided as follows, the planarity of the conductive film 120 can be increased. Specifically, the insulating films 114 and 116 are provided over the oxide semiconductor film 110, and the insulating film 118 is provided over the oxide conductor film 111 with the oxide conductor film 111 provided between the insulating film 116 and the insulating film 118. With such a structure, the resistivity of the oxide conductor film 111 can be controlled without providing an opening in the insulating films 114 and 116 so as to overlap with the oxide conductor film 111, and thus the planarity of the conductive film 120 can be increased. Thus, when the semiconductor device illustrated in FIGS. 24A and 24B is used for a transistor and a capacitor in a pixel portion of a liquid crystal display device, the alignment of liquid crystal over the conductive film 120 can be improved. Note that in the case where an opening can be provided in the insulating films 114 and 116 so as to overlap with the oxide conductor film 111, an oxide semiconductor film to be the oxide semiconductor film 110 and the oxide conductor film 111 may be formed in the same step.

Figure 25A:
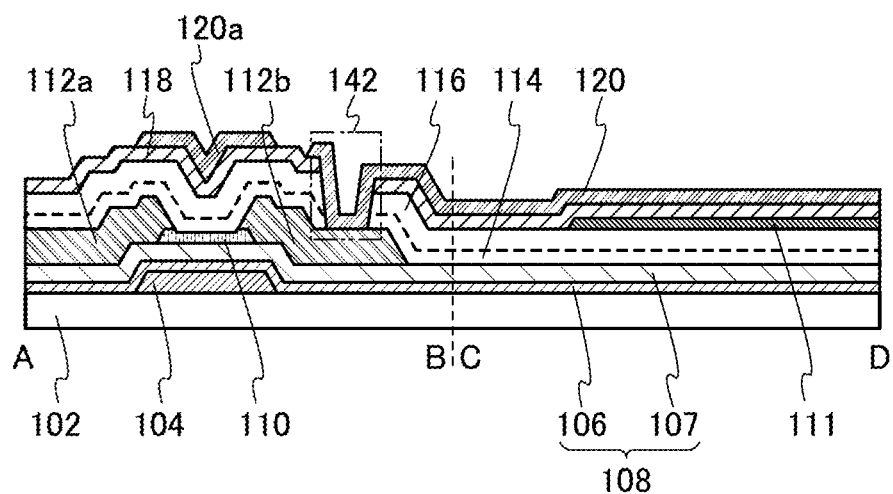
FIGS. 25A and 25B each illustrate a cross-sectional view of an example of a semiconductor device.

Note that a conductive film 120a deposited, etched, and formed at the same time as the conductive film 120 may be provided so as to overlap with the channel region of the transistor. FIG. 25A illustrates an example in that case. The conductive film 120a contains the same material as the conductive film 120 because the conductive film 120a is deposited, etched, and formed at the same time as the conductive film 120; thus, the number of steps is not increased. Note that one embodiment of the present invention is not limited to this example. The conductive film 120a can be formed in a different step from the conductive film 120. The conductive film 120a includes an area overlapping with the channel region of the transistor. Thus, the conductive film 120a serves as a second gate electrode of the transistor, and may be connected to the gate electrode 104. Alternatively, the conductive film 120a may be supplied with different signals or potentials from the gate electrode 104 without being connected to the gate electrode 104. The second gate electrode can further increase the current drive capability of the transistor 150. In that case, the insulating films 114, 116, and 118 serve as gate insulating films for the second gate electrode.

Figure 25B:
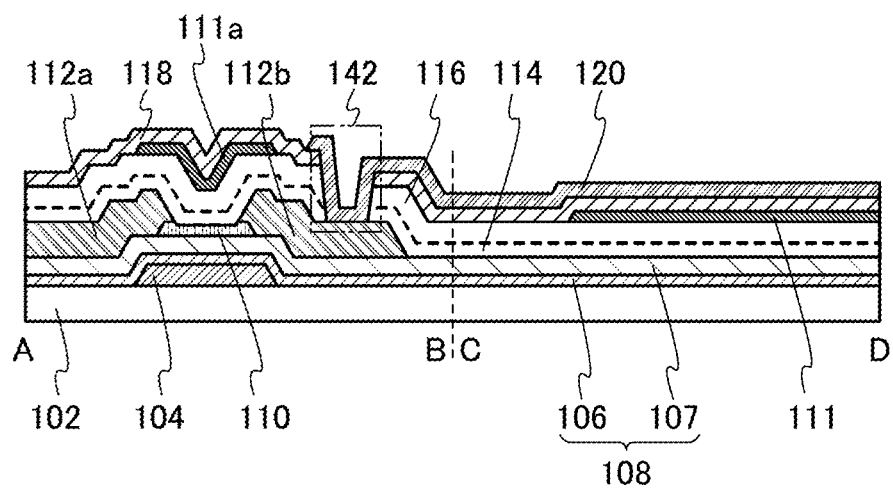

An oxide conductor film 111a deposited, etched, and formed at the same time as the oxide conductor film 111 may be provided so as to overlap with the channel region of the transistor. FIG. 25B illustrates an example in that case. The oxide conductor film 111a contains the same material as the oxide conductor film 111 because the oxide conductor film 111a is deposited, etched, and formed at the same time as the oxide conductor film 111; thus, the number of steps is not increased. Note that one embodiment of the present invention is not limited to this example. The oxide conductor film 111a can be formed in a different step from the oxide conductor film 111. The oxide conductor film 111a has lower resistivity than the oxide semiconductor film 110. The oxide conductor film 111a includes an area overlapping with the oxide semiconductor film 110 serving as the channel region of the transistor 150. Thus, the oxide conductor film 111a serves as a second gate electrode of the transistor 150, and may be connected to the gate electrode 104. Alternatively, the oxide conductor film 111a may be supplied with different signals or potentials from the gate electrode 104 without being connected to the gate electrode 104. With such a structure, the insulating films 114 and 116 serve as gate insulating films for the second gate electrode; thus, the current drive capability of the transistor 150 can be higher than that of the transistor in FIG. 25A.

Note that the oxide semiconductor film 110 has higher resistivity than the oxide conductor film 111 because it is used as the channel region in the transistor 150. The oxide conductor film 111 has lower resistivity than the oxide semiconductor film 110 because it serves as an electrode.

A method for controlling the resistivities of the oxide semiconductor film 110 and the oxide conductor film 111 will be described below.

<Method for Controlling Resistivity of Oxide Film>

The resistivity of an oxide semiconductor film which can be used to form the oxide semiconductor film 110 and the oxide conductor film 111 can be controlled by the number of oxygen vacancies in the films and/or the concentration of impurities such as hydrogen or water in the films. The resistivities of the oxide semiconductor film 110 and the oxide conductor film 111 can be individually controlled by performing treatment for increasing oxygen vacancies and/or impurity concentration or treatment for reducing oxygen vacancies and/or impurity concentration.

Specifically, the oxide semiconductor film that is used for the oxide conductor film 111 functioning as an electrode of the capacitor 160 is subjected to plasma treatment to increase oxygen vacancies and/or impurities such as hydrogen or water in the oxide semiconductor film, whereby the oxide semiconductor film can be changed into an oxide film having a high carrier density and a low resistivity. Furthermore, an insulating film containing hydrogen is formed, for example, as the insulating film 118 in contact with the oxide semiconductor film so that hydrogen may be diffused from the insulating film containing hydrogen into the oxide semiconductor film, whereby the oxide semiconductor film can be changed into an oxide film having a high carrier density and a low resistivity. As described above, the oxide conductor film 111 serves as a semiconductor before the step of increasing oxygen vacancies or diffusing hydrogen in the film, whereas it serves as a conductor after the step.

The oxide semiconductor film 110 functioning as a channel region of the transistor 150 is not in contact with an insulating film 106 and the insulating film 118 containing hydrogen because the insulating films 107, 114, and 116 are provided. With the use of an insulating film containing oxygen, that is, an insulating film capable of releasing oxygen as at least one of the insulating films 107, 114, and 116, oxygen can be supplied to the oxide semiconductor film 110. The oxide semiconductor film 110 to which oxygen is supplied has a high resistivity because oxygen vacancies in the film or at the interface are filled. Note that as the insulating film capable of releasing oxygen, a silicon oxide film or a silicon oxynitride film can be used, for example.

To obtain an oxide film having a low resistivity, hydrogen, boron, phosphorus, or nitrogen may be introduced into the oxide semiconductor film by an ion implantation method, an ion doping method, a plasma immersion ion implantation method, or the like.

In order to obtain an oxide film having a low resistivity, plasma treatment may be performed on the oxide semiconductor film. A typical example of the plasma treatment is plasma treatment using a gas containing at least one of a rare gas (He, Ne, Ar, Kr, or Xe), hydrogen, and nitrogen. Specifically, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, plasma treatment in a nitrogen atmosphere, or the like can be employed.

By the plasma treatment, an oxygen vacancy is formed in a lattice from which oxygen is released (or in a portion from which oxygen is released) in the oxide semiconductor film. The oxygen vacancy might cause carrier generation. Furthermore, when hydrogen is supplied from an insulating film that is in the vicinity of the oxide semiconductor film, specifically, that is in contact with the lower surface or the upper surface of the oxide semiconductor film, and when hydrogen is combined with the oxygen vacancy, an electron serving as a carrier might be generated.

The oxide semiconductor film in which oxygen vacancies are filled and the hydrogen concentration is reduced can be referred to as a highly purified intrinsic or substantially highly purified intrinsic oxide semiconductor film. The term "substantially intrinsic" refers to the state in which an oxide semiconductor film has a carrier density lower than $8\times10^{11}/cm^3$, preferably lower than $1\times10^{11}/cm^3$, further preferably lower than $1\times10^{10}/cm^3$. A highly purified intrinsic or substantially highly purified intrinsic oxide semiconductor film has few carrier generation sources and thus can have a low carrier density. The highly purified intrinsic or substantially highly purified intrinsic oxide semiconductor film has a low density of defect states and accordingly can have a low density of trap states.

Furthermore, the highly purified intrinsic or substantially highly purified intrinsic oxide semiconductor film has an extremely low off-state current; even when an element has a channel width of $1\times10^6$ μm and a channel length (L) of 10 μm, the off-state current can be less than or equal to the measurement limit of a semiconductor parameter analyzer, i.e., less than or equal to $1\times10^{-13}$ A, at a voltage (drain voltage) between a source electrode and a drain electrode of from 1 V to 10 V. Accordingly, the transistor 150 in which a channel region is formed in the oxide semiconductor film 110a that is a highly purified intrinsic or substantially highly purified intrinsic oxide semiconductor film can have a small change in electrical characteristics and high reliability.

For example, an insulating film containing hydrogen, that is, an insulating film capable of releasing hydrogen, typically a silicon nitride film, is used as the insulating film 118, whereby hydrogen can be supplied to the oxide conductor film 111. The insulating film capable of releasing hydrogen preferably has a hydrogen concentration of $1\times10^{22}$ atoms/$cm^3$ or higher. Such an insulating film is formed in contact with the oxide conductor film 111, whereby hydrogen can be effectively contained in the oxide conductor film 111. Thus, the resistivities of the oxide semiconductor film 110 and the oxide conductor film 111 can be controlled by changing the structure of the insulating film in contact with the oxide semiconductor film 110 and the oxide conductor film 111. Note that a material of the insulating film 106 may be similar to the material of the insulating film 118. When silicon nitride is used for the insulating film 106, oxygen released from the insulating film 107 can be prevented from being supplied to the gate electrode 104, so that oxidation of the gate electrode 104 can be inhibited.

Hydrogen contained in the oxide semiconductor film reacts with oxygen bonded to a metal atom to be water, and in addition, an oxygen vacancy is formed in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Accordingly, the oxide conductor film 111 provided in contact with the insulating film containing hydrogen is an oxide film that has a higher carrier density than the oxide semiconductor film 110.

Hydrogen in the oxide semiconductor film 110 of the transistor 150 in which a channel region is formed is preferably reduced as much as possible. Specifically, in the oxide semiconductor film 110, the hydrogen concentration measured by secondary ion mass spectrometry (SIMS) is set to lower than or equal to $2\times10^{20}$ atoms/$cm^3$, preferably lower than or equal to $5\times10^{19}$ atoms/$cm^3$, more preferably lower than or equal to $1\times10^{19}$ atoms/$cm^3$, more preferably lower than $5\times10^{18}$ atoms/$cm^3$, more preferably lower than or equal to $1\times10^{18}$ atoms/$cm^3$, more preferably lower than or equal to $5\times10^{17}$ atoms/$cm^3$, more preferably lower than or equal to $1\times10^{16}$ atoms/$cm^3$.

The oxide conductor film 111 functioning as the electrode of the capacitor 160 is an oxide film having a high hydrogen concentration and/or a large amount of oxygen vacancies and a high resistivity as compared to the oxide semiconductor film 110. The concentration of hydrogen in the oxide conductor film 111 is higher than or equal to $8\times10^{19}$ atoms/$cm^3$, preferably higher than or equal to $1\times10^{20}$ atoms/$cm^3$, more preferably higher than or equal to $5\times10^{20}$ atoms/$cm^3$. The hydrogen concentration in the oxide conductor film 111 is greater than or equal to 2 times, preferably greater than or equal to 10 times that in the oxide semiconductor film 110. The resistivity of the oxide conductor film 111 is preferably higher than or equal to $1\times10^{-8}$ times and lower than $1\times10^{-1}$ times the resistivity of the oxide semiconductor film 110. The resistivity of the oxide conductor film 111 is typically higher than or equal to $1\times10^{-3}$ Ωcm and lower than $1\times10^{4}$ Ωcm, preferably higher than or equal to $1\times10^{-3}$ Ωcm and lower than $1\times10^{-1}$ Ωcm.

Details of other components included in the semiconductor device illustrated in FIGS. 24A and 24B will be described below. Note that the components can be used in the display device described in Embodiment 1.

<<Substrate>>

There is no particular limitation on a material and the like of the substrate 102 as long as the material has heat resistance high enough to withstand at least heat treatment performed later. For example, a glass substrate, a ceramic substrate, a quartz substrate, or a sapphire substrate may be used as the substrate 102. Alternatively, a single crystal semiconductor substrate or a polycrystalline semiconductor substrate made of silicon, silicon carbide, or the like, a compound semiconductor substrate made of silicon germanium or the like, a silicon-on-insulator (SOI) substrate, or the like may be used. Still alternatively, any of these substrates provided with a semiconductor element may be used as the substrate 102. In the case where a glass substrate is used as the substrate 102, a glass substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured. Alternatively, a flexible substrate may be used as the substrate 102, and the transistor 150, the capacitor 160, and the like may be provided directly on the flexible substrate.

Other than the above, a transistor can be formed using any of various substrates as the substrate 102. The type of the substrate is not limited to a certain type. Examples of the substrate include a plastic substrate, a metal substrate, a stainless steel substrate, a substrate including stainless steel foil, a tungsten substrate, a substrate including tungsten foil, a flexible substrate, an attachment film, paper including a fibrous material, a base material film, and the like. As an example of a glass substrate, a barium borosilicate glass substrate, an aluminoborosilicate glass substrate, a soda lime glass substrate, and the like can be given. Examples of a flexible substrate include a flexible synthetic resin such as plastics typified by polyethylene terephthalate (PET), polyethylene naphthalate (PEN), and polyether sulfone (PES), and acrylic. Examples of the attachment film include polypropylene, polyester, polyvinyl fluoride, and polyvinyl chloride. Examples of the base material film include polyester, polyamide, polyimide, an inorganic vapor deposition film, and paper. Specifically, the use of semiconductor substrates, single crystal substrates, SOI substrates, or the like enables the manufacture of small-sized transistors with a small variation in characteristics, size, shape, or the like and with high current capability. A circuit using such transistors achieves lower power consumption of the circuit or higher integration of the circuit.

Note that a transistor may be formed using one substrate, and then the transistor may be transferred to another substrate. In addition to the above substrates over which the transistor can be formed, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, a rubber substrate, or the like can be used as a substrate to which the transistor is transferred. By using such a substrate, a transistor with excellent characteristics or a transistor with low power consumption can be formed, a device with high durability can be formed, heat resistance can be provided, or reduction in weight or thickness can be achieved.

<<Oxide Semiconductor Film and Oxide Conductor Film>>

The oxide semiconductor film 110 and the oxide conductor film 111 preferably include a film represented by an In-M-Zn oxide that contains at least indium (In), zinc (Zn), and M (M is a metal such as Al, Ti, Ga, Y, Zr, La, Ce, Sn, or Hf). In order to reduce fluctuation in electrical characteristics of the transistors including the oxide semiconductor, the oxide semiconductor preferably contains a stabilizer in addition to indium, zinc, and M.

Examples of the stabilizer, including metals that can be used as M, are gallium (Ga), tin (Sn), hafnium (Hf), aluminum (Al), and zirconium (Zr). Other examples of the stabilizer are lanthanoids such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

As the oxide semiconductor included in the oxide semiconductor film 110 and the oxide conductor film 111, any of the following can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

The oxide semiconductor film 110 and the oxide conductor film 111 may contain the same metal element selected from metal elements contained in the above oxides. The use of the same metal element for the oxide semiconductor film 110 and the oxide conductor film 111 can reduce the manufacturing cost. For example, when metal oxide targets with the same metal composition are used, the manufacturing cost can be reduced, and the same etching gas or the same etchant can be used in processing oxide semiconductor films. Even when the oxide semiconductor film 110 and the oxide conductor film 111 contain the same metal element, they have different compositions in some cases. For example, a metal element in a film may be released in the manufacturing process of the transistor and the capacitor, which results in different metal compositions.

Note that in the case where the oxide semiconductor film 110 contains an In-M-Zn oxide, the proportions of In and M when the summation of In and M is assumed to be 100 atomic % are preferably as follows: the proportion of In is greater than 25 atomic % and the proportion of M is less than 75 atomic %, and more preferably, the proportion of In is greater than 34 atomic % and the proportion of M is less than 66 atomic %.

The energy gap of the oxide semiconductor film 110 is 2 eV or more, preferably 2.5 eV or more, further preferably 3 eV or more. With the use of an oxide semiconductor having such a wide energy gap, the off-state current of the transistor 150 can be reduced.

The thickness of the oxide semiconductor film 110 is greater than or equal to 3 nm and less than or equal to 200 nm, preferably greater than or equal to 3 nm and less than or equal to 100 nm, further preferably greater than or equal to 3 nm and less than or equal to 50 nm.

In the case where the oxide semiconductor film 110 contains an In-M-Zn oxide (M represents Al, Ga, Y, Zr, La, Ce, or Nd), it is preferable that the atomic ratio of metal elements of a sputtering target used for forming a film of the In-M-Zn oxide satisfy In≥M and Zn≥M As an example of the atomic ratio of metal elements of such a sputtering target, In:M:Zn=1:1:1, In:M:Zn=1:1:1.2, In:M:Zn=3:1:2, In:M:Zn=1:3:4, or In:M:Zn=1:3:6 can be given. Note that the proportion of each metal element in the atomic ratio of the formed oxide semiconductor film 110 may vary within a range of ±40% of that in the above atomic ratio of the sputtering target.

An oxide semiconductor film with a low carrier density is used as the oxide semiconductor film 110. For example, an oxide semiconductor film whose carrier density is $1\times10^{17}/\text{cm}^3$ or lower, preferably $1\times10^{15}/\text{cm}^3$ or lower, more preferably $1\times10^{13}/\text{cm}^3$ or lower, still more preferably $1\times10^{11}/\text{cm}^3$ or lower is used as the oxide semiconductor film 110.

Note that, without limitation to the compositions described above, a material with an appropriate composition can be used depending on required semiconductor characteristics and electrical characteristics (e.g., field-effect mobility and threshold voltage) of a transistor. Furthermore, in order to obtain required semiconductor characteristics of a transistor, the carrier density, the impurity concentration, the defect density, the atomic ratio of a metal element to oxygen, the interatomic distance, the density, and the like of the oxide semiconductor film 110 are preferably set to be appropriate.

When silicon or carbon that is one of elements belonging to Group 14 is contained in the oxide semiconductor film 110, oxygen vacancies are increased in the oxide semiconductor film 110 and the oxide semiconductor film 110 becomes an n-type film. Thus, the concentration of silicon or carbon (measured by SIMS) in the oxide semiconductor film 110 is set to be lower than or equal to $2\times10^{18}$ atoms/cm$^3$, preferably lower than or equal to $2\times10^{17}$ atoms/cm$^3$.

The concentration of alkali metal or alkaline earth metal in the oxide semiconductor film 110, which is measured by SIMS, is set to be lower than or equal to $1\times10^{18}$ atoms/cm$^3$, preferably lower than or equal to $2\times10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal in the oxide semiconductor film 110.

Furthermore, when containing nitrogen, the oxide semiconductor film 110 easily becomes an n-type film by generation of electrons serving as carriers and an increase of carrier density. Thus, a transistor including an oxide semiconductor that contains nitrogen is likely to be normally on. For this reason, nitrogen in the oxide semiconductor film is preferably reduced as much as possible; the nitrogen concentration which is measured by SIMS is preferably set to be, for example, lower than or equal to $5\times10^{18}$ atoms/cm$^3$.

The oxide semiconductor film 110 may have a non-single-crystal structure, for example. Non-single-crystal structures include a c-axis aligned crystalline oxide semiconductor (CAAC-OS) described later, a polycrystalline structure, a microcrystalline structure described later, and an amorphous structure. Among the non-single-crystal structures, the amorphous structure has the highest density of defect states, whereas the CAAC-OS has the lowest density of defect states.

The oxide semiconductor film 110 may have an amorphous structure, for example. An oxide semiconductor film having an amorphous structure has, for example, disordered atomic arrangement and no crystalline component. Alternatively, an oxide film having an amorphous structure has, for example, an absolutely amorphous structure and no crystal part.

Note that the oxide semiconductor film 110 may be a mixed film including two or more of the following: a region having an amorphous structure, a region having a microcrystalline structure, a region having a polycrystalline structure, a CAAC-OS region, and a region having a single crystal structure. The mixed film has a single-layer structure including, for example, two or more of a region having an amorphous structure, a region having a microcrystalline structure, a region having a polycrystalline structure, a CAAC-OS region, and a region having a single crystal structure in some cases. Furthermore, the mixed film has a stacked-layer structure including, for example, layers of two or more of a region having an amorphous structure, a region having a microcrystalline structure, a region having a polycrystalline structure, a CAAC-OS region, and a region having a single crystal structure in some cases.

<<Insulating Film>>

As each of the insulating films 106 and 107 functioning as a gate insulating film of the transistor 150, an insulating film including at least one of the following films formed by a plasma enhanced chemical vapor deposition (CVD) method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film. Note that instead of a stacked structure of the insulating films 106 and 107, an insulating film of a single layer formed using a material selected from the above may be used.

The insulating film 106 functions as a blocking film which inhibits penetration of oxygen. For example, in the case where excess oxygen is contained in the insulating film 107, the insulating film 114, the insulating film 116, and/or the oxide semiconductor film 110, the insulating film 106 can inhibit penetration of oxygen.

Note that the insulating film 107 that is in contact with the oxide semiconductor film 110 functioning as a channel region of the transistor 150 is preferably an oxide insulating film and preferably includes a region including oxygen in excess of the stoichiometric composition (an oxygen excess region). In other words, the insulating film 107 is an insulating film which is capable of releasing oxygen. The oxygen excess region can be provided in the insulating film 107 by formation of the insulating film 107 in an oxygen atmosphere, for example. Alternatively, the oxygen excess region may be formed by introduction of oxygen into the insulating film 107 after the deposition. Oxygen can be introduced by an ion implantation method, an ion doping method, a plasma immersion ion implantation method, plasma treatment, or the like.

In the case where hafnium oxide is used for the insulating film 106 or the insulating film 107, the following effect is attained. Hafnium oxide has a higher dielectric constant than silicon oxide and silicon oxynitride. Therefore, by using hafnium oxide, the thickness of the insulating film 106 or the insulating film 107 can be made large as compared with the case where silicon oxide is used; thus, leakage current due to tunnel current can be low. That is, it is possible to provide a transistor with a low off-state current. Moreover, hafnium oxide with a crystalline structure has higher dielectric constant than hafnium oxide with an amorphous structure. Therefore, it is preferable to use hafnium oxide with a crystalline structure in order to obtain a transistor with a low off-state current. Examples of the crystalline structure include a monoclinic crystal structure and a cubic crystal structure. Note that one embodiment of the present invention is not limited to the above examples.

In this embodiment, a silicon nitride film is formed as the insulating film 106, and a silicon oxide film is formed as the insulating film 107. A silicon nitride film has a higher dielectric constant than a silicon oxide film and needs a larger thickness for capacitance equivalent to that of a silicon oxide film. Thus, when a silicon nitride film is included as the insulating film 108 functioning as the gate insulating film of the transistor 150, the physical thickness of the insulating film can be increased. This makes it possible to suppress a decrease in withstand voltage of the transistor 150 and furthermore to increase the withstand voltage, thereby inhibiting electrostatic breakdown of the transistor 150.

<<Gate Electrode, Source Electrode, and Drain Electrode>>

The gate electrode 104, the source electrode 112a, and the drain electrode 112b can each have a single-layer structure or a stacked-layer structure including any of metals such as aluminum, titanium, chromium, nickel, copper, yttrium, zirconium, molybdenum, silver, tantalum, and tungsten or an alloy containing any of these metals as its main component. For example, a two-layer structure in which a titanium film is stacked over an aluminum film, a two-layer structure in which a titanium film is stacked over a tungsten film, a two-layer structure in which a copper film is stacked over a molybdenum film, a two-layer structure in which a copper film is stacked over an alloy film containing molybdenum and tungsten, a two-layer structure in which a copper film is stacked over a copper-magnesium-aluminum alloy film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. In the case where the source electrode 112a and the drain electrode 112b have a three-layer structure, it is preferable that a film formed of titanium, titanium nitride, molybdenum, tungsten, an alloy containing molybdenum and tungsten, an alloy containing molybdenum and zirconium, or molybdenum nitride be formed as each of the first and third layers, and that a film formed of a low-resistance material such as copper, aluminum, gold, silver, or an alloy containing copper and manganese be formed as the second layer. Note that a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide containing silicon oxide may be used. The materials that can be used for the gate electrode 104, the source electrode 112a, and the drain electrode 112b can be formed by, for example, a sputtering method.

<<Conductive Film>>

The conductive film 120 functions as a pixel electrode. For example, a material which transmits visible light is used for the conductive film 120. Specifically, a material including one of indium (In), zinc (Zn), and tin (Sn) is preferably used. For example, a light-transmitting conductive material such as indium oxide containing tungsten oxide, indium zinc oxide containing tungsten oxide, indium oxide containing titanium oxide, indium tin oxide containing titanium oxide, indium tin oxide (ITO), indium zinc oxide, or indium tin oxide to which silicon oxide is added can be used for the conductive film 120. The conductive film 120 can be formed by a sputtering method, for example. Note that the conductive film 120 may be formed using a material similar to that of the oxide conductor film 111.

<<Protective Insulating Film>>

As each of the insulating films 114, 116, and 118 functioning as protective insulating films for the transistor 150, an insulating film including at least one of the following films formed by a plasma enhanced CVD method, a sputtering method, or the like can be used: a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film.

The insulating film 114 that is in contact with the oxide semiconductor film 110 functioning as a channel region of the transistor 150 is preferably an oxide insulating film, and an insulating film capable of releasing oxygen is used. In other words, the insulating film capable of releasing oxygen is an insulating film including a region containing oxygen in excess of that in the stoichiometric composition (an oxygen excess region). The oxygen excess region can be provided in the insulating film 114 by formation of the insulating film 114 in an oxygen atmosphere, for example. Alternatively, the oxygen excess region may be formed by introduction of oxygen into the insulating film 114 after the deposition. Oxygen can be introduced by an ion implantation method, an ion doping method, a plasma immersion ion implantation method, plasma treatment, or the like.

The use of the insulating film capable of releasing oxygen as the insulating film 114 can reduce the number of oxygen vacancies in the oxide semiconductor film 110 by transferring oxygen to the oxide semiconductor film 110 functioning as a channel region of the transistor 150. For example, the number of oxygen vacancies in the oxide semiconductor film 110 can be reduced by using an insulating film having the following feature: the number of oxygen molecules released from the insulating film at a film surface temperature higher than or equal to 100° C. and lower than or equal to 700° C., or higher than or equal to 100° C. and lower than or equal to 500° C. is greater than or equal to $1.0 \times 10^{18}$ molecules/cm$^3$ when measured by thermal desorption spectroscopy (hereinafter referred to as TDS).

It is preferable that the amount of defects in the insulating film 114 be small, and typically the spin density corresponding to a signal which appears at g=2.001 due to a dangling bond of silicon be lower than or equal to $3 \times 10^{17}$ spins/cm$^3$ when measured by ESR. This is because if the density of defects in the insulating film 114 is high, oxygen is bonded to the defects and the amount of oxygen that permeates the insulating film 114 is decreased. Furthermore, the amount of defects is preferably small at the interface between the insulating film 114 and the oxide semiconductor film 110, and typically the spin density corresponding to a signal which appears at g=1.89 to 1.96 due to defects in the oxide semiconductor film 110 is preferably lower than or equal to $1 \times 10^{17}$ spins/cm$^3$, more preferably lower than or equal to the lower detection limit when measured by ESR.

Note that in the insulating film 114, all oxygen entering the insulating film 114 from the outside moves to the outside of the insulating film 114 in some cases. Alternatively, some oxygen entering the insulating film 114 from the outside remains in the insulating film 114 in some cases. Furthermore, movement of oxygen occurs in the insulating film 114 in some cases in such a manner that oxygen enters the insulating film 114 and oxygen contained in the insulating film 114 is moved to the outside of the insulating film 114. When an oxide insulating film which is permeable to oxygen is formed as the insulating film 114, oxygen released from the insulating film 116 provided over the insulating film 114 can be moved to the oxide semiconductor film 110 through the insulating film 114.

The insulating film 114 can be formed using an oxide insulating film having a low density of states due to nitrogen oxide. Note that the density of states due to nitrogen oxide can be formed between the energy of the valence band maximum ($E_{V\_OS}$) and the energy of the conduction band minimum ($E_{C\_OS}$) of the oxide semiconductor film. A silicon oxynitride film that releases a small amount of nitrogen oxide, an aluminum oxynitride film that releases a small amount of nitrogen oxide, and the like can be used as the above oxide insulating film.

Note that a silicon oxynitride film that releases a small amount of nitrogen oxide is a film which releases more ammonia than nitrogen oxide in TDS; the number of released ammonia molecules is typically greater than or equal to $1\times10^{18}$ molecules/cm$^3$ and less than or equal to $5\times10^{19}$ molecules/cm$^3$. Note that the amount of released ammonia is the amount of ammonia released by heat treatment at a film surface temperature higher than or equal to 50° C. and lower than or equal to 650° C., preferably higher than or equal to 50° C. and lower than or equal to 550° C.

Nitrogen oxide (NO$_x$; x is greater than 0 and less than or equal to 2, preferably greater than or equal to 1 and less than or equal to 2), typically NO$_2$ or NO, forms levels in the insulating film 114, for example. The level is positioned in the energy gap of the oxide semiconductor film 110. Therefore, when nitrogen oxide is diffused to the interface between the insulating film 114 and the oxide semiconductor film 110, an electron is in some cases trapped by the level on the insulating film 114 side. As a result, the trapped electron remains in the vicinity of the interface between the insulating film 114 and the oxide semiconductor film 110; thus, the threshold voltage of the transistor is shifted in the positive direction.

Nitrogen oxide reacts with ammonia and oxygen in heat treatment. Since nitrogen oxide contained in the insulating film 114 reacts with ammonia contained in the insulating film 116 in heat treatment, nitrogen oxide contained in the insulating film 114 is reduced. Therefore, an electron is hardly trapped at the interface between the insulating film 114 and the oxide semiconductor film 110.

By using such an oxide insulating film, the insulating film 114 can reduce the shift in the threshold voltage of the transistor, which leads to a smaller change in the electrical characteristics of the transistor.

Note that in an ESR spectrum at 100 K or lower of the insulating film 114, by heat treatment in a manufacturing process of the transistor, typically heat treatment at a temperature lower than 400° C. or lower than 375° C. (preferably higher than or equal to 340° C. and lower than or equal to 360° C.), a first signal that appears at a g-factor of greater than or equal to 2.037 and less than or equal to 2.039, a second signal that appears at a g-factor of greater than or equal to 2.001 and less than or equal to 2.003, and a third signal that appears at a g-factor of greater than or equal to 1.964 and less than or equal to 1.966 are observed. The width of the split between the first and second signals and the width of the split between the second and third signals that are obtained by ESR measurement using an X-band are each approximately 5 mT. The sum of the spin densities of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is lower than $1\times10^{18}$ spins/cm$^3$, typically higher than or equal to $1\times10^{17}$ spins/cm$^3$ and lower than $1\times10^{18}$ spins/cm$^3$.

In the ESR spectrum at 100 K or lower, the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 correspond to signals attributed to nitrogen oxide (NO$_x$; x is greater than or equal to 0 and less than or equal to 2, preferably greater than or equal to 1 and less than or equal to 2). Typical examples of nitrogen oxide include nitrogen monoxide and nitrogen dioxide. In other words, the smaller the sum of the spin densities of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is, the lower the content of nitrogen oxide in the oxide insulating film is.

The concentration of nitrogen of the above oxide insulating film measured by SIMS is lower than or equal to $6\times10^{20}$ atoms/cm$^3$.

The above oxide insulating film is formed by a PECVD method at a substrate temperature higher than or equal to 220° C. and lower than or equal to 350° C. using silane and dinitrogen monoxide, whereby a dense and hard film can be formed.

The insulating film 116 in contact with the insulating film 114 is formed using an oxide insulating film whose oxygen content is higher than that in the stoichiometric composition. Part of oxygen is released by heating from the oxide insulating film whose oxygen content is higher than that in the stoichiometric composition. The oxide insulating film whose oxygen content is higher than that in the stoichiometric composition is an oxide insulating film of which the amount of released oxygen converted into oxygen atoms is greater than or equal to $1.0\times10^{19}$ atoms/cm$^3$, preferably greater than or equal to $3.0\times10^{20}$ atoms/cm$^3$ in thermal desorption spectroscopy (TDS). Note that the temperature of the film surface in the TDS is preferably higher than or equal to 100° C. and lower than or equal to 700° C., or higher than or equal to 100° C. and lower than or equal to 500° C.

It is preferable that the amount of defects in the insulating film 116 be small, and typically the spin density corresponding to a signal which appears at g=2.001 due to a dangling bond of silicon be lower than $1.5\times10^{18}$ spins/cm$^3$, more preferably lower than or equal to $1\times10^{18}$ spins/cm$^3$ when measured by ESR. Note that the insulating film 116 is provided more apart from the oxide semiconductor film 110 than the insulating film 114 is; thus, the insulating film 116 may have a higher defect density than the insulating film 114.

The thickness of the insulating film 114 can be greater than or equal to 5 nm and less than or equal to 150 nm, preferably greater than or equal to 5 nm and less than or equal to 50 nm, more preferably greater than or equal to 10 nm and less than or equal to 30 nm. The thickness of the insulating film 116 can be greater than or equal to 30 nm and less than or equal to 500 nm, preferably greater than or equal to 150 nm and less than or equal to 400 nm.

Furthermore, the insulating films 114 and 116 can be formed using insulating films formed of the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present invention is not limited to this structure. For example, a single-layer structure of the insulating film 114, a single-layer structure of the insulating film 116, or a stacked-layer structure including three or more layers may be used.

The insulating film 118 functioning as the dielectric film of the capacitor 160 is preferably a nitride insulating film. A silicon nitride film has a particularly higher dielectric constant than a silicon oxide film and needs a larger thickness for capacitance equivalent to that of a silicon oxide film. Thus, when a silicon nitride film is included as the insulating film 118 functioning as the dielectric film of the capacitor 160, the physical thickness of the insulating film can be increased. This makes it possible to suppress a decrease in withstand voltage of the capacitor 160 and furthermore to increase the withstand voltage, thereby inhibiting electrostatic breakdown of the capacitor 160. Note that the insulating film 118 also has a function of decreasing the resistivity of the oxide conductor film 111 functioning as the electrode of the capacitor 160.

The insulating film 118 has a function of blocking oxygen, hydrogen, water, alkali metal, alkaline earth metal, and the like. Providing the insulating film 118 can prevent outward diffusion of oxygen from the oxide semiconductor film 110, outward diffusion of oxygen contained in the insulating films 114 and 116, and entry of hydrogen, water, or the like into the oxide semiconductor film 110 from the outside. Note that instead of the nitride insulating film having a blocking effect against oxygen, hydrogen, water, alkali metal, alkaline earth metal, and the like, an oxide insulating film having a blocking effect against oxygen, hydrogen, water, and the like may be provided. As the oxide insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given.

<Manufacturing Method of Structural Example A>

Next, an example of a method for manufacturing the semiconductor device illustrated in FIGS. 24A and 24B will be described with reference to FIGS. 26A to 26D, FIGS. 27A to 27C, FIGS. 28A to 28C, and FIGS. 29A and 29B. Note that each layer can be formed using an appropriate material selected from the above-described ones.

Figure 26A:
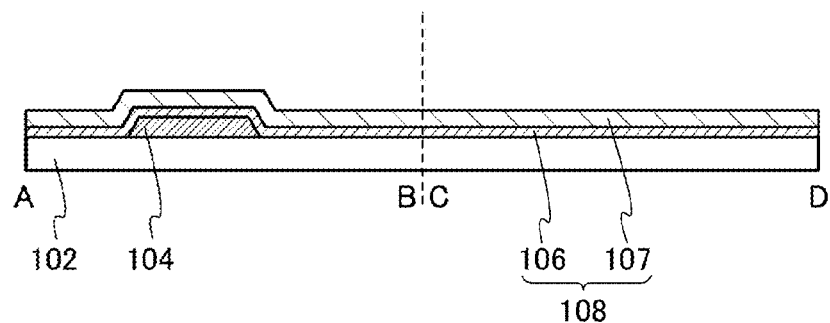
FIGS. 26A to 26D are cross-sectional views illustrating an example of a method for manufacturing a semiconductor device.

First, the gate electrode 104 is formed over the substrate 102. After that, the insulating film 108 including the insulating films 106 and 107 is formed over the substrate 102 and the gate electrode 104 (FIG. 26A).

In this embodiment, a glass substrate is used as the substrate 102; a tungsten film is used as the gate electrode 104; a silicon nitride film capable of releasing hydrogen is used as the insulating film 106; and a silicon oxynitride film capable of releasing oxygen is used as the insulating film 107.

The gate electrode 104 can be formed in such a manner that a conductive film is formed over the substrate 102, the conductive film is patterned so that a desired region thereof remains, and then unnecessary regions are etched.

Figure 26B:
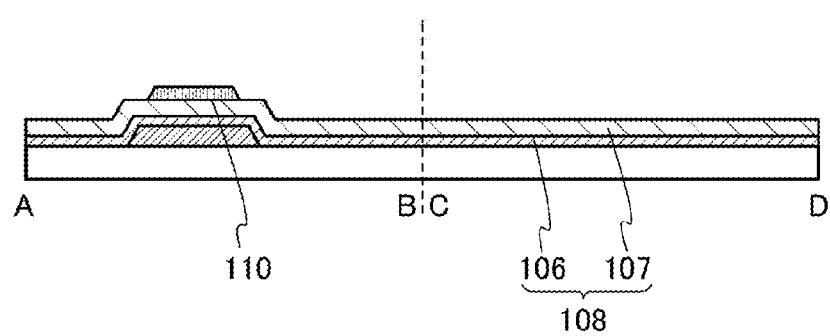

Next, the oxide semiconductor film 110 is formed over the insulating film 108 so as to overlap with the gate electrode 104 (FIG. 26B).

In this embodiment, as the oxide semiconductor film 110, an In—Ga—Zn oxide film (formed using a metal oxide target with In:Ga:Zn=1:1:1.2) is used.

The oxide semiconductor film 110 can be formed in such a manner that an oxide semiconductor film is formed over the insulating film 108, the oxide semiconductor film is patterned so that a desired region thereof remains, and then unnecessary regions are etched.

When the oxide semiconductor film 110 is processed by etching, part of the insulating film 107 (a region not covered with the oxide semiconductor film 110) might be etched to be thinned because of overetching.

After the oxide semiconductor film 110 is formed, heat treatment is preferably performed. The heat treatment may be performed at a temperature higher than or equal to 250° C. and lower than or equal to 650° C., preferably higher than or equal to 300° C. and lower than or equal to 500° C., more preferably higher than or equal to 350° C. and lower than or equal to 450° C., in an inert gas atmosphere, an atmosphere containing an oxidizing gas at 10 ppm or more, or a reduced pressure atmosphere. Alternatively, the heat treatment may be performed in such a manner that heat treatment is performed in an inert gas atmosphere, and then another heat treatment is performed in an atmosphere containing an oxidizing gas at 10 ppm or more, in order to compensate for oxygen released from the oxide semiconductor film 110. The heat treatment can remove impurities such as hydrogen and water from at least one of the insulating film 106, the insulating film 107, and the oxide semiconductor film 110. Note that the heat treatment may be performed before processing into the oxide semiconductor film 110 having an island shape.

Note that stable electrical characteristics can be effectively imparted to the transistor 150 in which the oxide semiconductor film 110 serves as a channel region by reducing impurities in the oxide semiconductor film 110 to make the oxide semiconductor film 110 intrinsic or substantially intrinsic.

Figure 26C:
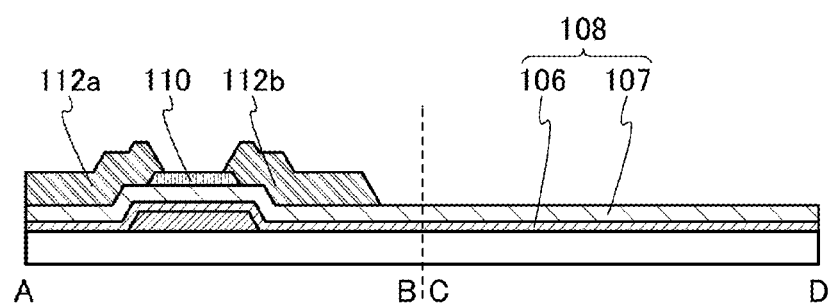

Next, the source electrode 112a and the drain electrode 112b are formed over the insulating film 108 and the oxide semiconductor film 110 in such a manner that a conductive film is formed over the insulating film 108 and the oxide semiconductor film 110, the conductive film is patterned so that desired regions thereof remain, and then unnecessary regions are etched (FIG. 26C).

In this embodiment, the source electrode 112a and the drain electrode 112b have a three-layer stacked structure including a tungsten film, an aluminum film, and a titanium film.

After the source electrode 112a and the drain electrode 112b are formed, a surface of the oxide semiconductor film 110 may be cleaned. The cleaning may be performed, for example, using a chemical solution such as phosphoric acid. The cleaning using a chemical solution such as phosphoric acid can remove impurities (e.g., an element contained in the source electrode 112a and the drain electrode 112b) attached to the surface of the oxide semiconductor film 110. Note that the cleaning is not necessarily performed; in some cases, the cleaning does not need to be performed.

In the step of forming the source electrode 112a and the drain electrode 112b and/or the cleaning step, the thickness of a region of the oxide semiconductor film 110 which is not covered with the source electrode 112a and the drain electrode 112b might be reduced.

Figure 26D:
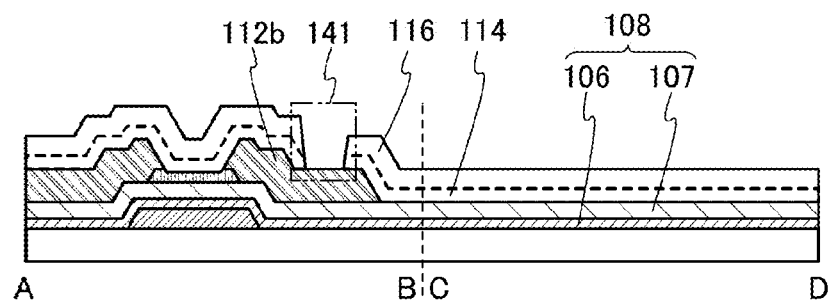

Next, the insulating films 114 and 116 are formed over the insulating film 108, the oxide semiconductor film 110, the source electrode 112a, and the drain electrode 112b. Then, an opening 141 is formed in such a manner that the insulating films 114 and 116 are patterned so that desired regions thereof remain and then unnecessary regions are etched (FIG. 26D).

Note that after the insulating film 114 is formed, the insulating film 116 is preferably formed in succession without exposure to the air. After the insulating film 114 is formed, the insulating film 116 is formed in succession without exposure to the air while at least one of the flow rate of a source gas, pressure, a high-frequency power, and a substrate temperature is adjusted, whereby the concentration of impurities attributed to the atmospheric component at the interface between the insulating film 114 and the insulating film 116 can be reduced and oxygen in the insulating films 114 and 116 can be moved to the oxide semiconductor film 110; accordingly, the amount of oxygen vacancies in the oxide semiconductor film 110 can be reduced.

The insulating film 114 functions as a protective film for the oxide semiconductor film 110 in the step of forming the insulating film 116. Therefore, the insulating film 116 can be formed using the high-frequency power having a high power density while damage to the oxide semiconductor film 110 is reduced.

In this embodiment, a silicon oxynitride film capable of releasing oxygen is used as each of the insulating films 114 and 116.

Heat treatment (hereinafter referred to as first heat treatment) is preferably performed after the insulating films 114 and 116 are formed. The first heat treatment can reduce nitrogen oxide contained in the insulating films 114 and 116. Alternatively, by the first heat treatment, part of oxygen contained in the insulating films 114 and 116 can be moved to the oxide semiconductor film 110, so that the amount of oxygen vacancies included in the oxide semiconductor film 110 can be reduced.

The temperature of the first heat treatment is typically lower than 400° C., preferably lower than 375° C., further preferably higher than or equal to 150° C. and lower than or equal to 350° C. The first heat treatment may be performed in an atmosphere of nitrogen, oxygen, ultra-dry air (an air with a water content of 20 ppm or less, preferably 1 ppm or less, further preferably 10 ppb or less), or a rare gas (e.g., argon or helium). Note that the atmosphere of nitrogen, oxygen, ultra-dry air, or a rare gas preferably does not contain hydrogen, water, and the like. An electric furnace, rapid thermal annealing (RTA), or the like can be used for the heat treatment.

The opening 141 is formed so as to expose the drain electrode 112b. An example of a formation method of the opening 141 includes, but not limited to, a dry etching method. Alternatively, a wet etching method or a combination of dry etching and wet etching can be employed as the formation method. Note that the etching step for forming the opening 141 reduces the thickness of the drain electrode 112b in some cases.

Figure 27A:
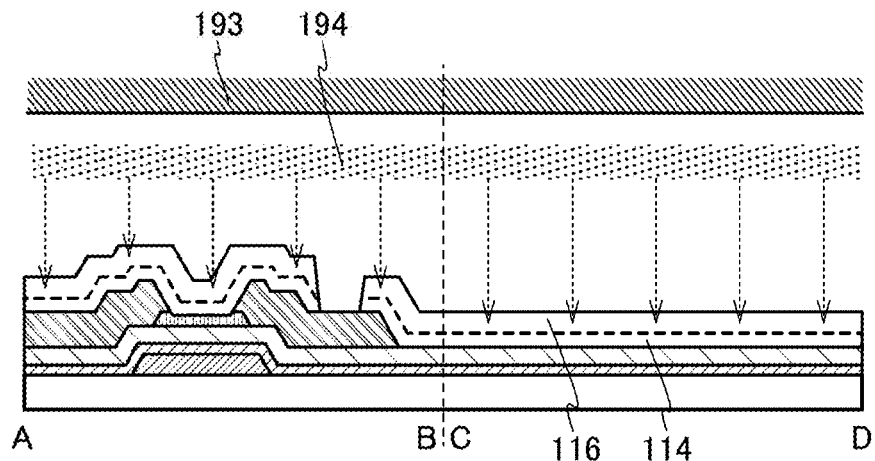
FIGS. 27A to 27C are cross-sectional views illustrating an example of a method for manufacturing a semiconductor device.
Figure 27B:
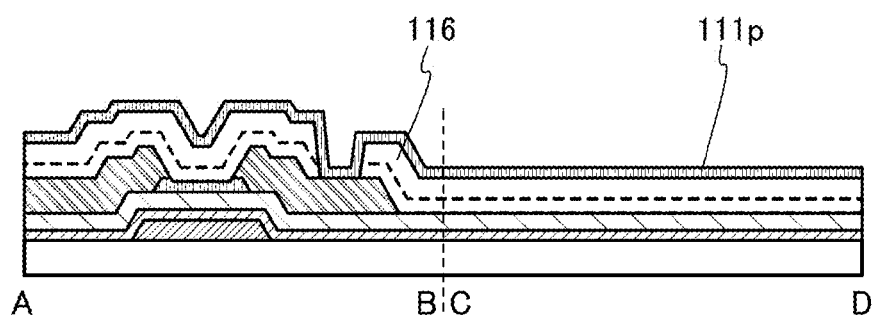

Next, an oxide semiconductor film 111p to be the oxide conductor film 111 is formed over the insulating film 116 so as to cover the opening 141 (FIGS. 27A and 27B).

Note that FIG. 27A is a schematic cross-sectional view of the inside of a deposition apparatus when the oxide semiconductor film is formed over the insulating film 116. In FIG. 27A, a sputtering apparatus is used as the deposition apparatus, and a target 193 placed inside the sputtering apparatus and plasma 194 formed under the target 193 are schematically shown.

When the oxide semiconductor film is formed, plasma discharge is performed in an atmosphere containing an oxygen gas. At this time, oxygen is added to the insulating film 116 over which the oxide semiconductor film is to be formed. When the oxide semiconductor film is formed, an inert gas (e.g., a helium gas, an argon gas, or a xenon gas) and the oxygen gas may be mixed. For example, it is preferable to use the argon gas and the oxygen gas with the flow rate of the oxygen gas higher than the flow rate of the argon gas. When the flow rate of the oxygen gas is set higher, oxygen can be favorably added to the insulating film 116. As an example of the formation conditions of the oxide semiconductor film, the proportion of the oxygen gas in the whole deposition gas is higher than or equal to 50% and lower than or equal to 100%, preferably higher than or equal to 80% and lower than or equal to 100%.

In FIG. 27A, oxygen added to the insulating film 116 is schematically shown by arrows of broken lines.

The oxide semiconductor film is formed at a substrate temperature higher than or equal to room temperature and lower than 340° C., preferably higher than or equal to room temperature and lower than or equal to 300° C., further preferably higher than or equal to 100° C. and lower than or equal to 250° C., still further preferably higher than or equal to 100° C. and lower than or equal to 200° C. The oxide semiconductor film is formed while being heated, so that the crystallinity of the oxide semiconductor film can be increased. On the other hand, in the case where a large-sized glass substrate (e.g., the 6th generation to the 10th generation) is used as the substrate 102 and the oxide semiconductor film is formed at a substrate temperature higher than or equal to 150° C. and lower than 340° C., the substrate 102 might be changed in shape (distorted or warped). In the case where a large-sized glass substrate is used, the change in the shape of the glass substrate can be suppressed by forming the oxide semiconductor film at a substrate temperature higher than or equal to 100° C. and lower than 150° C.

In this embodiment, the oxide semiconductor film 111p is formed by a sputtering method using an In—Ga—Zn metal oxide target (having an atomic ratio of In:Ga:Zn=1:3:6).

Figure 27C:
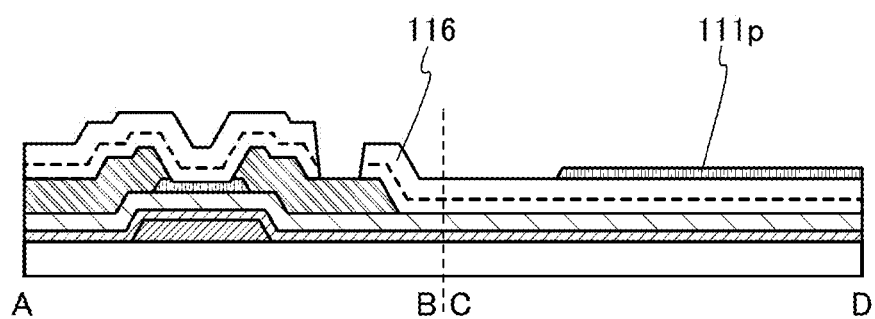

Next, the oxide semiconductor film 111p is processed into a desired shape, whereby the oxide semiconductor film 111p having an island shape is formed (FIG. 27C).

The oxide semiconductor film 111p can be formed in such a manner that an oxide semiconductor film is formed over the insulating film 116, the oxide semiconductor film is patterned so that a desired region thereof remains, and then unnecessary regions are etched.

Figure 28A:
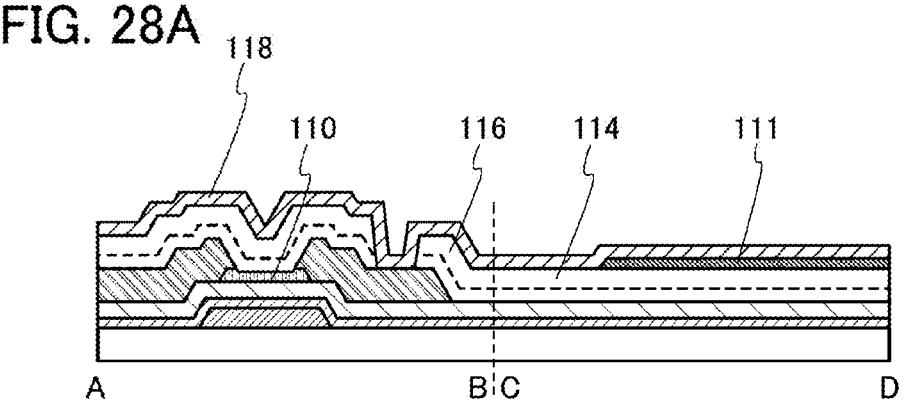
FIGS. 28A to 28C are cross-sectional views illustrating an example of a method for manufacturing a semiconductor device.

Next, the insulating film 118 is formed over the insulating film 116 and the oxide conductor film 111 (FIG. 28A).

The insulating film 118 contains either hydrogen or nitrogen, or both. For example, a silicon nitride film is preferably used as the insulating film 118. The insulating film 118 can be formed by a sputtering method or a PECVD method, for example. In the case where the insulating film 118 is formed by a PECVD method, for example, the substrate temperature is lower than 400° C., preferably lower than 375° C., further preferably higher than or equal to 180° C. and lower than or equal to 350° C. The substrate temperature at which the insulating film 118 is formed is preferably within the above range because a dense film can be formed. Furthermore, when the substrate temperature at which the insulating film 118 is formed is within the above range, oxygen or excess oxygen in the insulating films 114 and 116 can be moved to the oxide semiconductor film 110.

After the insulating film 118 is formed, heat treatment similar to the first heat treatment (hereinafter referred to as second heat treatment) may be performed. Through such heat treatment at lower than 400° C., preferably lower than 375° C., further preferably higher than or equal to 180° C. and lower than or equal to 350° C. after the addition of oxygen to the insulating film 116 in forming the oxide semiconductor film to be the oxide conductor film 111, oxygen or excess oxygen in the insulating film 116 can be moved into the oxide semiconductor film 110 to fill oxygen vacancies in the oxide semiconductor film 110.

Figure 29A:
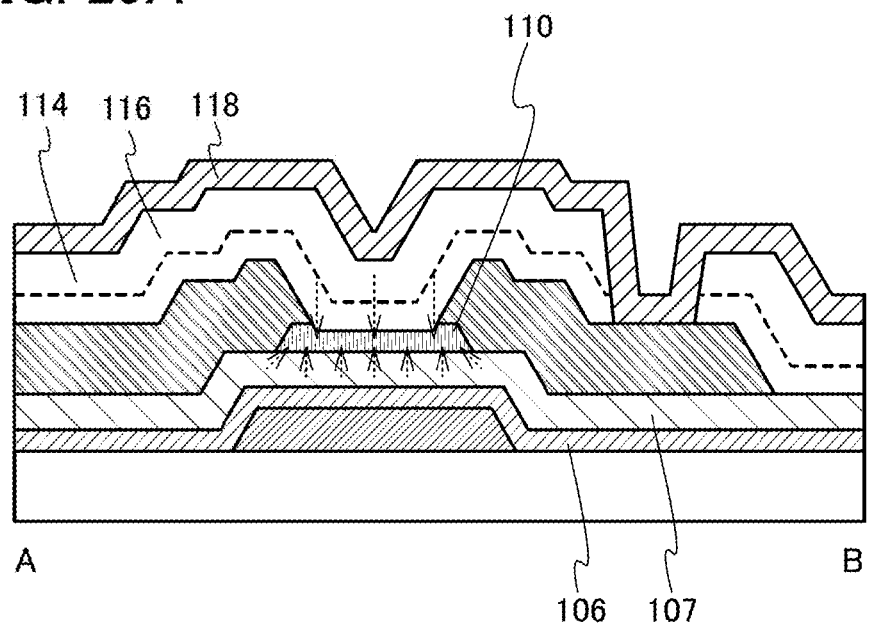
FIGS. 29A and 29B are cross-sectional views illustrating an example of a method for manufacturing a semiconductor device.
Figure 29B:
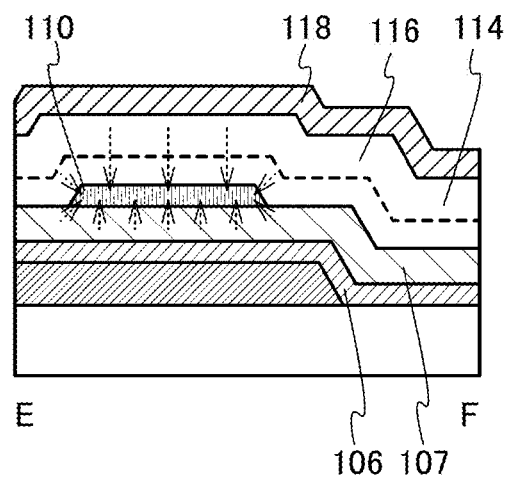

Oxygen moved into the oxide semiconductor film 110 is described here with reference to FIGS. 29A and 29B. FIGS. 29A and 29B are model diagrams illustrating oxygen moved into the oxide semiconductor film 110 due to the substrate temperature at the time of forming the insulating film 118 (typically, lower than 375° C.) or the second heat treatment after the formation of the insulating film 118 (typically, lower than 375° C.). In FIGS. 29A and 29B, oxygen (oxygen radicals, oxygen atoms, or oxygen molecules) moved into the oxide semiconductor film 110 are shown by arrows of broken lines. Note that FIGS. 29A and 29B are respectively cross-sectional views taken along dashed-dotted lines A-B and E-F in FIG. 24A in a state after the formation of the insulating film 118.

In the oxide semiconductor film 110 in FIGS. 29A and 29B, oxygen vacancies are filled with oxygen moved from films in contact with the oxide semiconductor film 110 (here, the insulating film 107 and the insulating film 114). Specifically, in one embodiment of the present invention, the insulating film 107 includes an excess oxygen region in the case where oxygen is added to the insulating film 107 by using an oxygen gas at the time of forming the oxide semiconductor film to be the oxide semiconductor film 110 by sputtering. The insulating film 116 includes an excess oxygen region because oxygen is added to the insulating film 116 by using an oxygen gas at the time of forming the oxide semiconductor film to be the oxide conductor film 111 by sputtering. In the oxide semiconductor film 110 between the insulating films including the excess oxygen regions, oxygen vacancies can be favorably filled.

Furthermore, the insulating film 106 is provided under the insulating film 107, and the insulating film 118 is provided over the insulating films 114 and 116. When the insulating films 106 and 118 are formed using a material having low oxygen permeability, e.g., silicon nitride, oxygen contained in the insulating films 107, 114, and 116 can be confined to the oxide semiconductor film 110 side; thus, oxygen can be favorably moved to the oxide semiconductor film 110. Note that the insulating film 118 also has an advantageous effect of preventing an external impurity, such as water, alkali metal, or alkaline earth metal, from diffusing into the oxide semiconductor film 110 included in the transistor 150.

The insulating film 118 contains either hydrogen or nitrogen, or both. Thus, either hydrogen or nitrogen, or both, is added to the oxide semiconductor film 111p in contact with the insulating film 118, so that the oxide semiconductor film 111p has high carrier density and can function as an oxide conductor film.

Figure 28B:
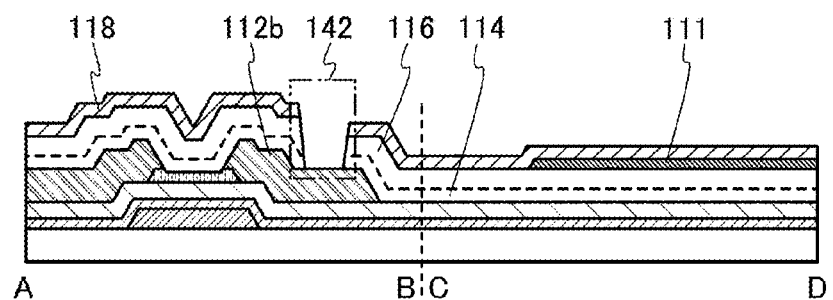
Figure 28C:
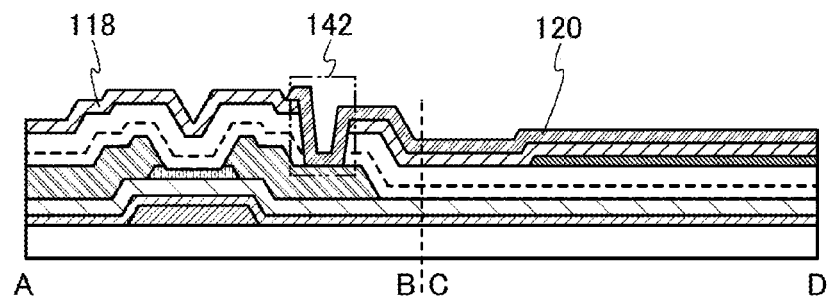

The oxide semiconductor film 111p with decreased resistivity is illustrated as the oxide conductor film 111 in FIGS. 28A to 28C.

The resistivity of the oxide conductor film 111 is lower than at least the resistivity of the oxide semiconductor film 110 and is preferably higher than or equal to $1 \times 10^{-3}$ Ωcm and lower than $1 \times 10^4$ Ωcm, more preferably higher than or equal to $1 \times 10^{-3}$ Ωcm and lower than $1 \times 10^{-1}$ Ωcm.

Next, an opening 142 is formed in such a manner that the insulating film 118 is patterned so that a desired region thereof remains and then an unnecessary region is etched (FIG. 28B).

The opening 142 is formed so as to expose the drain electrode 112b. An example of a formation method of the opening 142 includes, but not limited to, a dry etching method. Alternatively, a wet etching method or a combination of dry etching and wet etching can be employed as the formation method. Note that the etching step for forming the opening 142 reduces the thickness of the drain electrode 112b in some cases.

Note that an opening may be formed in the insulating films 114, 116, and 118 at one time in the step of forming the opening 142 without performing the step of forming the opening 141. Such a process can reduce the number of steps for manufacturing the display device of one embodiment of the present invention, resulting in a reduction of the manufacturing cost.

Next, the conductive film 120 is formed in such a manner that a conductive film is formed over the insulating film 118 so as to cover the opening 142 and then the conductive film is patterned and etched into a desired shape (FIG. 28C).

In this embodiment, an indium tin oxide film is used as the conductive film 120.

The capacitor 160 is formed concurrently with the conductive film 120. The capacitor 160 includes a dielectric layer between a pair of electrodes. One of the pair of electrodes is the oxide conductor film 111, and the other of the pair of electrodes is the conductive film 120. The insulating film 118 functions as the dielectric layer of the capacitor 160.

Through the above steps, the transistor 150 and the capacitor 160 can be formed over the same substrate.

Next, a semiconductor device different from that in Structural example A will be described. Note that the above description can be referred to for the same components as those in Structural example A; thus, details thereof are omitted.

Structural Example B

Figure 30A:
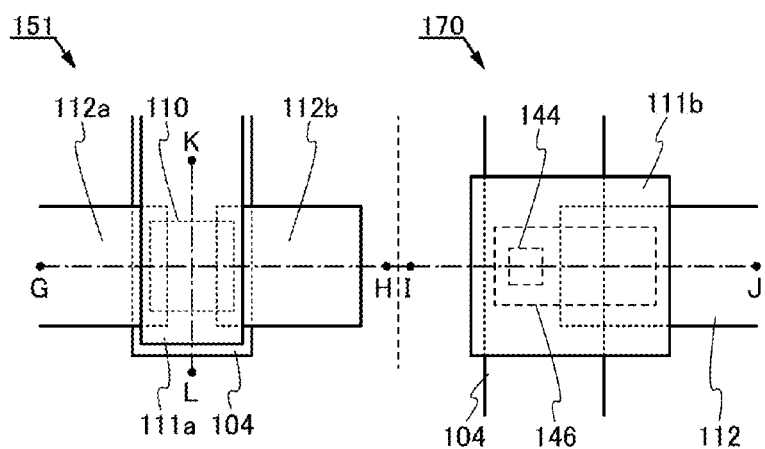
FIGS. 30A and 30B illustrate a top view and a cross-sectional view of an example of a semiconductor device.
Figure 30B:
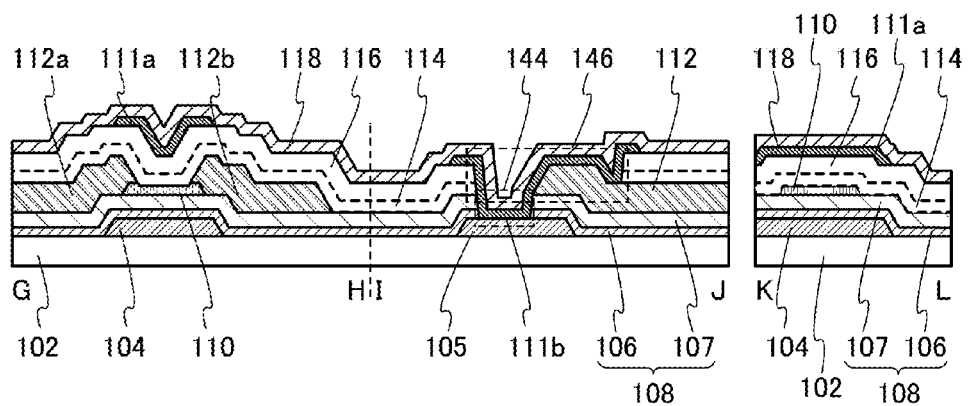

FIG. 30A illustrates a top view of the transistor 151 and a gate wiring contact portion 170. FIG. 30B corresponds to cross-sectional views taken along dashed-dotted lines G-H, I-J, and K-L in FIG. 30A.

The semiconductor device illustrated in FIGS. 30A and 30B includes the transistor 151 including the oxide semiconductor film 110 and the oxide conductor film 111a and the gate wiring contact portion 170 including an oxide conductor film 111b. Note that the gate wiring contact portion 170 means a region where a gate wiring 105 and a wiring 112 are electrically connected to each other.

Note that the direction of the dashed-dotted line G-H in FIG. 30A is referred to as a channel length direction of the transistor 151. The direction of the dashed-dotted line K-L is referred to as a channel width direction of the transistor 151.

The transistor 151 includes the gate electrode 104 over the substrate 102, the insulating film 108 functioning as a first gate insulating film over the gate electrode 104, the oxide semiconductor film 110 overlapping with the gate electrode 104 over the insulating film 108, the source electrode 112a and the drain electrode 112b over the oxide semiconductor film 110, the insulating film 114 and the insulating film 116 functioning as second gate insulating films over the oxide semiconductor film 110, the source electrode 112a, and the drain electrode 112b, and the oxide conductor film 111a overlapping with the oxide semiconductor film 110 over the insulating film 116. The oxide conductor film 111a functions as a second gate electrode in the transistor 151. That is, the transistor 151 illustrated in FIGS. 30A and 30B has what is called a double-gate structure.

The insulating film 118 is formed over the transistor 151, specifically, over the insulating film 116 and the oxide conductor film 111a. The insulating film 118 functions as a protective insulating film for the transistor 151.

In the gate wiring contact portion 170, the oxide conductor film 111b is formed over the gate wiring 105 and the wiring 112 so as to cover an opening 144 provided in the insulating film 108 and an opening 146 provided in the insulating films 114 and 116.

In the semiconductor device described in this embodiment, the gate wiring 105 is electrically connected to the wiring 112 through the oxide conductor film 111b in the gate wiring contact portion 170. Owing to such a structure, the opening 144 and the opening 146 can be formed successively and accordingly the manufacturing process of the semiconductor device can be shortened.

In addition, if a protective film for blocking entry of oxygen is not provided over the oxide conductor film 111b, the characteristics of the oxide conductor film 111b may be changed in a high-temperature and high-humidity environment and the resistivity of the oxide conductor film 111b may be increased. The oxide conductor film 111b of the semiconductor device described in this embodiment is covered with the insulating film 118; thus, the heat and humidity resistance of the semiconductor device is improved without forming another protective film.

Note that an insulating film containing at least hydrogen is used as the insulating film 118. In addition, an insulating film containing at least oxygen is used as each of the insulating films 107, 114, and 116. As described above, these insulating films are used as the insulating films included in the transistor 151 and the gate wiring contact portion 170 or the insulating films in contact with the transistor 151 and the gate wiring contact portion 170, so that the resistivities of the oxide semiconductor film 110, the oxide conductor film 111a, and the oxide conductor film 111b can be controlled.

<Manufacturing Method of Structural Example B>

Next, an example of a method for manufacturing the semiconductor device illustrated in FIGS. 30A and 30B will be described with reference to FIGS. 31A to 31D and FIGS. 32A to 32C.

Figure 31A:
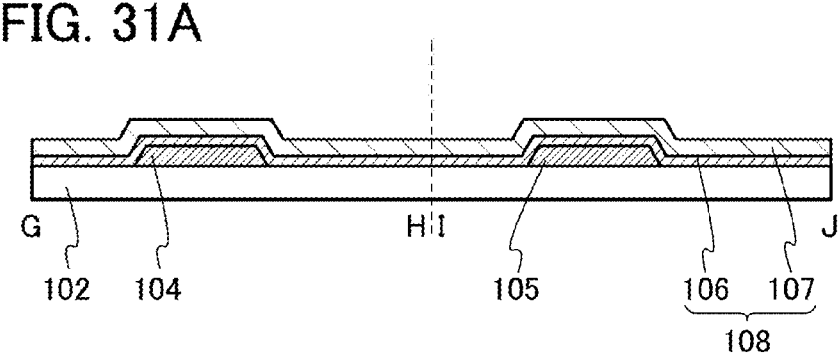
FIGS. 31A to 31D are cross-sectional views illustrating an example of a method for manufacturing a semiconductor device.

First, the gate electrode 104 and the gate wiring 105 are formed over the substrate 102. After that, the insulating film 108 including the insulating films 106 and 107 is formed over the gate electrode 104 and the gate wiring 105 (FIG. 31A). The gate wiring 105 can be formed using a material similar to that of the gate electrode 104 at the same time as the gate electrode 104.

Figure 31B:
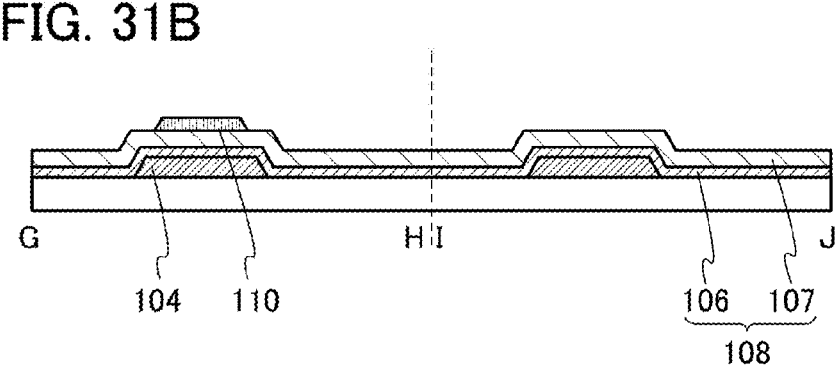

Next, the oxide semiconductor film 110 is formed over the insulating film 108 so as to overlap with the gate electrode 104 (FIG. 31B).

After the oxide semiconductor film 110 is formed, heat treatment is preferably performed.

Figure 31C:
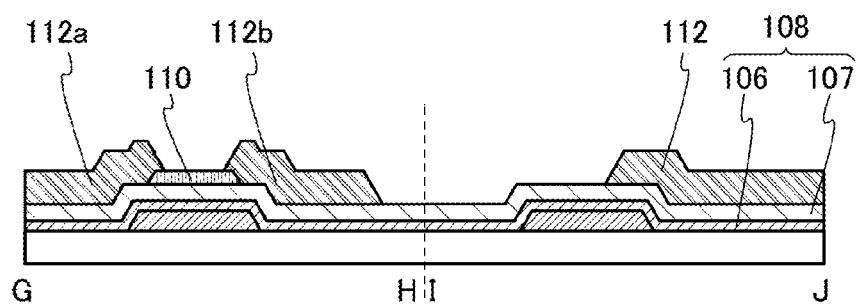

Next, the source electrode 112a, the drain electrode 112b, and the wiring 112 are formed in such a manner that a conductive film is formed over the insulating film 108 and the oxide semiconductor film 110, the conductive film is patterned so that desired regions thereof remain, and then unnecessary regions are etched (FIG. 31C). The wiring 112 can be formed using a material similar to that of the source electrode 112a and the drain electrode 112b at the same time as the source electrode 112a and the drain electrode 112b.

Figure 31D:
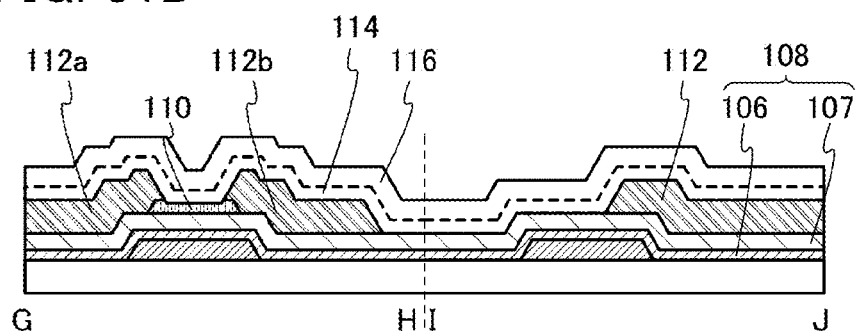

Next, the insulating films 114 and 116 are formed over the insulating film 108, the oxide semiconductor film 110a, the source electrode 112a, the drain electrode 112b, and the wiring 112 (FIG. 31D). First heat treatment is preferably performed after the insulating films 114 and 116 are formed.

Figure 32A:
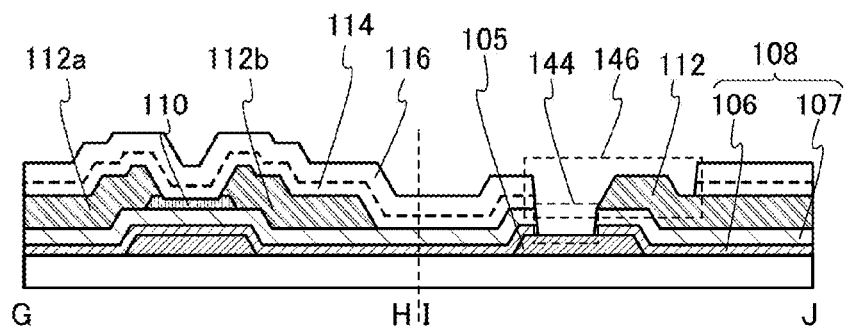
FIGS. 32A to 32C are cross-sectional views illustrating an example of a method for manufacturing a semiconductor device.

Next, the opening 144 and the opening 146 are formed in such a manner that the insulating films 106, 107, 114, and 116 are patterned so that desired regions thereof remain and then unnecessary regions are etched (FIG. 32A).

The openings 144 and 146 are formed so as to expose the wiring 112 and the gate wiring 105. An example of a formation method of the openings 144 and 146 includes, but not limited to, a dry etching method. Alternatively, a wet etching method or a combination of dry etching and wet etching can be employed as the formation method.

The opening 144 and the opening 146 can be patterned and etched at one time, so that they are formed at the same time, leading to shortening the manufacturing process.

Figure 32B:
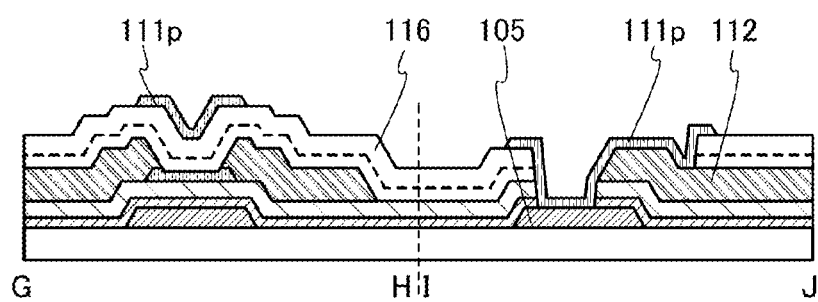

Next, the oxide semiconductor films 111p are formed over the insulating film 116 so as to overlap with the oxide semiconductor film 110 and so as to cover the openings 144 and 146 (FIG. 32B).

The oxide semiconductor films 111p can be formed in such a manner that an oxide semiconductor film is formed over the insulating film 116, the oxide semiconductor film is patterned so that desired regions thereof remain, and then unnecessary regions are etched.

When the oxide semiconductor films 111p are processed by etching, part of the insulating film 116 (a region not covered with the oxide semiconductor films 111p) might be etched to be thinned because of overetching.

Figure 32C:
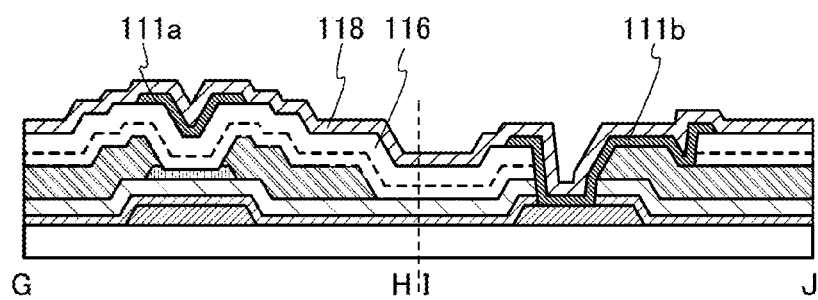

Next, the insulating film 118 is formed over the insulating film 116 and the oxide semiconductor films 111p (FIG. 32C). Diffusion of hydrogen contained in the insulating film 118 into the oxide semiconductor films 111p causes a decrease in the resistivity of the oxide semiconductor films 111p. Note that the oxide semiconductor films 111p with decreased resistivity are illustrated as the oxide conductor films 111a and 111b in FIG. 32C. Second heat treatment may be performed after the insulating film 118 is formed.

Through the above steps, the transistor 151 and the gate wiring contact portion 170 can be formed over the same substrate.

Structural Example C

Figure 33A:
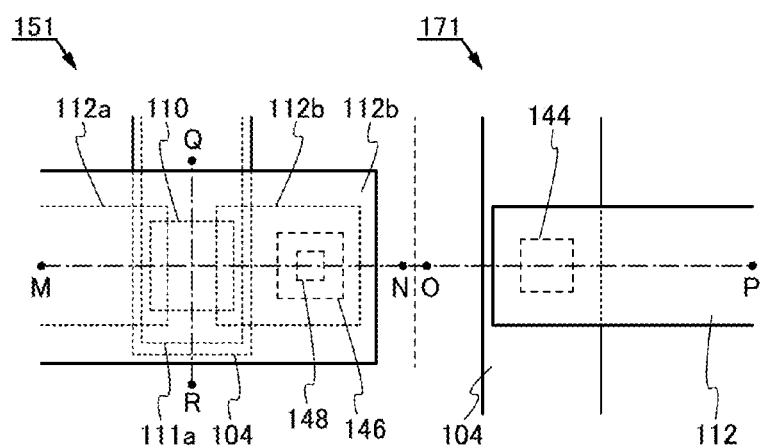
FIGS. 33A and 33B illustrate a top view and a cross-sectional view of an example of a semiconductor device.
Figure 33B:
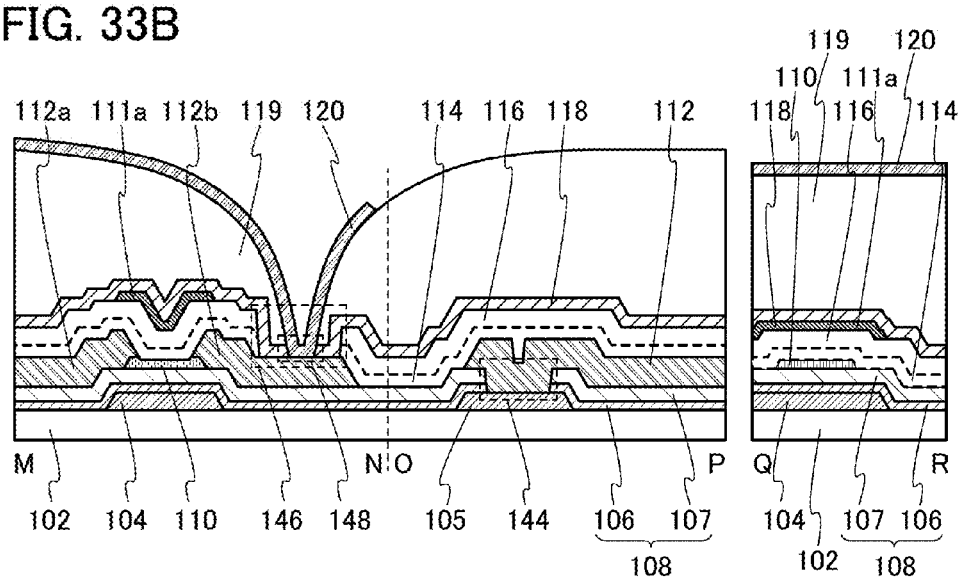

FIG. 33A illustrates a top view of the transistor 151 and a gate wiring contact portion 171. FIG. 33B corresponds to cross-sectional views taken along dashed-dotted lines M-N, O-P, and Q-R in FIG. 33A.

The semiconductor device illustrated in FIGS. 33A and 33B includes the transistor 151 including the oxide semiconductor film 110 and the oxide conductor film 111a and the gate wiring contact portion 171. Note that the gate wiring contact portion 171 means a region where the gate wiring 105 and the wiring 112 are electrically connected to each other.

Note that the direction of the dashed-dotted line M-N in FIG. 33A is referred to as a channel length direction of the transistor 151. The direction of the dashed-dotted line Q-R is referred to as a channel width direction of the transistor 151.

The transistor 151 has a structure similar to that in Structural example B.

The insulating film 118 and an insulating film 119 are formed over the transistor 151, specifically, over the insulating film 116 and the oxide conductor film 111a. The insulating film 118 functions as a protective insulating film for the transistor 151. The insulating film 119 functions as a planarization film. In addition, openings reaching the drain electrode 112b are formed in the insulating films 114, 116, 118, and 119 and the conductive film 120 is formed over the insulating film 119 so as to cover the openings. Of the openings, the opening provided in the insulating films 114 and 116 is referred to as the opening 146, and the opening provided in the insulating film 118 is referred to as an opening 148. The conductive film 120 functions as, for example, a pixel electrode.

In the gate wiring contact portion 171, the wiring 112 is formed over the gate wiring 105 so as to cover the opening 144 provided in the insulating film 108.

In the semiconductor device described in this embodiment, the edges of the insulating films 118 and 119 are substantially aligned in the opening 148. Since the semiconductor device has such a structure, the number of masks used for patterning can be reduced and accordingly the manufacturing cost can be reduced.

Note that an insulating film containing at least hydrogen is used as the insulating film 118. In addition, an insulating film containing at least oxygen is used as each of the insulating films 107, 114, and 116. As described above, these insulating films are used as the insulating films included in the transistor 151 or the insulating films in contact with the transistor 151, so that the resistivities of the oxide semiconductor film 110 and the oxide conductor film 111a included in the transistor 151 can be controlled.

<Manufacturing Method of Structural Example C>

Next, an example of a method for manufacturing the semiconductor device illustrated in FIGS. 33A and 33B will be described with reference to FIGS. 34A to 34D and FIGS. 35A to 35C.

First, the gate electrode 104 and the gate wiring 105 are formed over the substrate 102. After that, the insulating film 108 including the insulating films 106 and 107 is formed over the gate electrode 104 and the gate wiring 105. The gate wiring 105 can be formed using a material similar to that of the gate electrode 104 at the same time as the gate electrode 104.

Figure 34A:
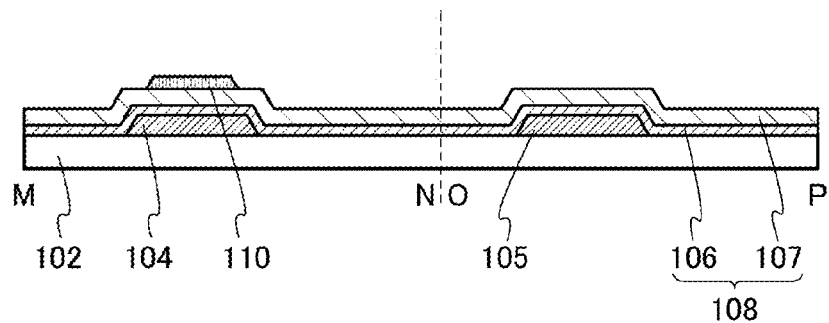
FIGS. 34A to 34D are cross-sectional views illustrating an example of a method for manufacturing a semiconductor device.

Next, the oxide semiconductor film 110 is formed over the insulating film 108 so as to overlap with the gate electrode 104 (FIG. 34A).

After the oxide semiconductor film 110 is formed, heat treatment is preferably performed.

Figure 34B:
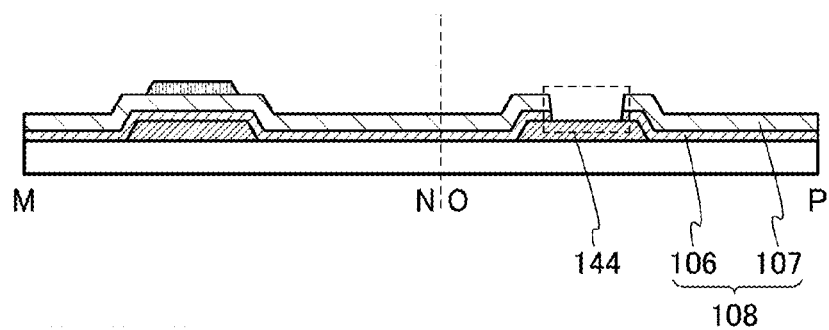

Next, the opening 144 is formed in such a manner that the insulating films 106 and 107 are patterned so that desired regions thereof remain and then unnecessary regions are etched (FIG. 34B).

The opening 144 is formed so as to expose the gate wiring 105. An example of a formation method of the opening 144 includes, but not limited to, a dry etching method. Alternatively, a wet etching method or a combination of dry etching and wet etching can be employed as the formation method.

Figure 34C:
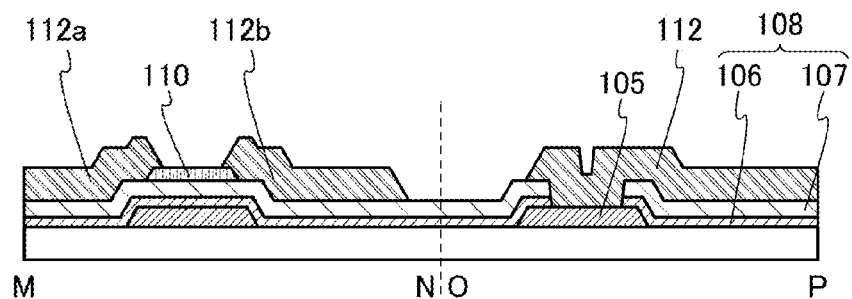

Next, the source electrode 112a, the drain electrode 112b, and the wiring 112 are formed in such a manner that a conductive film is formed over the insulating film 108, the gate wiring 105, and the oxide semiconductor film 110, the conductive film is patterned so that desired regions thereof remain, and then unnecessary regions are etched (FIG. 34C). The wiring 112 can be formed using a material similar to that of the source electrode 112a and the drain electrode 112b at the same time as the source electrode 112a and the drain electrode 112b.

Next, the insulating films 114 and 116 are formed over the insulating film 108, the oxide semiconductor film 110a, the source electrode 112a, the drain electrode 112b, and the wiring 112. First heat treatment is preferably performed after the insulating films 114 and 116 are formed.

Figure 34D:
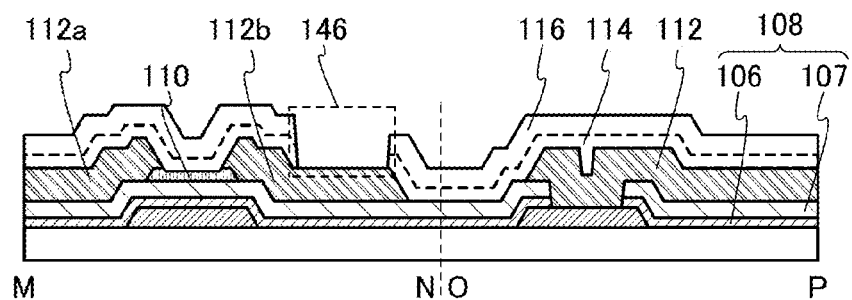

Next, the opening 146 is formed in such a manner that the insulating films 114 and 116 are patterned so that desired regions thereof remain and then unnecessary regions are etched (FIG. 34D).

The opening 146 is formed so as to expose the drain electrode 112b. An example of a formation method of the opening 146 includes, but not limited to, a dry etching method. Alternatively, a wet etching method or a combination of dry etching and wet etching can be employed as the formation method.

Next, an oxide semiconductor film is formed over the insulating film 116 so as to overlap with the oxide semiconductor film 110.

Next, the insulating film 118 is formed over the insulating film 116, the oxide semiconductor film, and the drain electrode 112b. Diffusion of hydrogen contained in the insulating film 118 into the oxide semiconductor film causes a decrease in the resistivity of the oxide semiconductor film. Note that the oxide semiconductor film with decreased resistivity is illustrated as the oxide conductor film 111a in FIGS. 35A to 35C.

Figure 35A:
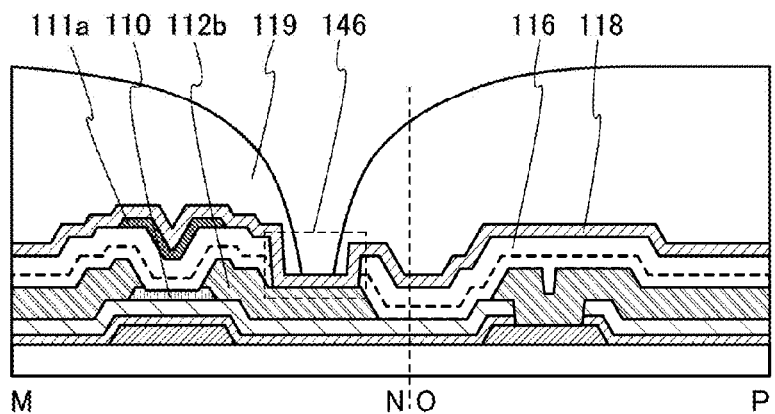
FIGS. 35A to 35C are cross-sectional views illustrating an example of a method for manufacturing a semiconductor device.

Next, the insulating film 119 is formed over the insulating film 118 (FIG. 35A). The insulating film 119 can be formed using a heat-resistant organic material such as a polyimide resin, an acrylic resin, a polyimide amide resin, a benzocyclobutene resin, a polyamide resin, or an epoxy resin. An opening is formed so as to overlap with the opening 146 in such a manner that an organic resin film is formed over the insulating film, the organic resin film is patterned so that a desired region thereof remains, and then an unnecessary portion is etched.

Figure 35B:
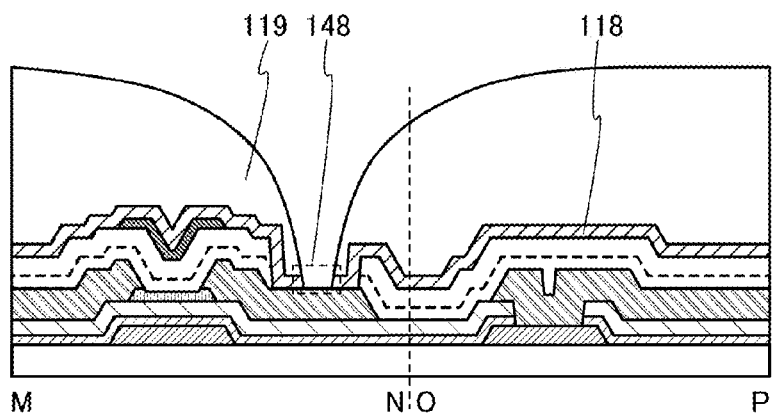

Next, the opening 148 is formed by etching the insulating film 118 using as a mask the insulating film 119 with the opening (FIG. 35B). Since the insulating film 119 can be used as a mask, there is no need to use another mask for forming the opening 148 and to perform patterning. Thus, the manufacturing cost of the semiconductor device can be reduced.

Figure 35C:
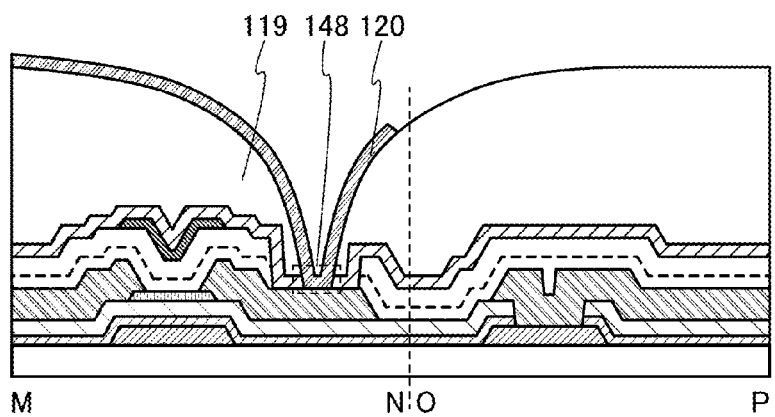

Next, the conductive film 120 is formed in such a manner that a conductive film is formed over the insulating film 119 so as to cover the opening 148 and then the conductive film is patterned and etched into a desired shape (FIG. 35C).

Through the above steps, the transistor 151 and the gate wiring contact portion 171 can be formed over the same substrate.

Next, transistor structures different from those described above will be described.

<Structural Example 1 of Transistor>

Figure 36A:
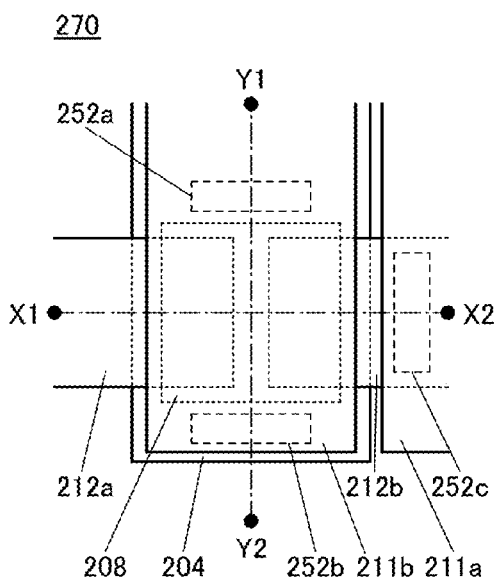
FIGS. 36A to 36C illustrate a top view and cross-sectional views of an example of a transistor.
Figure 36B:
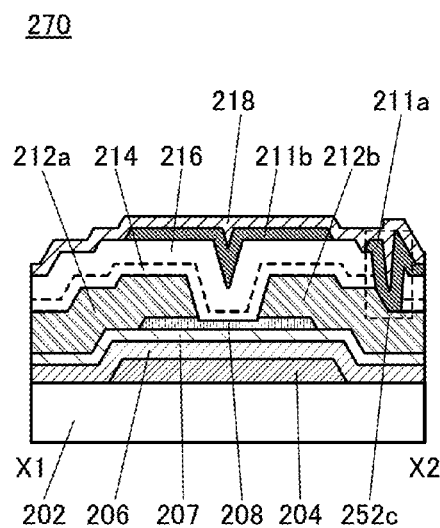
Figure 36C:
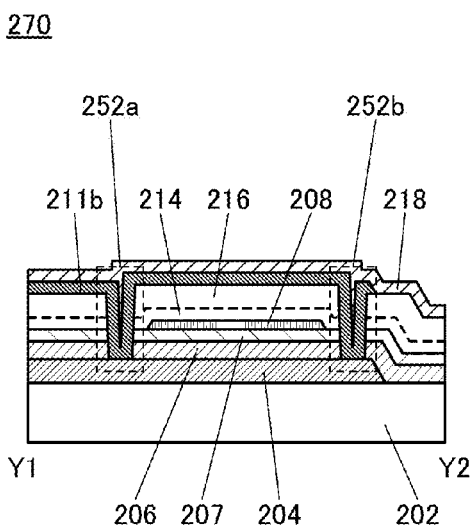

FIG. 36A illustrates a top view of a transistor 270. FIG. 36B illustrates a cross-sectional view taken along dashed-dotted line X1-X2 in FIG. 36A. FIG. 36C illustrates a cross-sectional view taken along dashed-dotted line Y1-Y2 in FIG. 36A. In some cases, the direction of the dashed-dotted line X1-X2 is referred to as a channel length direction and the direction of the dashed-dotted line Y1-Y2 is referred to as a channel width direction.

The transistor 270 includes a conductive film 204 functioning as a first gate electrode over a substrate 202, an insulating film 206 over the substrate 202 and the conductive film 204, an insulating film 207 over the insulating film 206, an oxide semiconductor film 208 over the insulating film 207, a conductive film 212a functioning as a source electrode electrically connected to the oxide semiconductor film 208, a conductive film 212b functioning as a drain electrode electrically connected to the oxide semiconductor film 208, insulating films 214 and 216 over the oxide semiconductor film 208, the conductive film 212a, and the conductive film 212b, and an oxide conductor film 211b over the insulating film 216. An insulating film 218 is provided over the oxide conductor film 211b.

In the transistor 270, the insulating films 214 and 216 function as second gate insulating films of the transistor 270. An oxide conductor film 211a is connected to the conductive film 212b through an opening 252c provided in the insulating films 214 and 216. The oxide conductor film 211a functions as, for example, a pixel electrode used for a display device. The oxide conductor film 211b in the transistor 270 functions as a second gate electrode (also referred to as a back gate electrode).

As illustrated in FIG. 36C, the oxide conductor film 211b is connected to the conductive film 204 functioning as the first gate electrode through openings 252a and 252b provided in the insulating films 206 and 207 and the insulating films 214 and 216. Accordingly, the conductive film 204 and the oxide conductor film 211b are supplied with the same potential.

Note that although the structure in which the openings 252a and 252b are provided so that the oxide conductor film 211b and the conductive film 204 are connected to each other is described in this embodiment, one embodiment of the present invention is not limited thereto. For example, a structure in which only one of the openings 252a and 252b is provided so that the oxide conductor film 211b and the conductive film 204 are connected to each other, or a structure in which the openings 252a and 252b are not provided and the oxide conductor film 211b and the conductive film 204 are not connected to each other may be employed. Note that in the case where the oxide conductor film 211b and the conductive film 204 are not connected to each other, it is possible to apply different potentials to the oxide conductor film 211b and the conductive film 204.

Note that the oxide conductor film 211a and the oxide conductor film 211b have a lower resistivity than the oxide semiconductor film 208. The description of the oxide conductor film 111 in the above structural example can be referred to for details.

As illustrated in FIG. 36B, the oxide semiconductor film 208 is positioned to face each of the conductive film 204 functioning as the first gate electrode and the oxide conductor film 211b functioning as the second gate electrode, and is sandwiched between the two conductive films functioning as gate electrodes. The lengths in the channel length direction and the channel width direction of the oxide conductor film 211b functioning as the second gate electrode are longer than those in the channel length direction and the channel width direction of the oxide semiconductor film 208. The whole oxide semiconductor film 208 is covered with the oxide conductor film 211b with the insulating films 214 and 216 positioned therebetween. Since the oxide conductor film 211b functioning as the second gate electrode is connected to the conductive film 204 functioning as the first gate electrode through the openings 252a and 252b provided in the insulating films 206 and 207 and the insulating films 214 and 216, a side surface of the oxide semiconductor film 208 in the channel width direction faces the oxide conductor film 211b functioning as the second gate electrode with the insulating films 214 and 216 positioned therebetween.

In other words, in the channel width direction of the transistor 270, the conductive film 204 functioning as the first gate electrode and the oxide conductor film 211b functioning as the second gate electrode are connected to each other through the openings provided in the insulating films 206 and 207 functioning as first gate insulating films and the insulating films 214 and 216 functioning as the second gate insulating films; and the conductive film 204 and the oxide conductor film 211b surround the oxide semiconductor film 208 with the insulating films 206 and 207 functioning as the first gate insulating films and the insulating films 214 and 216 functioning as the second gate insulating films positioned therebetween.

Such a structure enables the oxide semiconductor film 208 included in the transistor 270 to be electrically surrounded by electric fields of the conductive film 204 functioning as the first gate electrode and the oxide conductor film 211b functioning as the second gate electrode. A device structure of a transistor, like that of the transistor 270, in which electric fields of a first gate electrode and a second gate electrode electrically surround an oxide semiconductor film where a channel region is formed can be referred to as a surrounded channel (s-channel) structure.

Since the transistor 270 has the s-channel structure, an electric field for inducing a channel can be effectively applied to the oxide semiconductor film 208 by the conductive film 204 functioning as the first gate electrode; therefore, the current drive capability of the transistor 270 can be improved and high on-state current characteristics can be obtained. Since the on-state current can be increased, it is possible to reduce the size of the transistor 270. In addition, since the transistor 270 is surrounded by the conductive film 204 functioning as the first gate electrode and the oxide conductor film 211b functioning as the second gate electrode, the mechanical strength of the transistor 270 can be increased.

<Structural Example 2 of Transistor>

Next, structural examples different from that of the transistor 270 will be described with reference to FIGS. 37A to 37D.

Figure 37A:
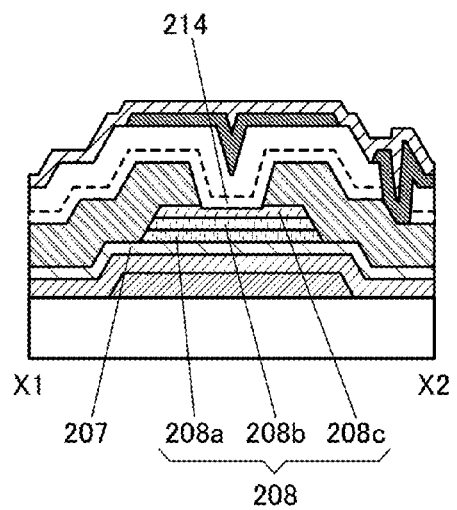
FIGS. 37A to 37D each illustrate a cross-sectional view of an example of a transistor.
Figure 37B:
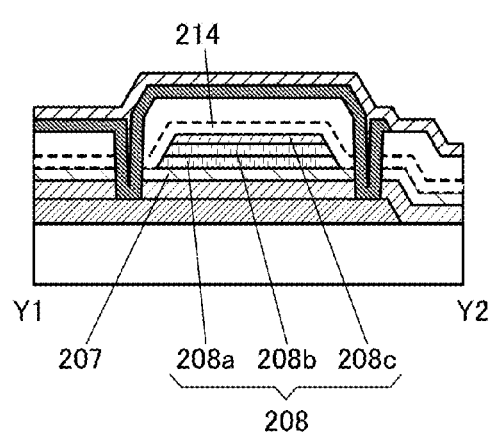

A transistor 270A in FIGS. 37A and 37B has the same structure as the transistor 270 in FIGS. 36B and 36C except that the oxide semiconductor film 208 has a three-layer stacked structure. Specifically, the oxide semiconductor film 208 of the transistor 270A includes an oxide semiconductor film 208a, an oxide semiconductor film 208b, and an oxide semiconductor film 208c.

Figure 37C:
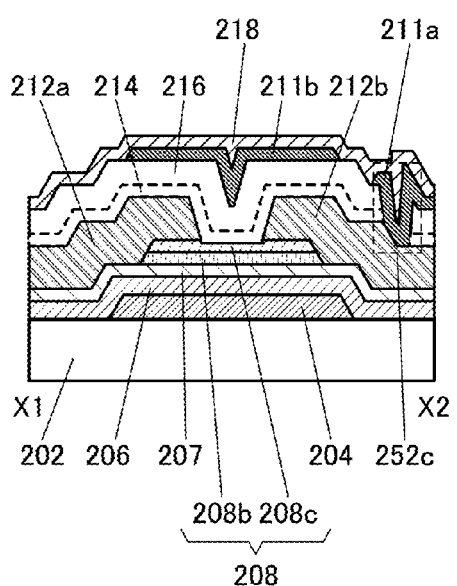
Figure 37D:
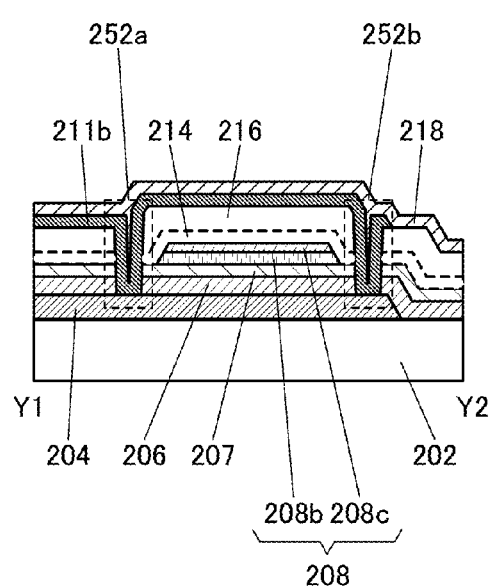

A transistor 270B in FIGS. 37C and 37D has the same structure as the transistor 270 in FIGS. 36B and 36C except that the oxide semiconductor film 208 has a two-layer stacked structure. Specifically, the oxide semiconductor film 208 of the transistor 270B includes the oxide semiconductor film 208b and the oxide semiconductor film 208c.

Here, a band structure including the oxide semiconductor films 208a, 208b, and 208c and insulating films in contact with the oxide semiconductor films 208b and 208c is described with reference to FIGS. 38A and 38B.

Figure 38A:
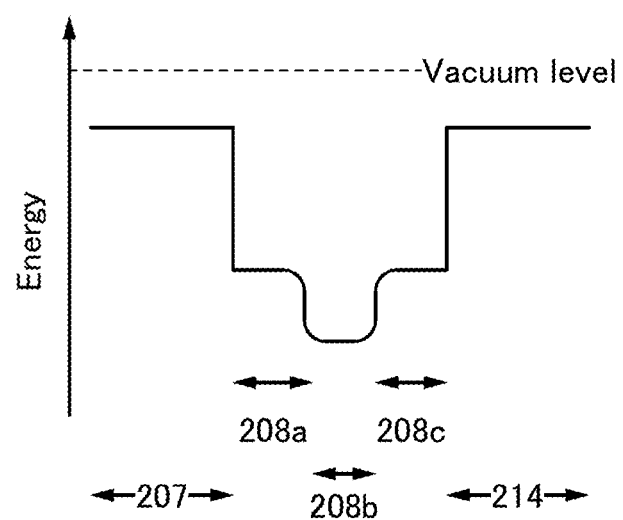
FIGS. 38A and 38B each illustrate a band structure.

FIG. 38A illustrates an example of a band structure in the thickness direction of a stacked-layer structure including the insulating film 207, the oxide semiconductor films 208a, 208b, and 208c, and the insulating film 214. FIG. 38B illustrates an example of a band structure in the thickness direction of a stacked-layer structure including the insulating film 207, the oxide semiconductor films 208b and 208c, and the insulating film 214. For easy understanding, the energy level of the conduction band minimum (Ec) of each of the insulating film 207, the oxide semiconductor films 208a, 208b, and 208c, and the insulating film 214 is shown in the band structures.

In the band structure of FIG. 38A, a silicon oxide film is used as each of the insulating films 207 and 214, an oxide semiconductor film formed using a metal oxide target having an atomic ratio of metal elements, In:Ga:Zn=1:1:1.2, is used as the oxide semiconductor film 208a, an oxide semiconductor film formed using a metal oxide target having an atomic ratio of metal elements, In:Ga:Zn=4:2:4.1, is used as the oxide semiconductor film 208b, and an oxide semiconductor film formed using a metal oxide target having an atomic ratio of metal elements, In:Ga:Zn=1:1:1.2, is used as the oxide semiconductor film 208c.

Figure 38B:
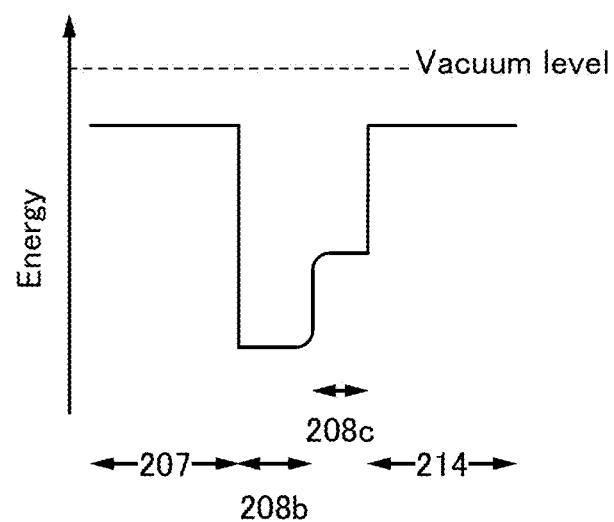

In the band structure of FIG. 38B, a silicon oxide film is used as each of the insulating films 207 and 214, an oxide semiconductor film formed using a metal oxide target having an atomic ratio of metal elements, In:Ga:Zn=4:2:4.1, is used as the oxide semiconductor film 208b, and an oxide semiconductor film formed using a metal oxide target having an atomic ratio of metal elements, In:Ga:Zn=1:1:1.2, is used as the oxide semiconductor film 208c.

As illustrated in FIGS. 38A and 38B, the energy level of the conduction band minimum gradually changes between the oxide semiconductor film 208a and the oxide semiconductor film 208b and between the oxide semiconductor film 208b and the oxide semiconductor film 208c. In other words, the energy level of the conduction band minimum is continuously changed or continuously connected. To obtain such a band structure, there exists no impurity, which forms a defect state such as a trap center or a recombination center, at the interface between the oxide semiconductor film 208a and the oxide semiconductor film 208b or at the interface between the oxide semiconductor film 208b and the oxide semiconductor film 208c.

To form a continuous junction between the oxide semiconductor film 208a and the oxide semiconductor film 208b and between the oxide semiconductor film 208b and the oxide semiconductor film 208c, it is necessary to form the films successively without exposure to the air by using a multi-chamber deposition apparatus (sputtering apparatus) provided with a load lock chamber.

With the band structure of FIG. 38A or FIG. 38B, the oxide semiconductor film 208b serves as a well, and a channel region is formed in the oxide semiconductor film 208b in the transistor with the stacked-layer structure.

By providing the oxide semiconductor film 208a and the oxide semiconductor film 208c, the oxide semiconductor film 208b can be distanced away from trap states.

In addition, the trap states might be more distant from the vacuum level than the energy level of the conduction band minimum (Ec) of the oxide semiconductor film 208b functioning as a channel region, so that electrons might easily be accumulated in the trap states. When the electrons are accumulated in the trap states, the electrons become negative fixed electric charge, so that the threshold voltage of the transistor is shifted in the positive direction. Therefore, it is preferable that the trap states be closer to the vacuum level than the energy level of the conduction band minimum (Ec) of the oxide semiconductor film 208b. Such a structure inhibits accumulation of electrons in the trap states. As a result, the on-state current and the field-effect mobility of the transistor can be increased.

The energy level of the conduction band minimum of each of the oxide semiconductor films 208a and 208c is closer to the vacuum level than that of the oxide semiconductor film 208b. Typically, a difference in energy level between the conduction band minimum of the oxide semiconductor film 208b and the conduction band minimum of each of the oxide semiconductor films 208a and 208c is 0.15 eV or more or 0.5 eV or more and 2 eV or less or 1 eV or less. That is, the difference between the electron affinity of each of the oxide semiconductor films 208a and 208c and the electron affinity of the oxide semiconductor film 208b is 0.15 eV or more or 0.5 eV or more and 2 eV or less or 1 eV or less.

In such a structure, the oxide semiconductor film 208b serves as a main path of current. That is, the oxide semiconductor film 208b functions as a channel region, and the oxide semiconductor films 208a and 208c function as oxide insulating films. In addition, since the oxide semiconductor films 208a and 208c each include one or more metal elements included in the oxide semiconductor film 208b in which a channel region is formed, interface scattering is less likely to occur at the interface between the oxide semiconductor film 208a and the oxide semiconductor film 208b or at the interface between the oxide semiconductor film 208b and the oxide semiconductor film 208c. Thus, the transistor can have high field-effect mobility because the movement of carriers is not hindered at the interface.

To prevent each of the oxide semiconductor films 208a and 208c from functioning as part of a channel region, a material having sufficiently low conductivity is used for the oxide semiconductor films 208a and 208c. Therefore, the oxide semiconductor films 208a and 208c can also be referred to as oxide insulating films for their physical properties and/or functions. A material which has a smaller electron affinity (a difference in energy level between the vacuum level and the conduction band minimum) than the oxide semiconductor film 208b and has a difference in energy level in the conduction band minimum from the oxide semiconductor film 208b (band offset) is used for the oxide semiconductor films 208a and 208c. Furthermore, to inhibit generation of a difference in threshold voltage due to the value of the drain voltage, it is preferable to form the oxide semiconductor films 208a and 208c using a material whose energy level of the conduction band minimum is closer to the vacuum level than that of the oxide semiconductor film 208b. For example, a difference in energy level between the conduction band minimum of the oxide semiconductor film 208b and the conduction band minimum of the oxide semiconductor films 208a and 208c is preferably 0.2 eV or more, further preferably 0.5 eV or more.

It is preferable that the oxide semiconductor films 208a and 208c not have a spinel crystal structure. This is because if the oxide semiconductor films 208a and 208c have a spinel crystal structure, constituent elements of the conductive films 212a and 212b might be diffused to the oxide semiconductor film 208b at the interface between the spinel crystal structure and another region. Note that each of the oxide semiconductor films 208a and 208c is preferably a CAAC-OS, in which case a higher blocking property against constituent elements of the conductive films 212a and 212b, for example, a copper element, is obtained.

The thickness of each of the oxide semiconductor films 208a and 208c is greater than or equal to a thickness that is capable of inhibiting diffusion of the constituent elements of the conductive films 212a and 212b to the oxide semiconductor film 208b, and less than a thickness that inhibits supply of oxygen from the insulating film 214 to the oxide semiconductor film 208b. For example, when the thickness of each of the oxide semiconductor films 208a and 208c is greater than or equal to 10 nm, diffusion of the constituent elements of the conductive films 212a and 212b to the oxide semiconductor film 208b can be inhibited. When the thickness of each of the oxide semiconductor films 208a and 208c is less than or equal to 100 nm, oxygen can be effectively supplied from the insulating film 214 to the oxide semiconductor film 208b.

Although the example where an oxide semiconductor film formed using a metal oxide target having an atomic ratio of metal elements, In:Ga:Zn=1:1:1.2, is used as each of the oxide semiconductor films 208a and 208c is described in this embodiment, one embodiment of the present invention is not limited thereto. For example, an oxide semiconductor film formed using a metal oxide target having an atomic ratio of metal elements, In:Ga:Zn=1:1:1, In:Ga:Zn=1:3:2, In:Ga:Zn=1:3:4, or In:Ga:Zn=1:3:6, may be used as each of the oxide semiconductor films 208a and 208c.

When the oxide semiconductor films 208a and 208c are formed using a metal oxide target having an atomic ratio of In:Ga:Zn=1:1:1, the oxide semiconductor films 208a and 208c have an atomic ratio of In:Ga:Zn=1:$\beta$1 ($0<\beta 1\leq 2$):$\beta$2 ($0<\beta 2\leq 3$) in some cases. When the oxide semiconductor films 208a and 208c are formed using a metal oxide target having an atomic ratio of In:Ga:Zn=1:3:4, the oxide semiconductor films 208a and 208c have an atomic ratio of In:Ga:Zn=1:$\beta$3 ($1\leq\beta 3\leq 5$):$\beta$4 ($2\leq\beta 4\leq 6$) in some cases. When the oxide semiconductor films 208a and 208c are formed using a metal oxide target having an atomic ratio of In:Ga:Zn=1:3:6, the oxide semiconductor films 208a and 208c have an atomic ratio of In:Ga:Zn=1:$\beta$5 ($1\leq\beta 5\leq 5$):$\beta$6 ($4\leq\beta 6\leq 8$) in some cases.

Figure 39A:
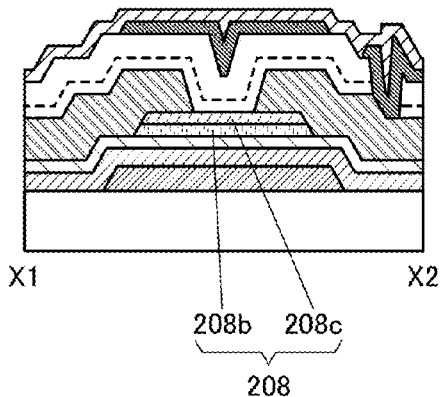
FIGS. 39A to 39D are cross-sectional views illustrating examples of transistors.
Figure 39B:
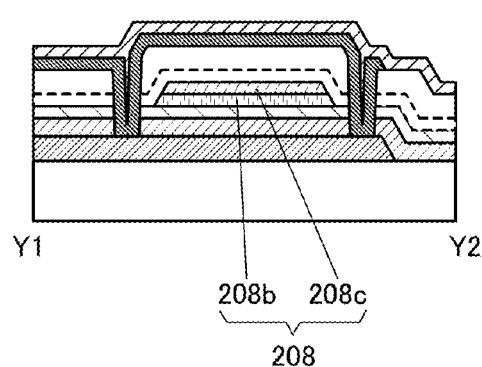

The drawings illustrate an example where the oxide semiconductor film 208 in the transistor 270 and the oxide semiconductor film 208c in the transistors 270A and 270B have a decreased thickness in a region which does not overlap with the conductive films 212a and 212b, that is, an example where part of the oxide semiconductor film has a depressed portion. However, one embodiment of the present invention is not limited thereto, and the oxide semiconductor film does not necessarily have a depressed region in a region which does not overlap with the conductive films 212a and 212b. FIGS. 39A and 39B illustrate an example in this case. FIGS. 39A and 39B are cross-sectional views illustrating an example of a transistor. Note that the transistor in FIGS. 39A and 39B has the same structure as the transistor 270B except that the oxide semiconductor film 208 does not have a depressed portion.

The structures of the transistors of this embodiment can be freely combined with each other.

This embodiment shows, but is not limited to, an example of using the oxide semiconductor film as a semiconductor film. For example, silicon, germanium, an organic semiconductor, or the like may be used as a semiconductor.

There is no particular limitation on the structure of the transistors included in the display device or semiconductor device of one embodiment of the present invention. For example, a forward staggered transistor or an inverted staggered transistor may be used. A top-gate transistor or a bottom-gate transistor may be used. Since transistors having any of a variety of structures can be employed, the display device or semiconductor device of one embodiment of the present invention can be mass-produced using an existing production line.

There is no particular limitation on the crystallinity of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. It is preferable that a semiconductor having crystallinity be used, in which case deterioration of the transistor characteristics can be suppressed.

Figure 39C:
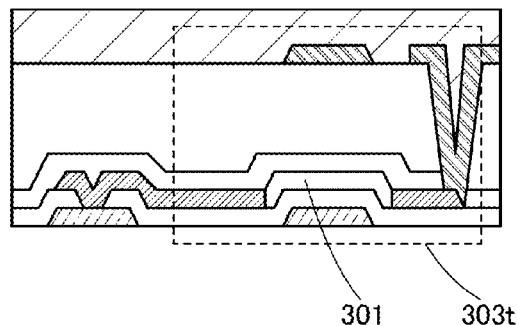
Figure 39D:
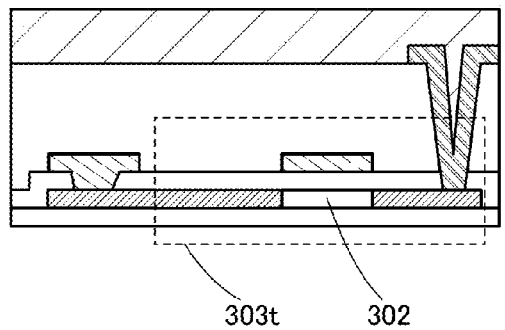

As an example, FIG. 39C illustrates a bottom-gate transistor 303t provided with a semiconductor film 301 including a polycrystalline silicon film that is obtained by a crystallization process such as laser annealing. As another example, FIG. 39D illustrates a bottom-gate transistor 303t provided with a semiconductor film 302 including a polycrystalline silicon film, a single crystal silicon film that is transferred from a single crystal silicon substrate or the like, or the like.

This embodiment can be combined with any of the other embodiments as appropriate.

Embodiment 3

In this embodiment, an example of an oxide semiconductor which can be used for the display device of one embodiment of the present invention will be described.

A structure of an oxide semiconductor will be described below.

In this specification, the term "parallel" indicates that the angle formed between two straight lines is greater than or equal to −10° and less than or equal to 10°, and accordingly also includes the case where the angle is greater than or equal to −5° and less than or equal to 5°. The term "substantially parallel" indicates that the angle formed between two straight lines is greater than or equal to −30° and less than or equal to 30°. In addition, the term "perpendicular" indicates that the angle formed between two straight lines is greater than or equal to 80° and less than or equal to 100°, and accordingly also includes the case where the angle is greater than or equal to 85° and less than or equal to 95°. In addition, the term "substantially perpendicular" indicates that the angle formed between two straight lines is greater than or equal to 60° and less than or equal to 120°.

In this specification, trigonal and rhombohedral crystal systems are included in a hexagonal crystal system.

An oxide semiconductor is classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

It is known that an amorphous structure is generally defined as being metastable and unfixed, and being isotropic and having no non-uniform structure. In other words, an amorphous structure has a flexible bond angle and a short-range order but does not have a long-range order.

This means that an inherently stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. Note that an a-like OS has a periodic structure in a microscopic region, but at the same time has a void and has an unstable structure. For this reason, an a-like OS has physical properties similar to those of an amorphous oxide semiconductor.

<CAAC-OS>

First, a CAAC-OS will be described.

The CAAC-OS is one of oxide semiconductors having a plurality of c-axis aligned crystal parts (also referred to as pellets).

In a combined analysis image (also referred to as a high-resolution TEM image) of a bright-field image and a diffraction pattern of a CAAC-OS, which is obtained using a transmission electron microscope (TEM), a plurality of pellets can be observed. However, in the high-resolution TEM image, a boundary between pellets, that is, a grain boundary is not clearly observed. Thus, in the CAAC-OS, a reduction in electron mobility due to the grain boundary is less likely to occur.

Figure 40A:
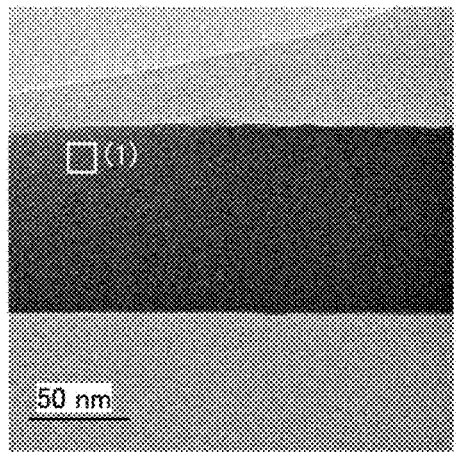
FIGS. 40A to 40D are Cs-corrected high-resolution TEM images of a cross section of a CAAC-OS and a cross-sectional schematic view of a CAAC-OS.

A CAAC-OS observed with a TEM will be described below. FIG. 40A shows a high-resolution TEM image of a cross section of the CAAC-OS which is observed from a direction substantially parallel to the sample surface. The high-resolution TEM image is obtained with a spherical aberration corrector function. The high-resolution TEM image obtained with a spherical aberration corrector function is particularly referred to as a Cs-corrected high-resolution TEM image. The Cs-corrected high-resolution TEM image can be obtained with, for example, an atomic resolution analytical electron microscope JEM-ARM200F manufactured by JEOL Ltd.

Figure 40B:
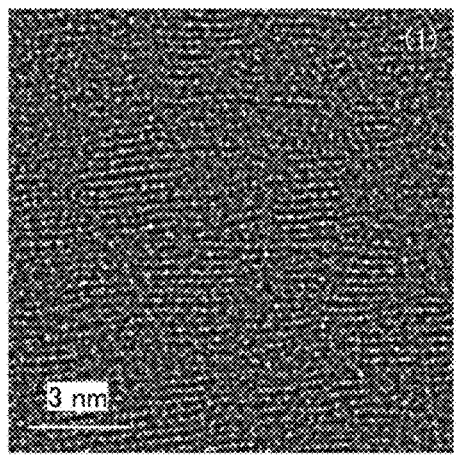

FIG. 40B is an enlarged Cs-corrected high-resolution TEM image of a region (1) in FIG. 40A. FIG. 40B shows that metal atoms are arranged in a layered manner in a pellet. Each metal atom layer has a configuration reflecting unevenness of a surface over which a CAAC-OS film is formed (hereinafter, the surface is also referred to as a formation surface) or a top surface of the CAAC-OS film, and is arranged parallel to the formation surface or the top surface of the CAAC-OS film.

Figure 40C:
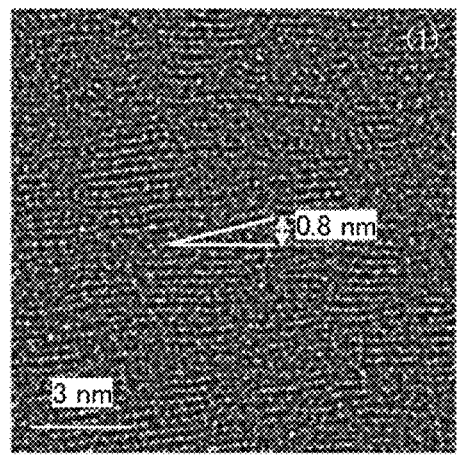

As shown in FIG. 40B, the CAAC-OS has a characteristic atomic arrangement. The characteristic atomic arrangement is denoted by an auxiliary line in FIG. 40C. FIGS. 40B and 40C prove that the size of a pellet is greater than or equal to 1 nm or greater than or equal to 3 nm, and the size of a space caused by tilt of the pellets is approximately 0.8 nm. Therefore, the pellet can also be referred to as a nanocrystal (nc). Furthermore, the CAAC-OS can also be referred to as an oxide semiconductor including c-axis aligned nanocrystals (CANC).

Figure 40D:
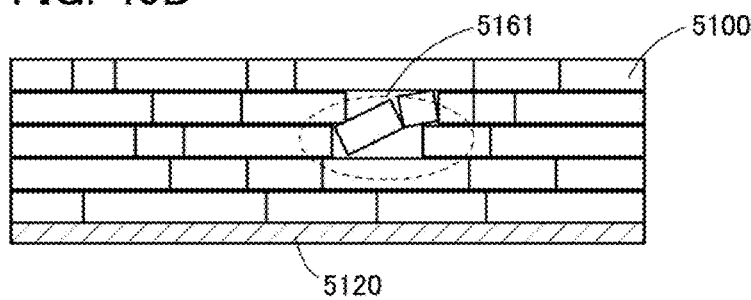

Here, according to the Cs-corrected high-resolution TEM images, the schematic arrangement of pellets 5100 of a CAAC-OS over a substrate 5120 is illustrated by such a structure in which bricks or blocks are stacked (see FIG. 40D). The part in which the pellets are tilted as observed in FIG. 40C corresponds to a region 5161 shown in FIG. 40D.

FIG. 41A shows a Cs-corrected high-resolution TEM image of a plane of the CAAC-OS observed from a direction substantially perpendicular to the sample surface. FIGS. 41B, 41C, and 41D are enlarged Cs-corrected high-resolution TEM images of regions (1), (2), and (3) in FIG. 41A, respectively. FIGS. 41B, 41C, and 41D indicate that metal atoms are arranged in a triangular, quadrangular, or hexagonal configuration in a pellet. However, there is no regularity of arrangement of metal atoms between different pellets.

Figure 42A:
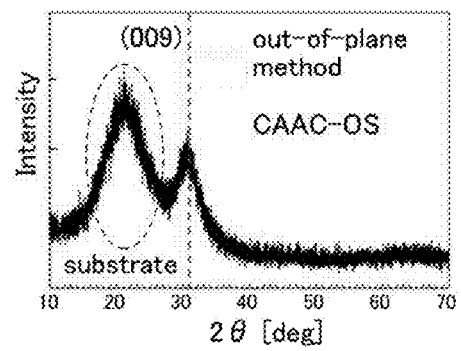
FIGS. 42A to 42C show structural analysis of a CAAC-OS and a single crystal oxide semiconductor by XRD.

Next, a CAAC-OS analyzed by X-ray diffraction (XRD) will be described. For example, when the structure of a CAAC-OS including an $InGaZnO_4$ crystal is analyzed by an out-of-plane method, a peak appears at a diffraction angle ($2\theta$) of around 31° as shown in FIG. 42A. This peak is derived from the (009) plane of the $InGaZnO_4$ crystal, which indicates that crystals in the CAAC-OS have c-axis alignment, and that the c-axes are aligned in a direction substantially perpendicular to the formation surface or the top surface of the CAAC-OS.

Note that in structural analysis of the CAAC-OS by an out-of-plane method, another peak may appear when $2\theta$ is around 36°, in addition to the peak at $2\theta$ of around 31°. The peak at $2\theta$ of around 36° indicates that a crystal having no c-axis alignment is included in part of the CAAC-OS. It is preferable that in the CAAC-OS analyzed by an out-of-plane method, a peak appear when $2\theta$ is around 31° and that a peak not appear when $2\theta$ is around 36°.

Figure 42B:
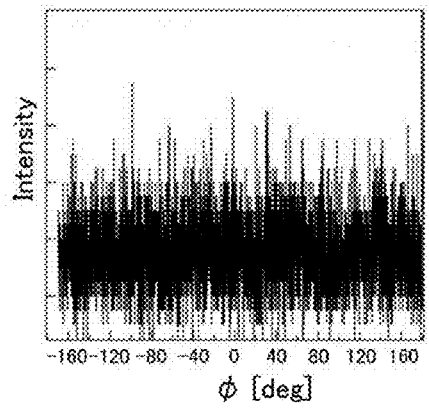
Figure 42C:
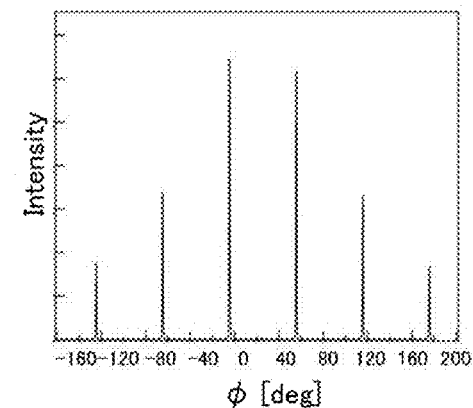

On the other hand, in structural analysis of the CAAC-OS by an in-plane method in which an X-ray beam is incident on a sample in a direction substantially perpendicular to the c-axis, a peak appears when $2\theta$ is around 56°. This peak is attributed to the (110) plane of the $InGaZnO_4$ crystal. In the case of the CAAC-OS, when analysis ($\varphi$ scan) is performed with $2\theta$ fixed at around 56° and with the sample rotated using a normal vector of the sample surface as an axis ($\varphi$ axis), as shown in FIG. 42B, a peak is not clearly observed. In contrast, in the case of a single crystal oxide semiconductor of $InGaZnO_4$, when $\varphi$ scan is performed with $2\theta$ fixed at around 56°, as shown in FIG. 42C, six peaks which are derived from crystal planes equivalent to the (110) plane are observed. Accordingly, the structural analysis using XRD shows that the directions of a-axes and b-axes are irregularly oriented in the CAAC-OS.

Next, a CAAC-OS analyzed by electron diffraction will be described. For example, when an electron beam with a probe diameter of 300 nm is incident on a CAAC-OS including an $InGaZnO_4$ crystal in a direction parallel to the sample surface, a diffraction pattern (also referred to as a selected-area transmission electron diffraction pattern) shown in FIG. 43A can be obtained. In this diffraction pattern, spots derived from the (009) plane of an $InGaZnO_4$ crystal are included. Thus, the electron diffraction also indicates that pellets included in the CAAC-OS have c-axis alignment and that the c-axes are aligned in a direction substantially perpendicular to the formation surface or the top surface of the CAAC-OS. Meanwhile, FIG. 43B shows a diffraction pattern obtained in such a manner that an electron beam with a probe diameter of 300 nm is incident on the same sample in a direction perpendicular to the sample surface. As shown in FIG. 43B, a ring-like diffraction pattern is observed. Thus, the electron diffraction also indicates that the a-axes and b-axes of the pellets included in the CAAC-OS do not have regular alignment. The first ring in FIG. 43B is considered to be derived from the (010) plane, the (100) plane, and the like of the $InGaZnO_4$ crystal. The second ring in FIG. 43B is considered to be derived from the (110) plane and the like.

As described above, the CAAC-OS is an oxide semiconductor with high crystallinity. Entry of impurities, formation of defects, or the like might decrease the crystallinity of an oxide semiconductor. This means that the CAAC-OS has small amounts of impurities and defects (e.g., oxygen vacancies).

Note that the impurity means an element other than the main components of the oxide semiconductor, such as hydrogen, carbon, silicon, or a transition metal element. For example, an element (specifically, silicon or the like) having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

The characteristics of an oxide semiconductor having impurities or defects might be changed by light, heat, or the like. Impurities contained in the oxide semiconductor might serve as carrier traps or carrier generation sources, for example. Furthermore, oxygen vacancies in the oxide semiconductor serve as carrier traps or serve as carrier generation sources when hydrogen is captured therein.

The CAAC-OS having small amounts of impurities and oxygen vacancies is an oxide semiconductor with low carrier density. Specifically, an oxide semiconductor with a carrier density of lower than $8\times10^{11}/cm^3$, preferably lower than $1\times10^{11}/cm^3$, further preferably lower than $1\times10^{10}/cm^3$, and higher than or equal to $1\times10^{-9}/cm^3$ can be used. A CAAC-OS has a low impurity concentration and a low density of defect states. Thus, the CAAC-OS can be referred to as an oxide semiconductor having stable characteristics.

<nc-OS>

Next, an nc-OS will be described.

An nc-OS has a region in which a crystal part is observed and a region in which a crystal part is not clearly observed in a high-resolution TEM image. In most cases, the size of a crystal part included in the nc-OS is greater than or equal to 1 nm and less than or equal to 10 nm, or greater than or equal to 1 nm and less than or equal to 3 nm. Note that an oxide semiconductor including a crystal part whose size is greater than 10 nm and less than or equal to 100 nm is sometimes referred to as a microcrystalline oxide semiconductor. In a high-resolution TEM image of the nc-OS, for example, a grain boundary is not clearly observed in some cases. Note that there is a possibility that the origin of the nanocrystal is the same as that of a pellet in a CAAC-OS. Therefore, a crystal part of the nc-OS may be referred to as a pellet in the following description.

In the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different pellets in the nc-OS. Thus, the orientation of the whole film is not observed. Accordingly, the nc-OS cannot be distinguished from an a-like OS or an amorphous oxide semiconductor, depending on an analysis method. For example, when the nc-OS is analyzed by an out-of-plane method using an X-ray beam having a diameter larger than the size of a pellet, a peak which shows a crystal plane does not appear. Furthermore, a diffraction pattern like a halo pattern is observed when the nc-OS is subjected to electron diffraction using an electron beam with a probe diameter (e.g., 50 nm or larger) that is larger than the size of a pellet. Meanwhile, spots appear in a nanobeam electron diffraction pattern of the nc-OS when an electron beam having a probe diameter close to or smaller than the size of a pellet is applied. Moreover, in a nanobeam electron diffraction pattern of the nc-OS, bright regions in a circular (ring) pattern are shown in some cases. Also in a nanobeam electron diffraction pattern of the nc-OS, a plurality of spots is shown in a ring-like region in some cases.

Since there is no regularity of crystal orientation between the pellets (nanocrystals) as mentioned above, the nc-OS can also be referred to as an oxide semiconductor including random aligned nanocrystals (RANC) or an oxide semiconductor including non-aligned nanocrystals (NANC).

The nc-OS is an oxide semiconductor that has high regularity as compared with an amorphous oxide semiconductor. Therefore, the nc-OS is likely to have a lower density of defect states than an a-like OS and an amorphous oxide semiconductor. Note that there is no regularity of crystal orientation between different pellets in the nc-OS. Therefore, the nc-OS has a higher density of defect states than the CAAC-OS.

<a-Like OS>

An a-like OS has a structure intermediate between those of the nc-OS and the amorphous oxide semiconductor.

In a high-resolution TEM image of the a-like OS, a void may be observed. Furthermore, in the high-resolution TEM image, there are a region where a crystal part is clearly observed and a region where a crystal part is not observed.

The a-like OS has an unstable structure because it includes a void. To verify that an a-like OS has an unstable structure as compared with a CAAC-OS and an nc-OS, a change in structure caused by electron irradiation is described below.

An a-like OS (referred to as Sample A), an nc-OS (referred to as Sample B), and a CAAC-OS (referred to as Sample C) are prepared as samples subjected to electron irradiation. Each of the samples is an In—Ga—Zn oxide.

First, a high-resolution cross-sectional TEM image of each sample is obtained. The high-resolution cross-sectional TEM images show that all the samples have crystal parts.

Note that which part is regarded as a crystal part is determined as follows. It is known that a unit cell of an InGaZnO$_4$ crystal has a structure in which nine layers including three In—O layers and six Ga—Zn—O layers are stacked in the c-axis direction. The distance between the adjacent layers is equivalent to the lattice spacing on the (009) plane (also referred to as d value). The value is calculated to be 0.29 nm from crystal structural analysis. Accordingly, a portion where the lattice spacing between lattice fringes is greater than or equal to 0.28 nm and less than or equal to 0.30 nm is regarded as a crystal part of InGaZnO$_4$. Each of lattice fringes corresponds to the a-b plane of the InGaZnO$_4$ crystal.

Figure 44:
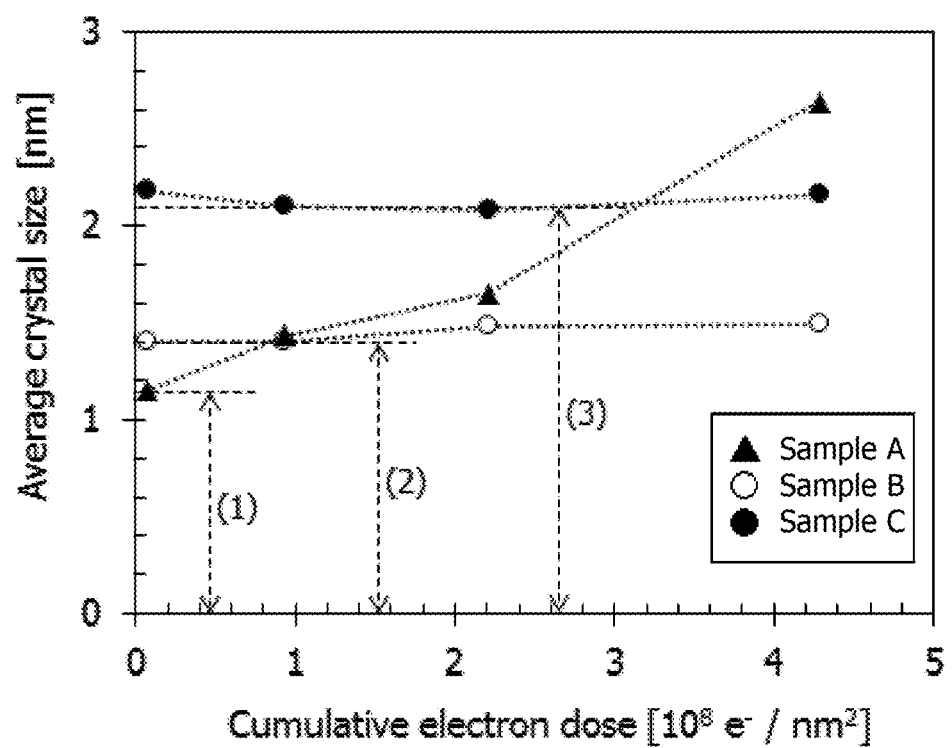
FIG. 44 shows a change in crystal part of an In—Ga—Zn oxide induced by electron irradiation.

FIG. 44 shows change in the average size of crystal parts (at 22 points to 45 points) in each sample. Note that the crystal part size corresponds to the length of a lattice fringe. FIG. 44 indicates that the crystal part size in the a-like OS increases with an increase in the cumulative electron dose. Specifically, as shown by (1) in FIG. 44, a crystal part of approximately 1.2 nm (also referred to as an initial nucleus) at the start of TEM observation grows to a size of approximately 2.6 nm at a cumulative electron dose of $4.2\times10^8$ e$^-$/nm$^2$. In contrast, the crystal part size in the nc-OS and the CAAC-OS shows little change from the start of electron irradiation to a cumulative electron dose of $4.2\times10^8$ e$^-$/nm$^2$. Specifically, as shown by (2) and (3) in FIG. 44, the average crystal sizes in an nc-OS and a CAAC-OS are approximately 1.4 nm and approximately 2.1 nm, respectively, regardless of the cumulative electron dose.

In this manner, growth of the crystal part in the a-like OS is induced by electron irradiation. In contrast, in the nc-OS and the CAAC-OS, growth of the crystal part is hardly induced by electron irradiation. Therefore, the a-like OS has an unstable structure as compared with the nc-OS and the CAAC-OS.

The a-like OS has a lower density than the nc-OS and the CAAC-OS because it includes a void. Specifically, the density of the a-like OS is higher than or equal to 78.6% and lower than 92.3% of the density of the single crystal oxide semiconductor having the same composition. The density of each of the nc-OS and the CAAC-OS is higher than or equal to 92.3% and lower than 100% of the density of the single crystal oxide semiconductor having the same composition. It is difficult to deposit an oxide semiconductor having a density of lower than 78% of the density of the single crystal oxide semiconductor.

For example, in the case of an oxide semiconductor having an atomic ratio of In:Ga:Zn=1:1:1, the density of single crystal InGaZnO$_4$ with a rhombohedral crystal structure is 6.357 g/cm$^3$. Accordingly, in the case of the oxide semiconductor having an atomic ratio of In:Ga:Zn=1:1:1, the density of the a-like OS is higher than or equal to 5.0 g/cm$^3$ and lower than 5.9 g/cm$^3$. For example, in the case of the oxide semiconductor having an atomic ratio of In:Ga:Zn=1:1:1, the density of each of the nc-OS and the CAAC-OS is higher than or equal to 5.9 g/cm$^3$ and lower than 6.3 g/cm$^3$.

Note that there is a possibility that an oxide semiconductor having a certain composition cannot exist in a single crystal structure. In that case, single crystal oxide semiconductors with different compositions are combined at an adequate ratio, which makes it possible to calculate a density equivalent to that of a single crystal oxide semiconductor with the desired composition. The density of a single crystal oxide semiconductor having the desired composition can be calculated using a weighted average according to the combination ratio of the single crystal oxide semiconductors with different compositions. Note that it is preferable to use as few kinds of single crystal oxide semiconductors as possible to calculate the density.

As described above, oxide semiconductors have various structures and various properties. Note that an oxide semiconductor may be a stacked layer including two or more films of an amorphous oxide semiconductor, an a-like OS, an nc-OS, and a CAAC-OS, for example.

<Method for Forming CAAC-OS Film>

An example of a method for forming a CAAC-OS film will be described below.

Figure 45:
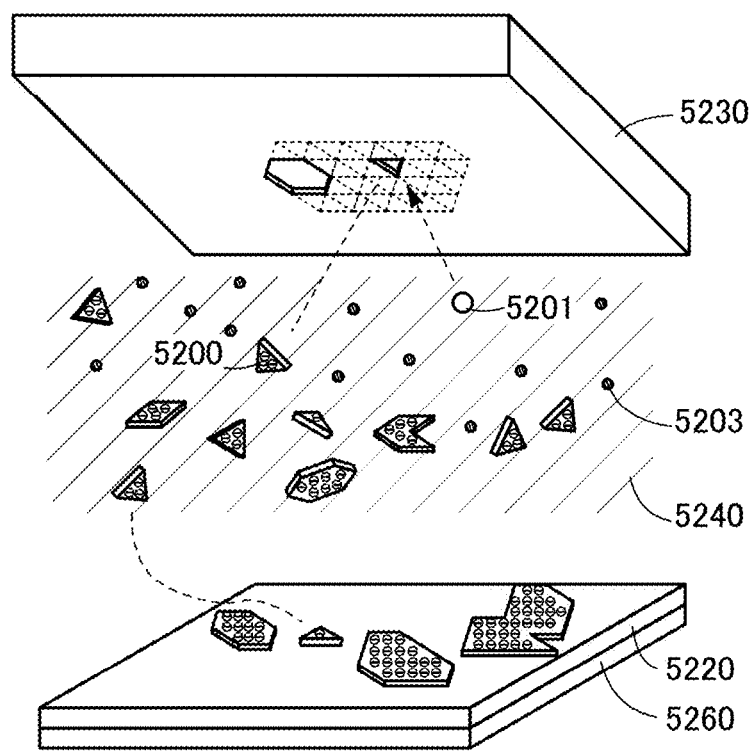
FIG. 45 illustrates a method for forming a CAAC-OS film.

FIG. 45 is a schematic view of the inside of a deposition chamber. The CAAC-OS film can be formed by a sputtering method.

As shown in FIG. 45, a substrate 5220 and a target 5230 are arranged to face each other. Plasma 5240 is generated between the substrate 5220 and the target 5230. A heating mechanism 5260 is under the substrate 5220. The target 5230 is attached to a backing plate (not illustrated in the drawing). A plurality of magnets are arranged to face the target 5230 with the backing plate positioned therebetween. A sputtering method in which the deposition rate is increased by utilizing a magnetic field of magnets is referred to as a magnetron sputtering method.

The distance d between the substrate 5220 and the target 5230 (also referred to as a target-substrate distance (T-S distance)) is greater than or equal to 0.01 m and less than or equal to 1 m, preferably greater than or equal to 0.02 m and less than or equal to 0.5 m. The deposition chamber is mostly filled with a deposition gas (e.g., an oxygen gas, an argon gas, or a mixed gas containing oxygen at 5 volume % or higher) and the pressure in the deposition chamber is controlled to be higher than or equal to 0.01 Pa and lower than or equal to 100 Pa, preferably higher than or equal to 0.1 Pa and lower than or equal to 10 Pa. Here, discharge starts by application of a certain voltage or higher to the target 5230, and the plasma 5240 can be observed. The magnetic field forms a high-density plasma region in the vicinity of the target 5230. In the high-density plasma region, the deposition gas is ionized, so that an ion 5201 is generated. Examples of the ion 5201 include an oxygen cation (O$^+$) and an argon cation (Ar$^+$).

Figure 46A:
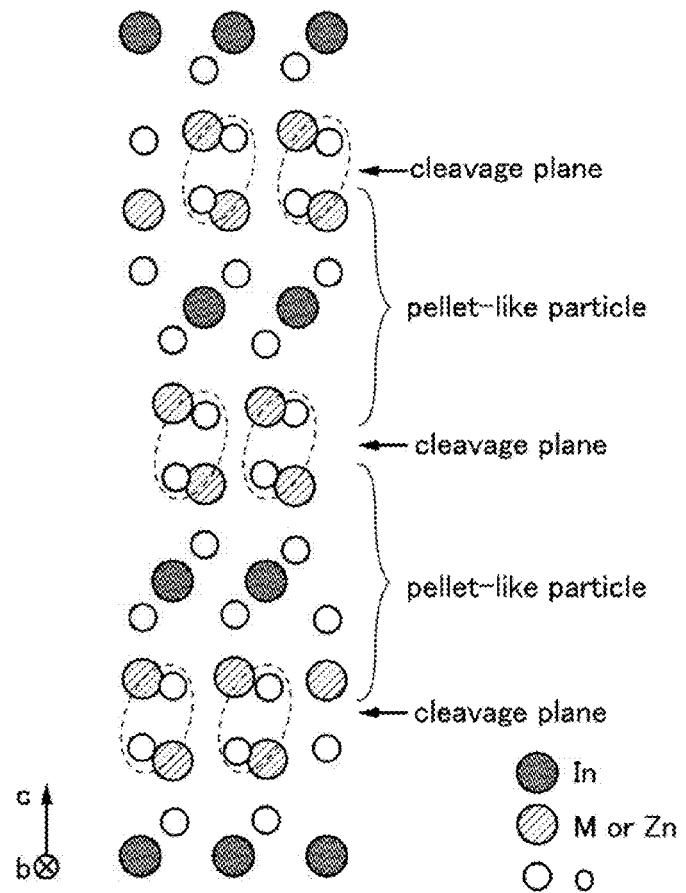
FIGS. 46A to 46C illustrate a crystal of $InMZnO_4$.
Figure 46B:
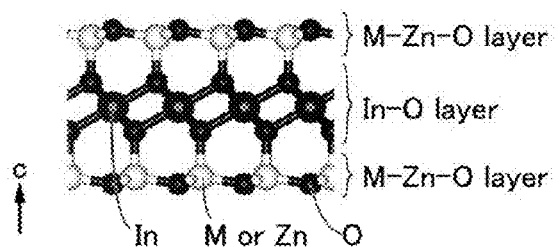
Figure 46C:
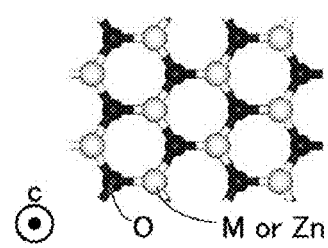

Here, the target 5230 has a polycrystalline structure which includes a plurality of crystal grains and in which a cleavage plane exists in any of the crystal grains. FIGS. 46A to 46C show a crystal structure of InMZnO$_4$ (the element M is Al, Ga, Y, or Sn, for example) included in the target 5230 as an example. Note that FIG. 46A illustrates the crystal structure of InMZnO$_4$ observed from a direction parallel to the b-axis. In the crystal of InMZnO$_4$, oxygen atoms are negatively charged, whereby repulsive force is generated between two adjacent M-Zn—O layers. Thus, the InMZnO$_4$ crystal has a cleavage plane between two adjacent M-Zn—O layers.

The ion 5201 generated in the high-density plasma region is accelerated toward the target 5230 side by an electric field, and then collides with the target 5230. At this time, a pellet 5200 which is a flat-plate-like or pellet-like sputtered particle is separated from the cleavage plane (see FIG. 45). The pellet 5200 corresponds to a portion between two cleavage planes shown in FIG. 46A. Thus, when the pellet 5200 is observed, the cross section thereof is as shown in FIG. 46B, and the top surface thereof is as shown in FIG. 46C. Note that the structure of the pellet 5200 may be distorted by an impact of collision of the ion 5201.

The pellet 5200 is a flat-plate-like (pellet-like) sputtered particle having a triangle plane, e.g., a regular triangle plane. Alternatively, the pellet 5200 is a flat-plate-like (pellet-like) sputtered particle having a hexagon plane, e.g., a regular hexagon plane. However, the shape of a flat plane of the pellet 5200 is not limited to a triangle or a hexagon. For example, the flat plane may have a shape formed by combining two or more triangles. For example, a quadrangle (e.g., a rhombus) may be formed by combining two triangles (e.g., regular triangles).

The thickness of the pellet 5200 is determined depending on the kind of the deposition gas and the like. For example, the thickness of the pellet 5200 is greater than or equal to 0.4 nm and less than or equal to 1 nm, preferably greater than or equal to 0.6 nm and less than or equal to 0.8 nm. In addition, for example, the width of the pellet 5200 is greater than or equal to 1 nm and less than or equal to 100 nm, preferably greater than or equal to 2 nm and less than or equal to 50 nm, further preferably greater than or equal to 3 nm and less than or equal to 30 nm. For example, the ion 5201 collides with the target 5230 including the In-M-Zn oxide. Then, the pellet 5200 including three layers of an M-Zn—O layer, an In—O layer, and an M-Zn—O layer is separated. Note that along with the separation of the pellet 5200, particles 5203 are also sputtered from the target 5230. The particles 5203 each have an atom or an aggregate of several atoms. Therefore, the particles 5203 can be referred to as atomic particles.

The surface of the pellet 5200 may be negatively or positively charged when the pellet 5200 passes through the plasma 5240. For example, the pellet 5200 receives a negative charge from O$^{2-}$ in the plasma 5240. As a result, oxygen atoms on the surfaces of the pellet 5200 may be negatively charged. In addition, the pellet 5200 may grow by being bonded with indium, the element M, zinc, oxygen, or the like in the plasma 5240 when passing through the plasma 5240.

The pellet 5200 and the particles 5203 that have passed through the plasma 5240 reach a surface of the substrate 5220. Note that some of the particles 5203 are discharged to the outside by a vacuum pump or the like because of their smallness in mass.

Next, deposition of the pellets 5200 and the particles 5203 on the surface of the substrate 5220 is described with reference to FIGS. 47A to 47F.

First, a first pellet 5200 is deposited on the substrate 5220. Since the pellet 5200 has a flat-plate-like shape, it is deposited with its flat plane facing the surface of the substrate 5220. At this time, a charge on a surface of the pellet 5200 on the substrate 5220 side is lost through the substrate 5220.

Next, a second pellet 5200 reaches the substrate 5220. Since a surface of the first pellet 5200 and a surface of the second pellet 5200 are charged, they repel each other. As a result, the second pellet 5200 avoids being deposited on the first pellet 5200, and is deposited with its flat plane facing the surface of the substrate 5220 so as to be a little distance away from the first pellet 5200. With repetition of this, millions of the pellets 5200 are deposited on the surface of the substrate 5220 to have a thickness of one layer. A region where no pellet 5200 is deposited is generated between adjacent pellets 5200 (see FIG. 47A).

Then, the particles 5203 that have received energy from plasma reach the surface of the substrate 5220. The particles 5203 cannot be deposited on an active region such as the surfaces of the pellets 5200. For this reason, the particles 5203 move to regions where no pellet 5200 is deposited and are attached to side surfaces of the pellets 5200. Since available bonds of the particles 5203 are activated by energy received from plasma, the particles 5203 are chemically bonded to the pellets 5200 to form lateral growth portions 5202 (see FIG. 47B).

Figure 47A:
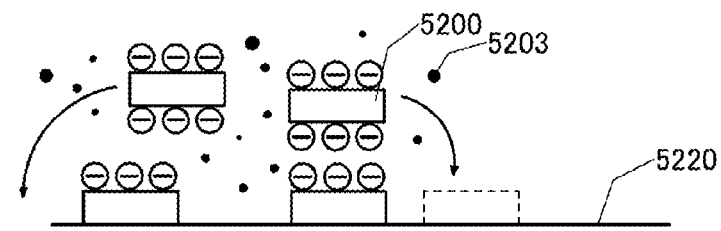
FIGS. 47A to 47F illustrate a deposition method of a CAAC-OS.
Figure 47B:
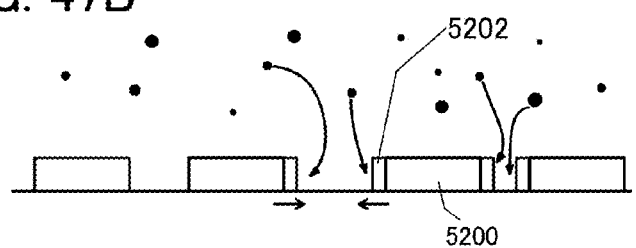
Figure 47C:
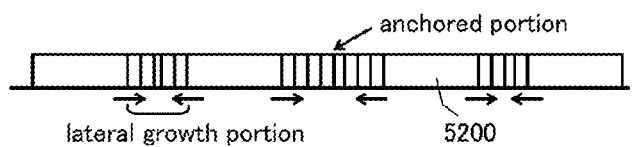

The lateral growth portions 5202 then further grow laterally so that the pellets 5200 are anchored to each other (see FIG. 47C). In this manner, the lateral growth portions 5202 are formed until they fill regions where no pellet 5200 is deposited. This mechanism is similar to a deposition mechanism for an atomic layer deposition (ALD) method.

Even when the deposited pellets 5200 are oriented in different directions, the particles 5203 cause a lateral growth to fill gaps between the pellets 5200; thus, no clear grain boundary is formed. In addition, as the particles 5203 make a smooth connection between the pellets 5200, a crystal structure different from single crystal and polycrystalline structures is formed. In other words, a crystal structure including distortion between minute crystal regions (pellets 5200) is formed. Regions filling the gaps between the crystal regions are distorted crystal regions, and thus, it will not be appropriate to say that the regions have an amorphous structure.

Figure 47D:
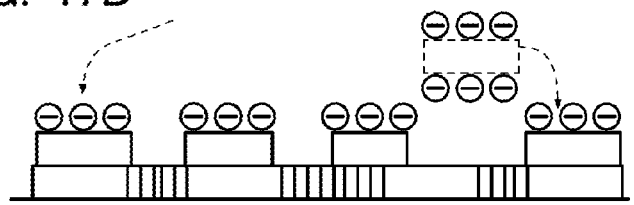
Figure 47E:
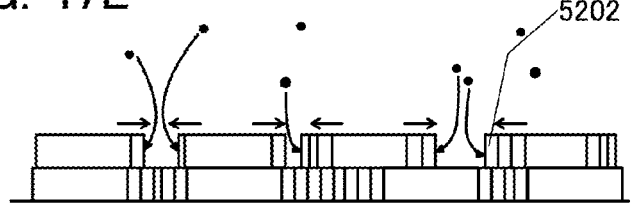
Figure 47F:
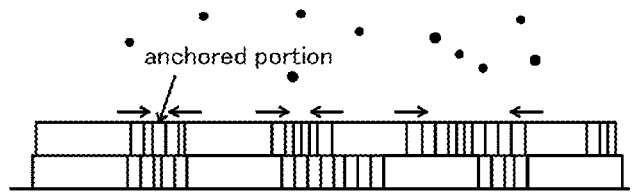

Next, new pellets 5200 are deposited with their flat planes facing the surface of the substrate 5220 (see FIG. 47D). After that, the particles 5203 are deposited so as to fill regions where no pellet 5200 is deposited, thereby forming the lateral growth portions 5202 (see FIG. 47E). In such a manner, the particles 5203 are attached to side surfaces of the pellets 5200 and the lateral growth portions 5202 cause a lateral growth so that the pellets 5200 in the second layer are anchored to each other (see FIG. 47F). Deposition continues until the m-th layer (m is an integer of two or more) is formed; as a result, a stacked-layer thin film structure is formed.

How the pellets 5200 are deposited depends also on the surface temperature of the substrate 5220 or the like. For example, if the surface temperature of the substrate 5220 is high, migration of the pellets 5200 occurs over the surface of the substrate 5220. As a result, the proportion of the pellets 5200 that are directly connected with each other without the particles 5203 increases, whereby a CAAC-OS with high orientation is made. The surface temperature of the substrate 5220 for formation of the CAAC-OS film is higher than or equal to room temperature and lower than 340° C., preferably higher than or equal to room temperature and lower than or equal to 300° C., further preferably higher than or equal to 100° C. and lower than or equal to 250° C., still further preferably higher than or equal to 100° C. and lower than or equal to 200° C. Therefore, even when a large-sized substrate of the 8th generation or a larger substrate is used as the substrate 5220, a warp or the like due to the formation of the CAAC-OS film hardly occurs.

In contrast, if the surface temperature of the substrate 5220 is low, the migration of the pellets 5200 over the substrate 5220 does not easily occur. As a result, the pellets 5200 are stacked to form an nc-OS or the like with low orientation. In the nc-OS, the pellets 5200 are possibly deposited with certain gaps when the pellets 5200 are negatively charged. Therefore, the nc-OS has low orientation but has some regularity, and thus it has a denser structure than an amorphous oxide semiconductor.

When gaps between pellets are extremely small in a CAAC-OS, the pellets may form a large pellet. The inside of the large pellet has a single crystal structure. For example, the size of the pellet may be greater than or equal to 10 nm and less than or equal to 200 nm, greater than or equal to 15 nm and less than or equal to 100 nm, or greater than or equal to 20 nm and less than or equal to 50 nm, when seen from the above.

The pellets are considered to be deposited on the surface of the substrate according to such a deposition model. A CAAC-OS can be deposited even when a formation surface does not have a crystal structure. This indicates that the above-described deposition model, which is a growth mechanism different from an epitaxial growth, has high validity. In addition, with the above-described deposition model, a uniform CAAC-OS or nc-OS film can be formed even over a large-sized glass substrate or the like. Even when the surface of the substrate (formation surface) has an amorphous structure (e.g., amorphous silicon oxide), for example, a CAAC-OS film can be formed.

In addition, even when the surface of the substrate (formation surface) has an uneven shape, the pellets are aligned along the shape.

The above-described deposition model suggests that a CAAC-OS film with high crystallinity can be formed in the following manner: deposition is performed in a high vacuum to have a long mean free path, plasma energy is weakened to reduce damage around a substrate, and thermal energy is applied to a formation surface to repair damage due to plasma during deposition.

The above-described deposition model can be used not only for the case where a target has a polycrystalline structure of a composite oxide with a plurality of crystal grains, such as an In-M-Zn oxide, and any of the crystal grains have a cleavage plane, but also for the case where, for example, a target of a mixture containing indium oxide, an oxide of the element M, and zinc oxide is used.

Since there is no cleavage plane in a target of a mixture, atomic particles are separated from the target by sputtering. During deposition, a high electric field region of plasma is formed around a target. Because of the high electric field region of plasma, atomic particles separated from the target are anchored to each other to cause a lateral growth. For example, indium atoms, which are atomic particles, are anchored to each other and cause a lateral growth to be a nanocrystal formed of an In—O layer, and then an M-Zn—O layer is bonded above and below the nanocrystalline In—O layer so as to complement the nanocrystalline In—O layer. In this manner, a pellet can be formed even when a target of a mixture is used. Accordingly, the above-described deposition model can also be applied to the case of using a target of a mixture.

Note that in the case where a high electric field region of plasma is not formed around a target, only atomic particles separated from the targets are deposited on a substrate surface. In that case, a lateral growth of an atomic particle might occur on the substrate surface. However, since the orientations of atomic particles are not the same, the crystal orientation in the resulting thin film is not uniform. As a result, an nc-OS or the like is obtained.

This embodiment can be combined with any of the other embodiments as appropriate.

Embodiment 4

In this embodiment, a method for driving the display device of one embodiment of the present invention will be described with reference to FIGS. 48A and 48B, FIGS. 49A and 49B, FIGS. 50A to 50E, and FIGS. 51A to 51E.

The display device of one embodiment of the present invention may include an information processing portion, an arithmetic portion, a memory portion, a display portion, an input portion, and the like.

In the display device of one embodiment of the present invention, power consumption can be reduced by reducing the number of times of writing signals for the same image (also referred to as "refresh operation") in the case where the same image (still image) is continuously displayed. Note that the frequency of the refresh operation is referred to as a refresh rate (also referred to as scan frequency or vertical synchronization frequency). A display device in which the refresh rate is reduced and which causes little eye fatigue is described below.

The eye strain is divided into two categories: nerve strain and muscle strain. The nerve strain is caused by prolonged looking at images or blinking on a display screen of a display device. This is because the brightness of the display screen stimulates and fatigues the retina and nerve of the eye and the brain. The muscle strain is caused by overuse of a ciliary muscle which works for adjusting the focus.

Figure 48A:
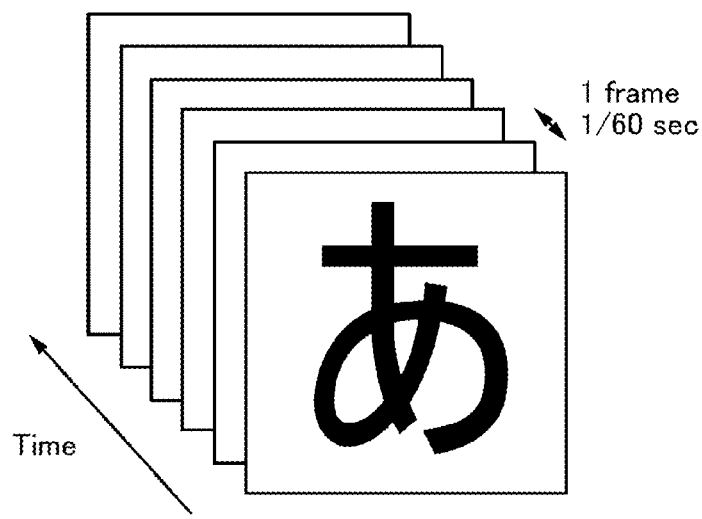
FIGS. 48A and 48B each illustrate a display example of a display device.

FIG. 48A is a schematic diagram illustrating display of a conventional display device. As illustrated in FIG. 48A, in the conventional display device, image rewriting is performed 60 times per second. A prolonged looking at such a screen might stimulate the retina and nerve of the eye and the brain of a user and lead to eye strain.

In the display device of one embodiment of the present invention, a transistor with an oxide semiconductor, e.g., a transistor with a CAAC-OS, is used in a pixel portion of the display device. The off-state current of the transistor is extremely low. Thus, the luminance of the display device can be maintained even when the refresh rate of the display device is reduced.

Figure 48B:
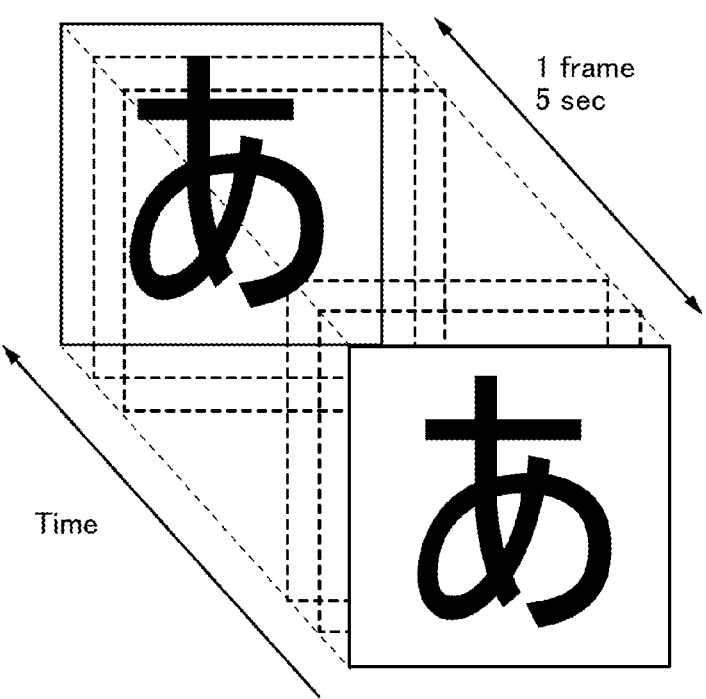

That is, for example, the number of times of image rewriting can be reduced to once every five seconds as shown in FIG. 48B. The same image can be seen for as long as possible and flickers on a screen perceived by a user can be reduced. This makes it possible to reduce stimuli given to the retina and nerve of the eye and the brain of a user, resulting in less nerve strain.

Figure 49A:
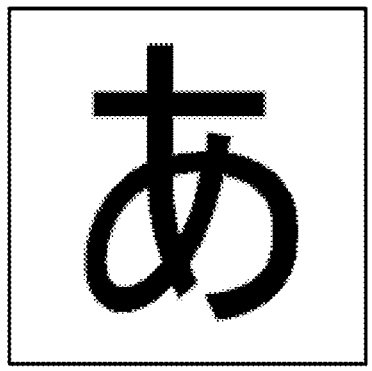
FIGS. 49A and 49B each illustrate a display example of a display device.

In the case where the size of one pixel is large (e.g., the resolution is less than 150 ppi), a blurred character is displayed by the display device as illustrated in FIG. 49A. When a user keeps looking at the blurred character displayed on the display device for a long time, his/her ciliary muscles keep working to adjust the focus in a state where adjusting the focus is difficult, which might lead to eye strain.

Figure 49B:
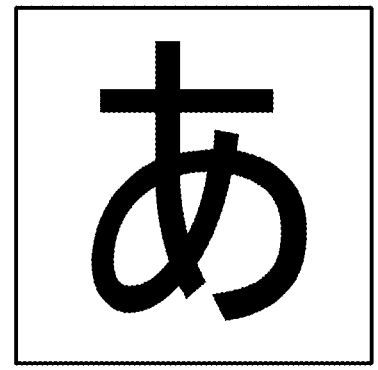

In contrast, in the display device of one embodiment of the present invention, the size of one pixel is small and thus high-resolution display is performed as illustrated in FIG. 49B, so that precise and smooth display can be achieved. The precise and smooth display enables ciliary muscles to adjust the focus more easily, and reduces muscle strain of a user. When the resolution of the display device is 150 ppi or more, preferably 200 ppi or more, further preferably 300 ppi or more, the user's muscular fatigue can be effectively reduced.

Methods for quantifying eye fatigue have been studied. For example, critical flicker (fusion) frequency (CFF) is known as an indicator for evaluating nervous fatigue. Further, accommodation time, accommodation near point, and the like are known as indicators for evaluating muscular fatigue.

Examples of other methods for measuring eye strain include electroencephalography, thermography, measurement of the number of blinkings, measurement of tear volume, measurement of a pupil contractile response speed, and a questionnaire for surveying subjective symptoms.

The method for driving the display device of one embodiment of the present invention can be evaluated by any of the above-described methods, for example.

<Method for Driving Display Device>

Now, a method for driving the display device of one embodiment of the present invention will be described with reference to FIGS. 50A to 50E.

[Display Example of Image Data]

An example of displaying and transferring two images including different image data is described below.

Figure 50A:
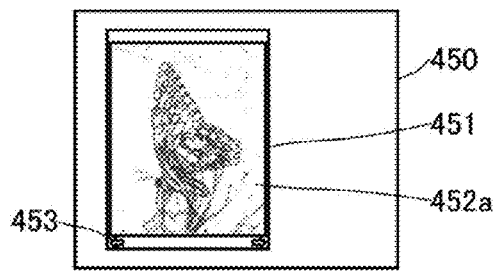
FIGS. 50A to 50E illustrate an example of a display method of a display device.

FIG. 50A illustrates an example in which a window 451 and a first image 452a which is a still image displayed in the window 451 are displayed on a display portion 450.

At this time, display is preferably performed at a first refresh rate. Note that the first refresh rate can be higher than or equal to $1.16 \times 10^{-5}$ Hz (about once per day) and lower than or equal to 1 Hz, higher than or equal to $2.78 \times 10^{-4}$ Hz (about once per hour) and lower than or equal to 0.5 Hz, or higher than or equal to $1.67 \times 10^{-2}$ Hz (about once per minute) and lower than or equal to 0.1 Hz.

When the frequency of rewriting an image is reduced by setting the first refresh rate to an extremely small value, display substantially without flicker can be achieved, and eye fatigue of a user can be effectively reduced.

Note that the window 451 is displayed by, for example, executing application software for image display and includes a display region where an image is displayed.

Further, in a lower part of the window 451, a button 453 for switching displayed image data to different image data is provided. When a user performs operation in which the button 453 is selected, an instruction of transferring an image can be given to the information processing portion of the display device.

Note that the operation method performed by the user may be set in accordance with an input unit. For example, in the case where a touch panel provided to overlap with the display portion 450 is used as the input unit, input operation can be performed by touching the button 453 with a finger, a stylus, or the like or performing gesture operation where an image is made to slide. In the case where the input operation is performed with gesture or sound, the button 453 is not necessarily displayed.

Figure 50B:
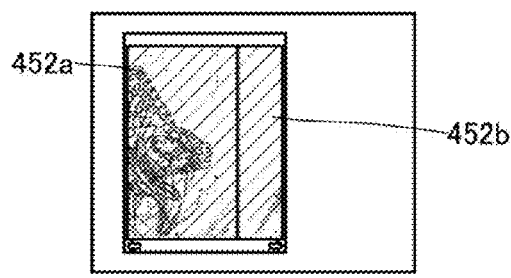

When the information processing portion of the display device receives the instruction of transferring an image, transfer of the image displayed in the window 451 starts (FIG. 50B).

Note that in the case where display is performed at the first refresh rate in the state of FIG. 50A, the refresh rate is preferably changed to a second refresh rate before transfer of the image starts. The second refresh rate is a value necessary for displaying a moving image. For example, the second refresh rate can be higher than or equal to 30 Hz and lower than or equal to 960 Hz, preferably higher than or equal to 60 Hz and lower than or equal to 960 Hz, further preferably higher than or equal to 75 Hz and lower than or equal to 960 Hz, still further preferably higher than or equal to 120 Hz and lower than or equal to 960 Hz, still further preferably higher than or equal to 240 Hz and lower than or equal to 960 Hz.

When the second refresh rate is set to a value larger than that of the first refresh rate, a moving image can be displayed further smoothly and naturally. In addition, flicker which accompanies rewriting of an image is less likely to be perceived by a user, whereby eye fatigue of a user can be reduced.

At this time, an image where the first image 452*a* and a second image 452*b* that is to be displayed next are combined is displayed in the window 451. The combined image is transferred unidirectionally (leftward in this case), and part of the first image 452*a* and part of the second image 452*b* are displayed in the window 451.

Further, when the combined image transfers, luminance of the image displayed in the window 451 is gradually lowered from the initial luminance at the time of the state in FIG. 50A.

Figure 50C:
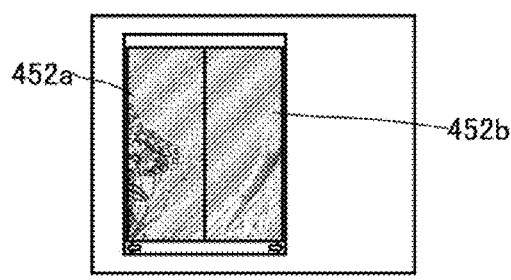

FIG. 50C illustrates a state where the image displayed in the window 451 reaches a position of the predetermined coordinates. Thus, the luminance of the image displayed in the window 451 at this time is lowest.

Note that the predetermined coordinates in FIG. 50C are set so that half of the first image 452*a* and half of the second image 452*b* are displayed; however, the coordinates are not limited to the above, and it is preferable that the coordinates be set freely by a user.

For example, the predetermined coordinates may be set so that the ratio of the distance from the initial coordinates of the image to the distance between the initial coordinates and the final coordinates is higher than 0 and lower than 1.

In addition, it is also preferable that luminance when the image reaches the position of the predetermined coordinates be set freely by a user. For example, the ratio of the luminance when the image reaches the position of the predetermined coordinates to the initial luminance may be higher than or equal to 0 and lower than 1, preferably higher than or equal to 0 and lower than or equal to 0.8, further preferably higher than or equal to 0 and lower than or equal to 0.5.

Figure 50D:
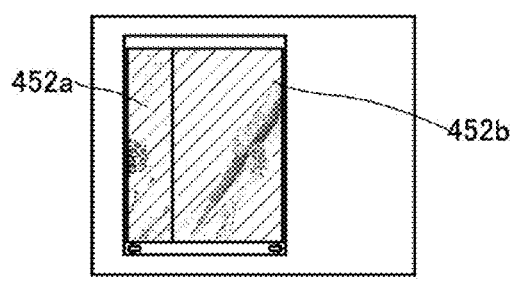

Next, in the window 451, the combined image transfers with the luminance increasing gradually (FIG. 50D)

Figure 50E:
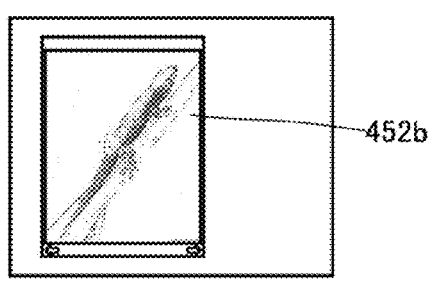

FIG. 50E illustrates a state where the combined image reaches the position of the final coordinates. In the window 451, only the second image 452*b* is displayed with luminance equal to the initial luminance.

Note that after the transfer of the image is completed, the refresh rate is preferably changed from the second refresh rate to the first refresh rate.

Since the luminance of the image is lowered in such a display mode, even when a user follows the motion of the image with his/her eyes, the user is less likely to suffer from eye fatigue. Thus, by such a driving method, eye-friendly display can be achieved.

[Display Example of Document Information]

Next, an example in which document information whose dimension is larger than a display window is displayed and scrolled through is described below.

Figure 51A:
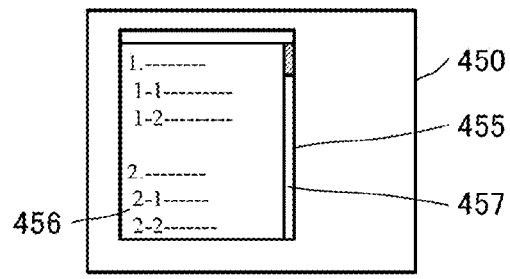
FIGS. 51A to 51E illustrate an example of a display method of a display device.

FIG. 51A illustrates an example in which a window 455 and part of document information 456 which is a still image displayed in the window 455 are displayed on the display portion 450.

At this time, display is preferably performed at the first refresh rate.

The window 455 is displayed by, for example, executing application software for document display, application software for document preparation, or the like and includes a display region where document information is displayed.

The dimension of an image of the document information 456 is larger than the display region of the window 455 in the longitudinal direction. That is, part of the document information 456 is displayed in the window 455. Further, as illustrated in FIG. 51A, the window 455 may be provided with a scroll bar 457 which indicates which part of the document information 456 is displayed.

Figure 51B:
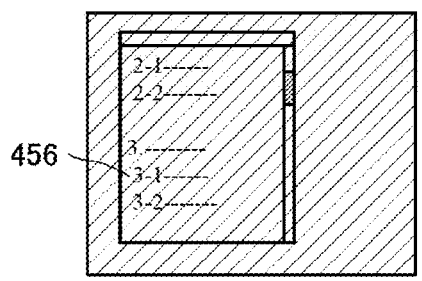

When an instruction of transferring an image (here, also referred to as scroll instruction) is given to the display device by the input portion, transfer of the document information 456 starts (FIG. 51B). In addition, luminance of the displayed image is gradually lowered.

Note that in the case where display is performed at the first refresh rate in the state of FIG. 51A, the refresh rate is preferably changed to the second refresh rate before transfer of the document information 456.

In this state, not only the luminance of the image displayed in the window 455 but the luminance of the whole image displayed on the display portion 450 is lowered.

Figure 51C:
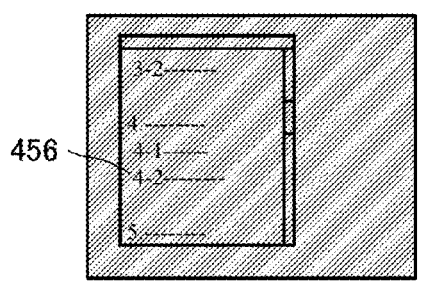

FIG. 51C illustrates a state where the document information 456 reaches a position of the predetermined coordinates. At this time, the luminance of the whole image displayed on the display portion 450 is lowest.

Figure 51D:
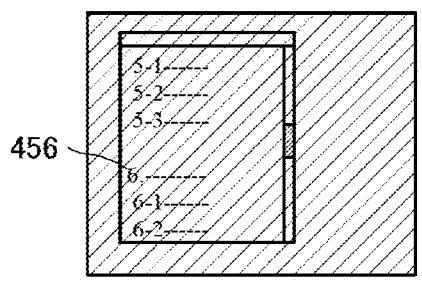

Then, the document information 456 is displayed in the window 455 while being transferred (FIG. 51D). Under this condition, the luminance of the whole image displayed on the display portion 450 is gradually increased.

Figure 51E:
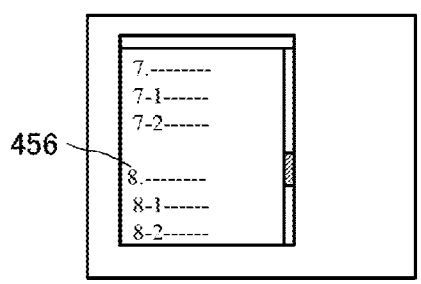

FIG. 51E illustrates a state where the document information 456 reaches a position of the final coordinates. In the window 455, a region of the document information 456, which is different from the region displayed in an initial state, is displayed with luminance equal to the initial luminance.

Note that after transfer of the document information 456 is completed, the refresh rate is preferably changed to the first refresh rate.

Since the luminance of the image is lowered in such a display mode, even when a user follows the motion of the image with his/her eyes, the user is less likely to suffer from eye fatigue. Thus, by such a driving method, eye-friendly display can be achieved.

In particular, display of document information or the like, which has high contrast ratio, gives a user eye fatigue significantly; thus, it is preferable to apply such a driving method to the display of document information.

This embodiment can be combined with any of the other embodiments as appropriate.

Embodiment 5

In this embodiment, a display module and electronic devices that include the display device of one embodiment of the present invention will be described with reference to FIG. 52 and FIGS. 53A to 53H.

Figure 52:
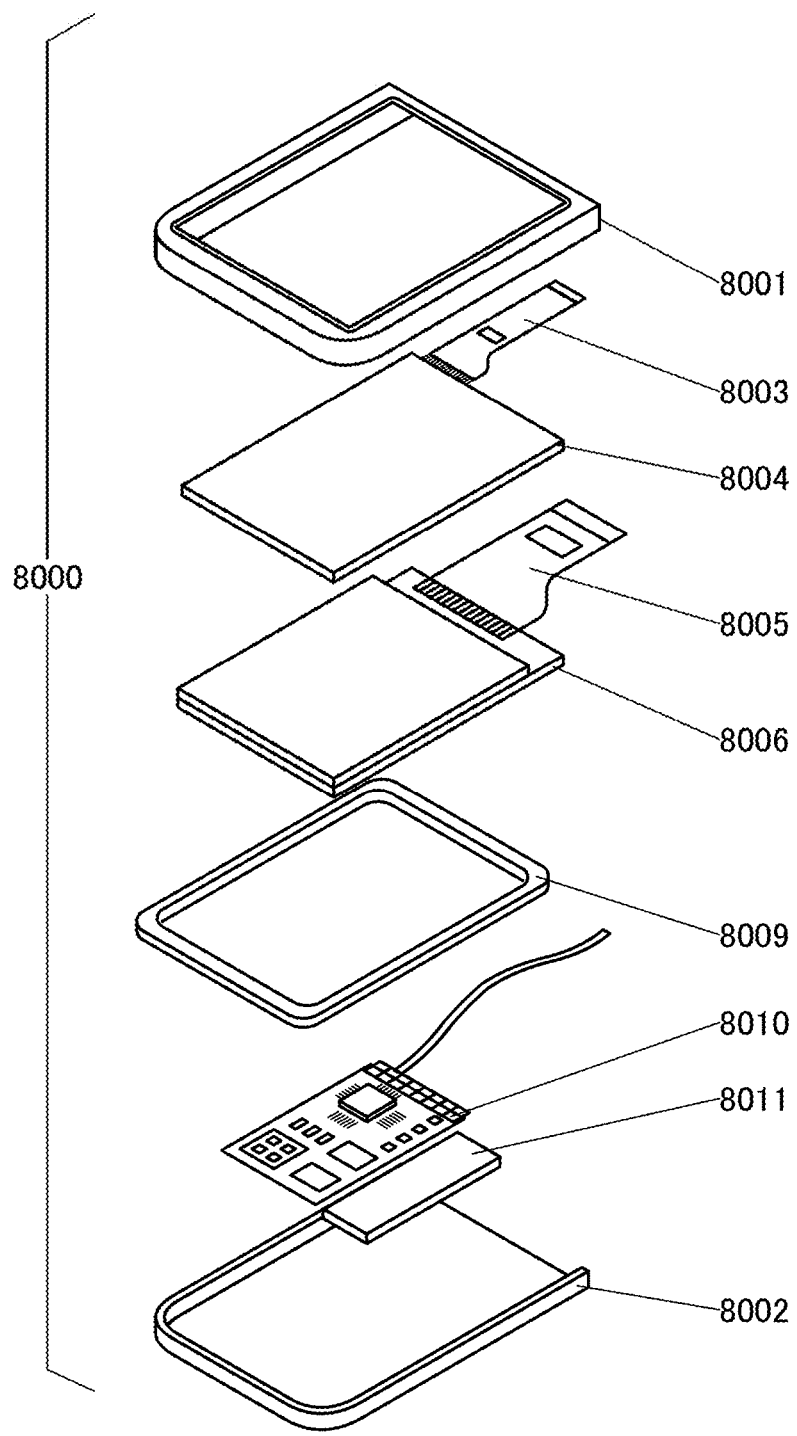
FIG. 52 illustrates an example of a display module.

In a display module 8000 in FIG. 52, a touch panel 8004 connected to an FPC 8003, a display panel 8006 connected to an FPC 8005, a frame 8009, a printed circuit board 8010, and a battery 8011 are provided between an upper cover 8001 and a lower cover 8002.

The display device of one embodiment of the present invention can be used for the display panel 8006, for example.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and may be formed to overlap with the display panel 8006. Instead of providing the touch panel 8004, the display panel 8006 can have a touch panel function.

The frame 8009 protects the display panel 8006 and also serves as an electromagnetic shield for blocking electromagnetic waves generated by the operation of the printed circuit board 8010. The frame 8009 may serve as a radiator plate.

The printed circuit board 8010 has a power supply circuit and a signal processing circuit for outputting a video signal and a clock signal. As a power source for supplying power to the power supply circuit, an external commercial power source or the battery 8011 provided separately may be used. The battery 8011 can be omitted in the case of using a commercial power source.

The display module 8000 can be additionally provided with a member such as a polarizing plate, a retardation plate, or a prism sheet.

FIGS. 53A to 53H illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring or sensing force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 53A:
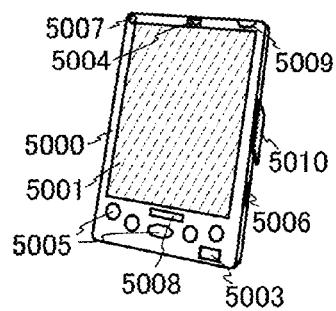
FIGS. 53A to 53H each illustrate an example of an electronic device.
Figure 53B:
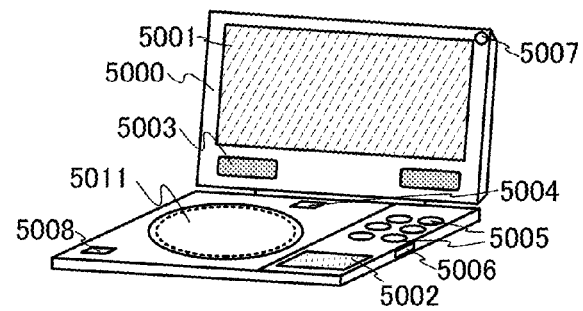
Figure 53C:
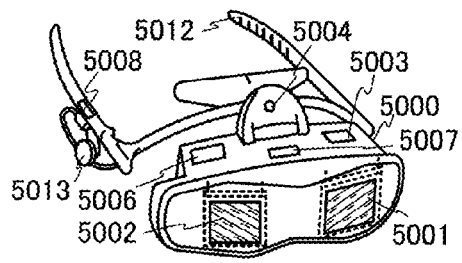
Figure 53D:
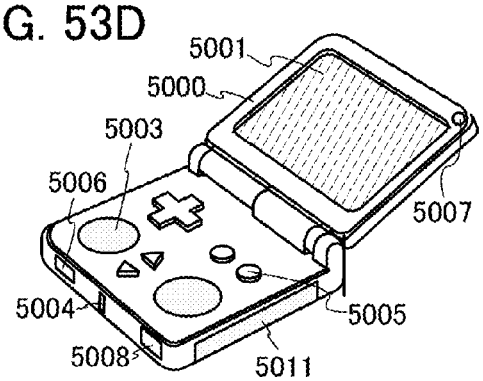
Figure 53E:
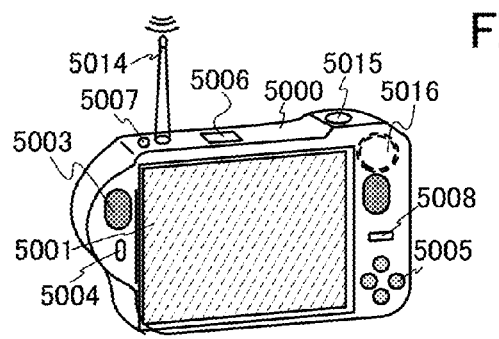
Figure 53F:
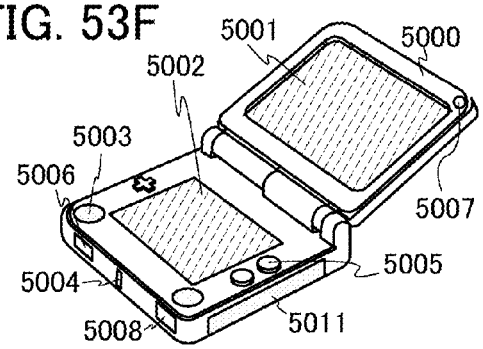
Figure 53G:
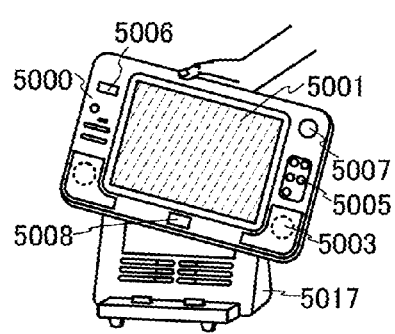
Figure 53H:
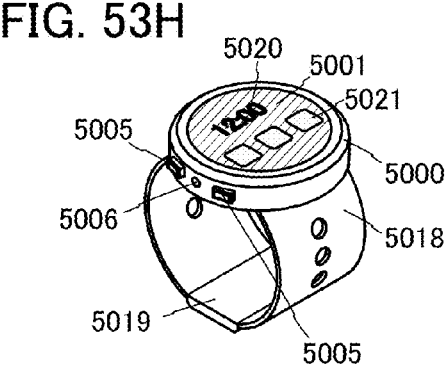

FIG. 53A illustrates a mobile computer that can include a switch 5009, an infrared port 5010, and the like in addition to the above components. FIG. 53B illustrates a portable image reproducing device (e.g., a DVD player) that is provided with a recording medium and can include a second display portion 5002, a recording medium reading portion 5011, and the like in addition to the above components. FIG. 53C illustrates a goggle-type display that can include the second display portion 5002, a support 5012, an earphone 5013, and the like in addition to the above components. FIG. 53D illustrates a portable game machine that can include the recording medium reading portion 5011 and the like in addition to the above components. FIG. 53E illustrates a digital camera that has a television reception function and can include an antenna 5014, a shutter button 5015, an image receiving portion 5016, and the like in addition to the above components. FIG. 53F illustrates a portable game machine that can include the second display portion 5002, the recording medium reading portion 5011, and the like in addition to the above components. FIG. 53G illustrates a portable television receiver that can include a charger 5017 capable of transmitting and receiving signals, and the like in addition to the above components. FIG. 53H illustrates a watch-type information terminal that includes a band 5018, a clasp 5019, and the like in addition to the above components. The display portion 5001 mounted in the housing 5000 serving as a bezel includes a non-rectangular display region. The display portion 5001 can display an icon 5020 indicating time, another icon 5021, and the like.

The electronic devices illustrated in FIGS. 53A to 53H can have a variety of functions, for example, a function of displaying a variety of data (a still image, a moving image, a text image, and the like) on the display portion, a touch panel function, a function of displaying a calendar, date, time, and the like, a function of controlling a process with a variety of types of software (programs), a wireless communication function, a function of connecting to a variety of computer networks with a wireless communication function, a function of transmitting and receiving a variety of data with a wireless communication function, a function of reading a program or data stored in a recording medium and displaying the program or data on the display portion, and the like. Further, the electronic device including a plurality of display portions can have a function of displaying image data mainly on one display portion while displaying text data on another display portion, a function of displaying a three-dimensional image by displaying images on a plurality of display portions with a parallax taken into account, or the like. Furthermore, the electronic device including an image receiving portion can have a function of taking a still image, a function of taking a moving image, a function of automatically or manually correcting a taken image, a function of storing a taken image in a recording medium (an external recording medium or a recording medium incorporated in the camera), a function of displaying a taken image on the display portion, or the like. Note that functions that can be provided for the electronic devices illustrated in FIGS. 53A to 53H are not limited to those described above, and the electronic devices can have a variety of functions.

The electronic devices described in this embodiment each include the display portion for displaying some sort of data. The display device of one embodiment of the present invention can be used in the display portion.

This embodiment can be combined with any of the other embodiments as appropriate.

This application is based on Japanese Patent Application serial no. 2015-052858 filed with Japan Patent Office on Mar. 17, 2015, the entire contents of which are hereby incorporated by reference.

What is claimed is:
1. A display device comprising:
a transistor comprising an oxide semiconductor film;
an insulating film over the transistor;
a liquid crystal element electrically connected to the transistor, over the insulating film, the liquid crystal element comprising a pixel electrode, a common electrode, and a liquid crystal layer;
a color filter layer;
a reflective film over the liquid crystal element and the color filter layer; and
a counter substrate over the reflective film, wherein the pixel electrode of the liquid crystal element comprises a first oxide conductor film comprising gallium, and wherein the reflective film is positioned between the common electrode of the liquid crystal element and the counter substrate, and between the color filter layer and the counter substrate.

2. The display device according to claim 1,
wherein the oxide semiconductor film comprises an In-M-Zn oxide, and
wherein the M is Al, Ti, Ga, Y, Zr, La, Ce, Nd, Sn, or Hf.

3. The display device according to claim 1,
wherein the transistor comprises a first gate electrode and a second gate electrode with the oxide semiconductor film therebetween, and
wherein one of the first gate electrode and the second gate electrode comprises a second oxide conductor film comprising gallium.

4. The display device according to claim 1, further comprising a touch sensor.

5. A display module comprising:
the display device according to claim 1; and
a flexible printed circuit.

6. An electronic device comprising:
the display device according to claim 1;
a flexible printed circuit; and
at least one of an antenna, a battery, a housing, a speaker, a microphone, an operation switch, and an operation button.

7. A display device comprising:
a transistor comprising an oxide semiconductor film;
an insulating film over the transistor;
a capacitor electrically connected to the transistor;
a liquid crystal element electrically connected to the transistor, over the insulating film, the liquid crystal element comprising a pixel electrode, a common electrode, and a liquid crystal layer;
a color filter layer;
a reflective film over the liquid crystal element and the color filter layer; and
a counter substrate over the reflective film,
wherein the pixel electrode of the liquid crystal element comprises a first oxide conductor film comprising an In—Ga—Zn oxide,
wherein one of a pair of electrodes of the capacitor comprises a second oxide conductor film comprising an In—Ga—Zn oxide, and wherein the reflective film is positioned between the common electrode of the liquid crystal element and the counter substrate, and between the color filter layer and the counter substrate.

8. The display device according to claim 7,
wherein the oxide semiconductor film comprises an In-M-Zn oxide, and
wherein the M is Al, Ti, Ga, Y, Zr, La, Ce, Nd, Sn, or Hf.

9. The display device according to claim 7,
wherein the transistor comprises a first gate electrode and a second gate electrode with the oxide semiconductor film therebetween, and
wherein one of the first gate electrode and the second gate electrode comprises a third oxide conductor film comprising an In—Ga—Zn oxide.

10. The display device according to claim 7, further comprising a touch sensor.

11. A display module comprising:
the display device according to claim 7; and
a flexible printed circuit.

12. An electronic device comprising:
the display device according to claim 7;
a flexible printed circuit; and
at least one of an antenna, a battery, a housing, a speaker, a microphone, an operation switch, and an operation button.

13. The display device according to claim 1, wherein the common electrode of the liquid crystal element is electrically connected to the reflective film.

14. The display device according to claim 1, wherein the common electrode of the liquid crystal element comprises a second oxide conductor film comprising an In—Ga—Zn oxide.

15. The display device according to claim 1, further comprising a coloring film between the reflective film and the common electrode of the liquid crystal element.

16. The display device according to claim 7, wherein the common electrode of the liquid crystal element is electrically connected to the reflective film.

17. The display device according to claim 7, wherein the common electrode of the liquid crystal element comprises a third oxide conductor film comprising an In—Ga—Zn oxide.

18. The display device according to claim 7, further comprising a coloring film between the reflective film and the common electrode of the liquid crystal element.

* * * * *